(12) United States Patent
Zhang et al.

(10) Patent No.: US 11,095,574 B2
(45) Date of Patent: Aug. 17, 2021

(54) EDGE DATAPATH USING USER SPACE NETWORK STACK

(71) Applicant: Nicira, Inc., Palo Alto, CA (US)

(72) Inventors: Ronghua Zhang, San Jose, CA (US); Yong Wang, Sunnyvale, CA (US); Teemu Koponen, San Francisco, CA (US); Jia Yu, Sunnyvale, CA (US); Xinhua Hong, Milpitas, CA (US)

(73) Assignee: NICIRA, INC., Palo Alto, CA (US)

( * ) Notice: Subject to any disclaimer, the term of this patent is extended or adjusted under 35 U.S.C. 154(b) by 1061 days.

(21) Appl. No.: 14/965,682

(22) Filed: Dec. 10, 2015

(65) Prior Publication Data

US 2016/0226961 A1  Aug. 4, 2016

Related U.S. Application Data

(60) Provisional application No. 62/110,061, filed on Jan. 30, 2015.

(51) Int. Cl.
*H04L 29/08* (2006.01)
*H04L 12/66* (2006.01)
(Continued)

(52) U.S. Cl.
CPC .......... *H04L 49/25* (2013.01); *H04L 12/4633* (2013.01); *H04L 12/4654* (2013.01); *H04L 12/66* (2013.01); *H04L 41/0654* (2013.01); *H04L 41/145* (2013.01); *H04L 41/5041* (2013.01); *H04L 43/08* (2013.01); *H04L 43/106* (2013.01); *H04L 45/02* (2013.01); *H04L 45/122* (2013.01); *H04L 45/306* (2013.01); *H04L 45/42* (2013.01); *H04L 45/44* (2013.01); *H04L 45/586* (2013.01); *H04L 45/64* (2013.01); *H04L 45/72* (2013.01); *H04L 45/74* (2013.01); *H04L 45/742* (2013.01); *H04L 45/745* (2013.01);
(Continued)

(58) Field of Classification Search
None
See application file for complete search history.

(56) References Cited

U.S. PATENT DOCUMENTS 5,584,295 A    12/1996 Muller et al.
7,065,482 B2   6/2006 Shorey et al.
(Continued)

FOREIGN PATENT DOCUMENTS

WO    2013/154813 A1   10/2013
WO    2017099900 A1   6/2017
WO    2017099901 A1   6/2017

OTHER PUBLICATIONS

Non-Published Commonly Owned International Patent Application PCT/US16/59616, filed Oct. 29, 2016, 94 pages, Nicira, Inc.
(Continued)

*Primary Examiner* — Umar Cheema
*Assistant Examiner* — John Fan
(74) *Attorney, Agent, or Firm* — Adeli LLP

(57) ABSTRACT

A novel design of a gateway that handles traffic in and out of a network by using a datapath daemon is provided. The datapath daemon is a run-to-completion process that performs various data-plane packet-processing operations at the edge of the network. The datapath daemon dispatches packets to other processes or processing threads outside of the daemon by utilizing a user space network stack.

18 Claims, 30 Drawing Sheets

(51) Int. Cl.

| | |
|---|---|
| *H04L 12/715* | (2013.01) |
| *H04L 12/46* | (2006.01) |
| *H04L 12/24* | (2006.01) |
| *H04L 12/747* | (2013.01) |
| *H04L 12/721* | (2013.01) |
| *H04L 12/935* | (2013.01) |
| *H04L 12/861* | (2013.01) |
| *H04L 12/741* | (2013.01) |
| *H04L 12/713* | (2013.01) |
| *H04L 12/751* | (2013.01) |
| *H04L 12/717* | (2013.01) |
| *H04L 12/733* | (2013.01) |
| *H04L 29/12* | (2006.01) |
| *H04L 12/801* | (2013.01) |
| *H04L 12/725* | (2013.01) |
| *H04L 12/26* | (2006.01) |
| *H04L 12/931* | (2013.01) |
| *H04L 12/947* | (2013.01) |
| *H04L 12/707* | (2013.01) |
| *H04L 12/703* | (2013.01) |

(52) U.S. Cl.
CPC .......... *H04L 47/19* (2013.01); *H04L 49/3009* (2013.01); *H04L 49/3063* (2013.01); *H04L 49/354* (2013.01); *H04L 49/9068* (2013.01); *H04L 61/2585* (2013.01); *H04L 67/1002* (2013.01); *H04L 67/1038* (2013.01); *H04L 67/2842* (2013.01); *H04L 67/327* (2013.01); *H04L 69/321* (2013.01); *H04L 69/326* (2013.01); *H04L 69/329* (2013.01); *H04L 41/5077* (2013.01); *H04L 45/22* (2013.01); *H04L 45/28* (2013.01); *H04L 45/38* (2013.01); *H04L 61/103* (2013.01); *H04L 61/2503* (2013.01); *H04L 61/6063* (2013.01); *H04L 67/1095* (2013.01); *H04L 2012/4629* (2013.01)

(56) References Cited

U.S. PATENT DOCUMENTS

| | | | |
|---|---|---|---|
| 7,616,585 B1 | 11/2009 | Kritov et al. | |
| 7,783,739 B1 | 8/2010 | Weigle | |
| 7,826,482 B1 | 11/2010 | Minei et al. | |
| 7,996,631 B1 | 8/2011 | Bender et al. | |
| 9,154,433 B2 | 10/2015 | Koponen et al. | |
| 9,208,071 B2 | 12/2015 | Talagala et al. | |
| 9,641,435 B1 | 5/2017 | Sivaramakrishnan | |
| 9,692,655 B2* | 6/2017 | Koponen | H04L 41/0893 |
| 9,717,412 B2 | 8/2017 | Roham et al. | |
| 10,320,681 B2 | 6/2019 | Hira et al. | |
| 2002/0145981 A1 | 10/2002 | Klinker et al. | |
| 2003/0231632 A1 | 12/2003 | Haeberlen | |
| 2004/0073420 A1 | 4/2004 | Lee et al. | |
| 2006/0059253 A1* | 3/2006 | Goodman | G06Q 10/06 709/223 |
| 2008/0253396 A1 | 10/2008 | Olderdissen | |
| 2009/0067440 A1 | 3/2009 | Chadda et al. | |
| 2009/0216137 A1 | 8/2009 | Holland | |
| 2010/0061226 A1 | 3/2010 | Morishige et al. | |
| 2012/0120965 A1 | 5/2012 | Khawer et al. | |
| 2013/0044641 A1 | 2/2013 | Koponen et al. | |
| 2013/0103818 A1 | 4/2013 | Koponen et al. | |
| 2013/0208728 A1 | 8/2013 | Armstrong et al. | |
| 2013/0287026 A1* | 10/2013 | Davie | H04L 49/70 370/392 |
| 2014/0050091 A1 | 2/2014 | Biswas et al. | |
| 2014/0280892 A1* | 9/2014 | Reynolds | H04L 43/028 709/224 |
| 2014/0310417 A1* | 10/2014 | Sorenson, III | H04L 67/1002 709/226 |
| 2014/0348161 A1 | 11/2014 | Koponen et al. | |
| 2014/0379938 A1 | 12/2014 | Bosch et al. | |
| 2015/0063366 A1 | 3/2015 | Melander | |
| 2015/0078386 A1 | 3/2015 | Jackson et al. | |
| 2015/0134822 A1 | 5/2015 | Bhagwat et al. | |
| 2015/0271303 A1 | 9/2015 | Neginhal et al. | |
| 2015/0365330 A1 | 12/2015 | Pandey et al. | |
| 2016/0094460 A1 | 3/2016 | Shelar et al. | |
| 2016/0226957 A1 | 8/2016 | Zhang et al. | |
| 2016/0226958 A1 | 8/2016 | Zhang et al. | |
| 2016/0226959 A1 | 8/2016 | Zhang et al. | |
| 2016/0226960 A1 | 8/2016 | Zhang et al. | |
| 2016/0226967 A1 | 8/2016 | Zhang et al. | |

OTHER PUBLICATIONS

PCT International Search Report and Written Opinion dated Jan. 19, 2017 for commonly owned International Patent Application PCT/US16/59616, 13 pages, Nicira, Inc.

* cited by examiner

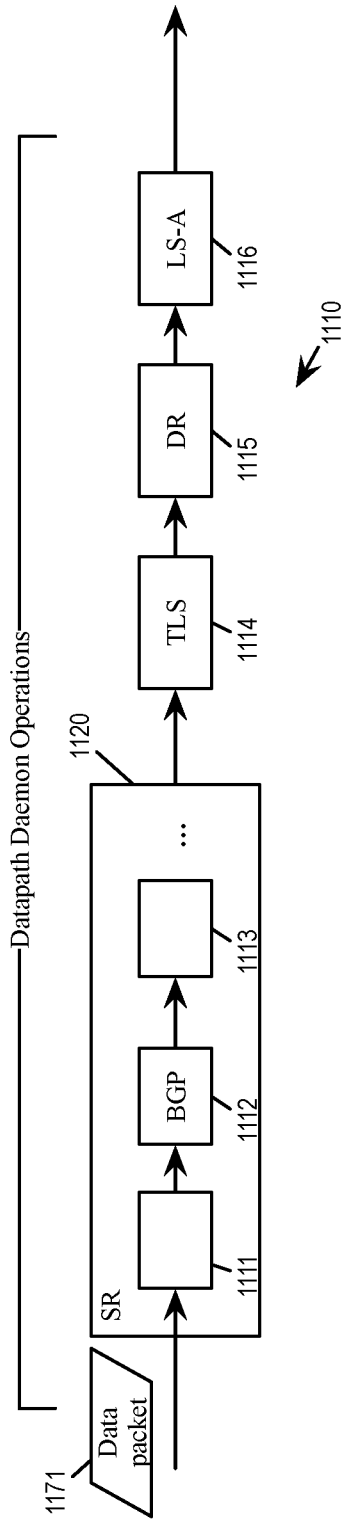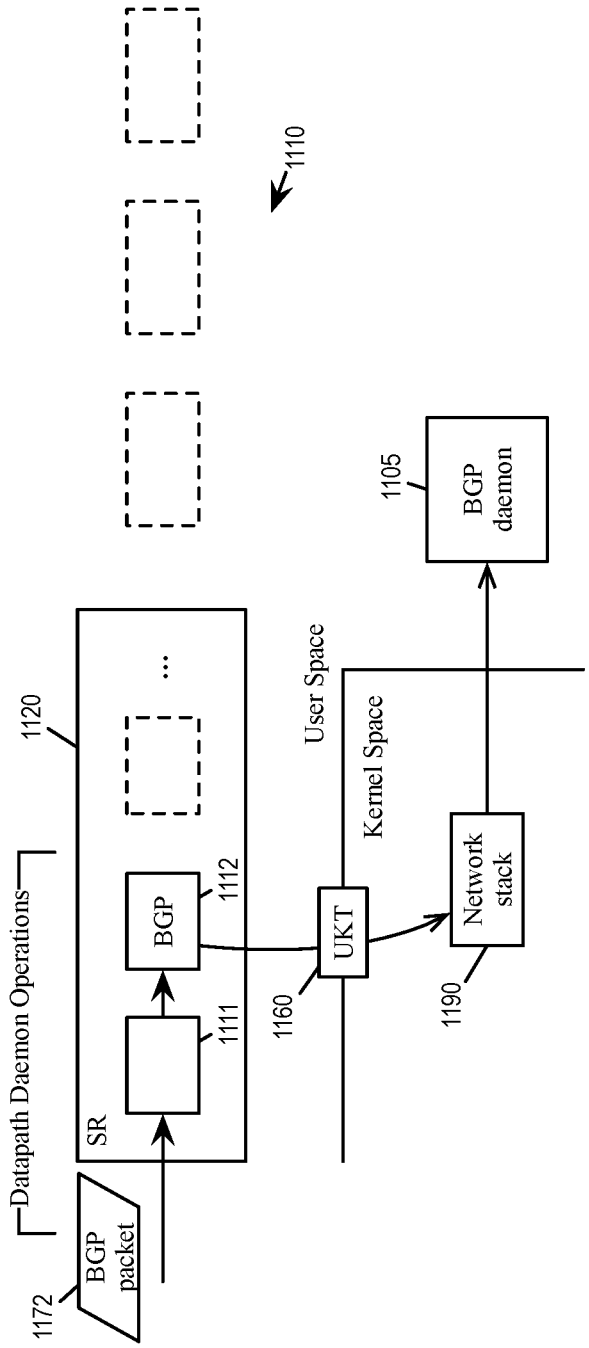
*Figure 11a*
*Figure 11b*

EDGE DATAPATH USING USER SPACE NETWORK STACK

CLAIM OF BENEFIT TO PRIOR APPLICATIONS

The present application claims the benefit of U.S. Provisional Patent Application 62/110,061, filed Jan. 30, 2015. U.S. Provisional Patent Application 62/110,061 is incorporated herein by reference.

BACKGROUND

A gateway is a network point that acts as an entrance to another network. In a network provided by a datacenter, a computing resource assigned to be a gateway node facilitates and regulates traffic between the datacenter network and an external physical network. The gateway is typically is associated with a router, which knows where to direct a given packet of data that arrives at the gateway, and a switch, which furnishes the actual path in and out of the gateway for a given packet. The gateway is also a compute node that provides various network traffic services, such as firewall, network address translation (NAT), security protocols (such as HTTP over SSL), etc. As datacenters become larger and provide ever more computing and networking resources, gateways also have to handle more traffic. In other words, the gateways and their associated routers and switches have to perform more switching, routing, and service tasks at greater speed.

SUMMARY

Some embodiments provide a gateway machine that handles traffic in and out of a network by implementing a datapath daemon. The datapath daemon is a run-to-completion process that performs various data-plane packet-processing operations at the edge of the network. In some embodiments, the datapath daemon dispatches packets to other processes or processing threads outside of the daemon.

Some embodiments offload workload from one or more of the datapath stages from the datapath daemon to processes or threads that are external to the datapath daemon. Such processes can be performed by the same processing core that performs the datapath daemon, by a different processing core as the core that performs the datapath daemon, or by multiple processing cores. In some embodiments, gateway is operating an operating system such as Linux that divides memory space into user space and kernel space. The datapath daemon in some of these embodiments is a process operating in the user space. The user space datapath daemon dispatches packet to processes operating in the kernel space or to other processes operating in the user space in some embodiments.

In some embodiments, the datapath daemon copies packets to processes or threads outside of the datapath daemon. This packet copying operation is analogous to operations of a Switched Port Analyzer (SPAN), which mirrors packet to a port for monitoring purposes. In some embodiments, such packet replication occurs when the datapath daemon is at a particular point or stage of the datapath pipeline when processing an incoming packet. In other words, the datapath daemon mirrors packets out of the daemon before or after certain packet processing operations.

In some embodiments, the datapath daemon of an edge gateway offloads workload by performing one or more of its stages or operations by using processes or processing threads that are external the datapath daemon. In some of these embodiments, the datapath daemon dispatches packets to those external processes at certain points of the datapath daemon. In some embodiments, the datapath daemon uses the result of the external process to execute subsequent pipeline stages. In some embodiments, a gateway datapath daemon includes a L7 load balancing stage (application layer load balancer) that dispatches packet to an external process or daemon to handle the load balancing tasks before returning a resulting packet to the datapath daemon to continue subsequent stages.

In some embodiments, both the datapath daemon and the external process are user space processes, and the inter-process transport for sending packets from the datapath daemon to the external process are shared memory structures such as ring buffers. In some embodiments, the datapath daemon is a user space process while the external process is either a kernel space process or a user space process that communicates with the datapath daemon through kernel space process or processing thread such as a network stack (e.g., TCP/IP stack.). In some of these embodiments, datapath daemon uses user-kernel data transport mechanism such as KNI (Kernel NIC Interface) or TUN/TAP virtual network kernel devices to deliver packets between the user space datapath daemon and the external process.

In some embodiments, the operating system of the gateway machine provides a network protocol stack as a processing thread in its kernel space. Such a network stack is normally used to handle network protocols for packets at a NIC (Network Interface Controller) of the gateway machine. Rather than implementing another network protocol stack in the user space, some embodiments leverages the existing kernel network stack to perform various operations. In some embodiments, the datapath daemon sends mirrored packets to the network stack through user-kernel transport (such as KNI), which is treated as a NIC by the kernel network stack. Once the packet reaches the kernel network stack, the gateway machine is able to utilize the functionalities of the kernel stack as if the datapath packet is directly provided by the physical NIC.

Some embodiments dispatch packets from the datapath daemon to other user space processes. In some embodiments, these user space processes are for processing control plane packets of the network such as BGP packets. These packets are not to be forwarded in the data plane, but are instead consumed by control plane processes. The datapath daemon in some embodiments dispatches these control plane packets to their corresponding control plane processes. Specifically, the packets are dispatched to the network stack from the datapath daemon through user-kernel transport, and the network stack in turn delivers the packet to its corresponding control plane process. In some embodiments, a control plane packet (such as BGP packet) has identifiers that are recognizable by the network stack that can be used to deliver the packet to the corresponding control plane user process.

In some embodiments, the control plane process is regarded as being performed by a logical entity in the logical network, specifically in the service router. In some embodiments, the datapath has a dispatch stage that corresponds to the control plane process. In some embodiments, such a stage is for determining whether the packet is for the control plane process or not. For example, in some embodiments, the datapath's service router includes a BGP dispatch stage for determining whether the incoming packet is a BGP packet. If so, the datapath daemon terminates processing of the packet and let the BGP process consumes the BGP packet and performs the corresponding BGP operations.

In some embodiments, not all datapath tasks are performed by the datapath daemon. Specifically, the datapath daemon in some embodiments exports packets (by dispatching packets to kernel network stack through user-kernel transport) to an external data plane process for some of the datapath stages. In some embodiments, the external data plane process would transport the processed packet back to the datapath daemon to continue datapath processing.

In some embodiments, datapath operations at lower layers of the network protocol model are processed by the datapath daemon within its run-to-completion thread, while datapath operations at higher layers of the network protocol model are processed by data plane processes external to the datapath daemon. In some embodiments, application layer (L7) datapath stages are performed by external data plane processes, while transport layer (L4), network layer (L3), and data link layer (L2) datapath stages are performed by the datapath daemon itself. For example, some embodiments use the datapath daemon to perform Layer 4 load balancer (L4 LB) operations while dispatching packets to a separate Layer 7 load balancer (L7 LB) process for performing application layer load balancing. Some embodiments uses data plane processes external to the datapath daemon to handle higher layer network processing in order to provide fault isolation for some embodiments. In some embodiments, the external data plane process operates in the user space of its own namespace to further segregate itself from other user space processes such as the datapath daemon.

In some embodiments, the datacenter supports multiple logical networks for multiple different tenants. Different tenant logical networks share a same set of gateway machines, and each of the gateway machines provides packet switching, forwarding, routing operations for all of the connected tenant logical networks. In some embodiments, a datapath daemon is capable of executing packet-processing stages for packets to and from different logical networks belonging to different tenants. In some embodiments, the overall network of a datacenter implementing a two-tier logical network structure. These tiers include a top tier of a provider logical router (PLR) and a lower tier of tenant logical routers (TLRs), in some embodiments. The two-tiered structure enables both the provider (e.g., datacenter owner) and the tenant (e.g., datacenter customer, often one of many such customers) control over their own services and policies. In some embodiments, the datapath daemon performs the datapath pipeline for different tenants following the connection mapping between the different logical entities, where some of the logical entities correspond to various tenant-specific logical network constructs (e.g., TLR-LS or TLR-DR for different tenants). The datapath daemon provides common network services to all tenants by executing pipeline stages that correspond to various provider logical entities (e.g., PLR-SRs and PLR-DR).

As mentioned, a datapath daemon in some embodiments dispatches packets to an external processes or daemons through a kernel network stack in order to perform processing for some of its pipeline stages. In some embodiments, each TLR has its own namespace in the operating system, and a packet exported by the datapath daemon when processing a TLR is sent to a daemon in a corresponding namespace for the TLR by the kernel network stack.

Some embodiments use user-kernel transport such as KNI to transport packets between the datapath daemon and the kernel space network stack, and the transport of packets between datapath daemon and the external TLR daemons in TLR-specific namespaces likewise rely on user-kernel transports. Some embodiments allow only a limited number of user-kernel transports (as permitted by the operating system running on the gateway machine) while allowing the number of TLRs to scale to whatever the number of tenants or TLRs the datacenter or the gateway machine can support.

The datapath daemon in some embodiments inserts TLR identifiers into packets that are to be handled by external, TLR-specific processes. However, in some embodiments, the kernel network stack as provided by the operating system does not recognize identifiers other than those provided by VLAN syntax. Some embodiments therefore inserts TLR identifiers as VLAN tags into the dispatched packets from the datapath daemon so that the network stack can deliver them to the correct TLR-specific namespace.

Rather than relying on the kernel network stack provided by the operating system, some embodiments implement a network stack in the user space to relay packets between the datapath daemon and processes or daemons external to the datapath daemon. Such an external process can be a control plane processing daemon that consumes a control plane packet dispatched to it, or a data plane processing daemon that processes a dispatched packet and returns a resulting packet back to the datapath daemon. Since the datapath daemon, the user space network stack, and the external processing daemons are all user space processes, some embodiments use user space data structures such as ring buffers to communicate data between different processes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 11a-b illustrates a datapath daemon that forwards BGP packets to a BGP daemon that is external to the datapath.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a gateway machine that handles traffic in and out of a network by implementing a datapath daemon. The datapath daemon is a run-to-completion process that performs various data-plane packet-processing operations at the edge of the network. In some embodiments, the datapath daemon dispatches packets to other processes or processing threads outside of the daemon.

Several more detailed embodiments of the invention are described below. Section I describes a datapath daemon at an edge gateway of a network. Section II describes a datapath daemon that dispatches packets to processes outside of the daemon. Section III describes datapath operations that leverage the existing network stack in the kernel. Section IV describes methods for dispatching packets from the datapath daemon to many tenant specific processes through limited number of user-kernal transport resources. Section V describes using user space network stack to perform datapath operations. Section VI describes a software architecture of a gateway that implements the datapath pipeline. Section VII describes a computing device operating virtualization software. Finally, section VIII describes an electronic system with which some embodiments of the invention are implemented.

I. Data Path Daemon at Edge Gateway

Figure 1:
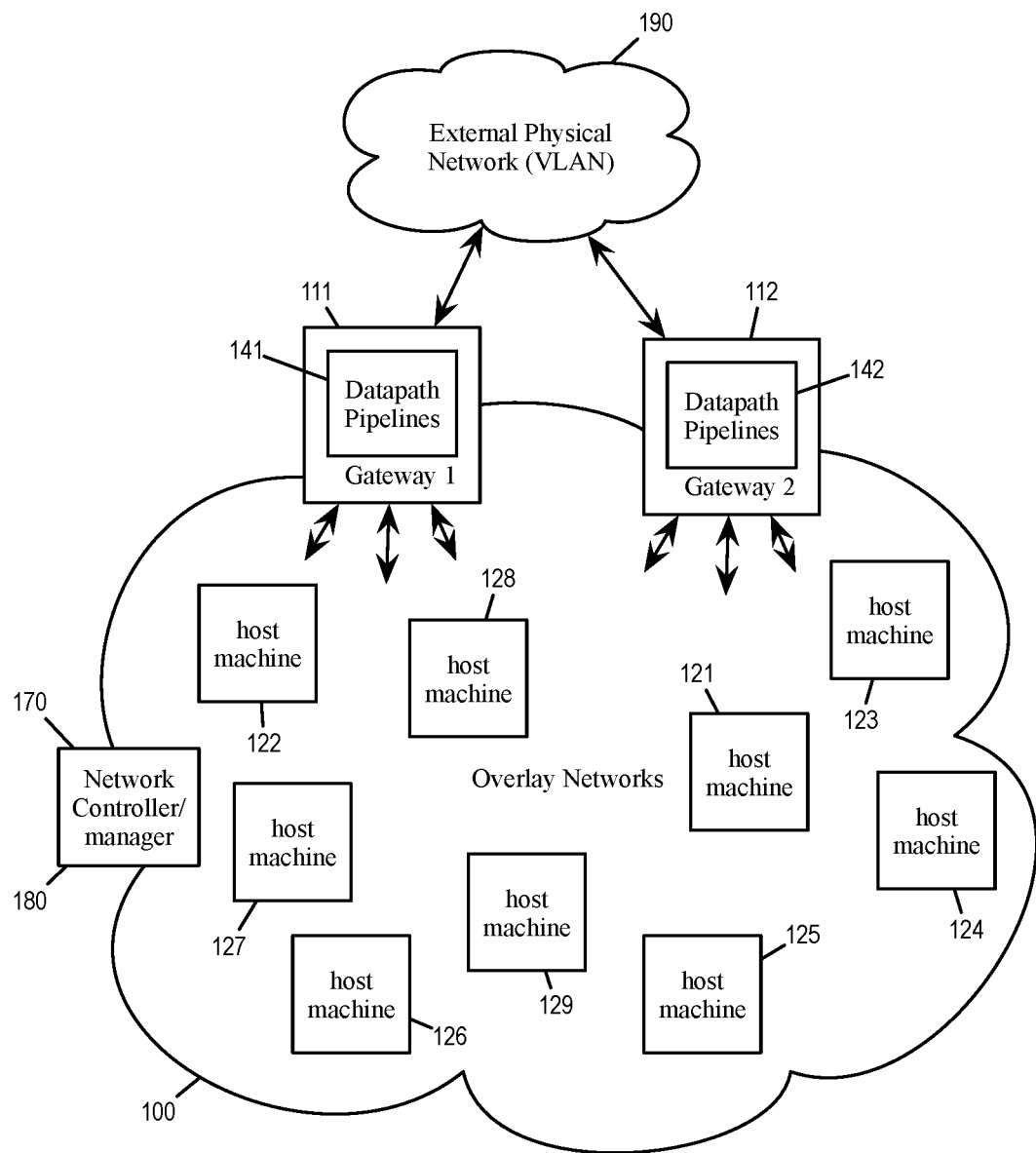
FIG. 1 conceptually illustrates a data center whose traffic to and from an external network goes through gateways.

FIG. 1 conceptually illustrates a data center 100 whose traffic to and from an external network 190 goes through gateways 111-112. Each of the gateways operates a datapath pipeline (141 and 142 respectively) for processing packets that go through the gateway.

The datacenter 100 includes various other computing and networking resources 121-129 that are interlinked by a provider network. These resources communicate with each other through the provider network and with the external network 190 by network traffic over physical communication mediums (which can include wired communications such as Ethernet or wireless communications such as WiFi). Packets from the computing and networking resources 121-129 can reach the external network 190 through one of the gateways 111-112, and packets from the external network 190 can reach the computing and network resources 121-129 through one of the gateways 111-112. A gateway of a network is therefore regarded as being at the edge of the network and therefore also referred to as an edge device or edge node.

In some embodiments, some of these resources are provided by computing devices serving as host machines 121-129. Some of these host machines operate virtualization software, which allow these host machines to host various virtual machines (VMs). A host machine running virtualization software will be described in greater detail by reference to FIG. 29 below. In some embodiments, a gateway is itself a host machine, and datapath pipeline (141 or 142) of the gateway is provided by one of the VMs running on its virtualization software. Some of these resources are running as "bare metal", i.e., without virtualization software. In some embodiments, the gateway is a bare metal computing device that operates its datapath pipeline directly over its own operating system without virtualization software.

In some embodiments, the packet traffic within the datacenter is conducted by using overlay logical networks such as Virtual eXtensible LAN (VXLAN), Generic Network Virtualization Encapsulation (GENEVE), and Network Virtualization using Generic Routing Encapsulation (NVGRE). VXLAN. In some of these embodiments, each of the host machines and the gateway machines is a VXLAN endpoint (referred to as VTEP) that transmits packets using overlay encapsulation. In some embodiments, the external physical network is conducted by VLAN, and the gateways relay the traffic between the datacenter and the external network by translating VXLAN packets to VLAN packets and vice versa.

In some embodiments, the computing and networking resources of the datacenter implement one or more logical networks, each logical network having access to the gateways 111-112 for traffic to and from the external network 190. In some embodiments, each logical network has its own set of logical routers and logical switches for conducting network traffic of the logical network. Some or all of these logical routers and switches are provided by software operating in the host machines (either as virtualization software or as programs executing on bare metal host machines). In some embodiments, some of the logical routers and switches operate in the gateways 111-112 as stages in their respective datapath pipelines 141-142.

In some embodiments, the datacenter 100 includes a network manager 180 for provisioning/creating the logical networks in the data center 100 and a network controller 170 (or a cluster of controllers) for controlling the various logical routers and switches (including those operating in the gateways 111-112) of the various logical networks. Logical routers and switches are described in U.S. patent application Ser. No. 14/814,473, titled "Logical Router with Multiple Routing Components" filed on Jul. 30, 2015, and now issued as U.S. Pat. No. 9,787,605, which is incorporated herein by reference.

The control plane of some embodiments configures and manages one or more logical networks for one or more tenants of a hosting system (e.g., a datacenter). In some embodiments, a logical network of the hosting system logically connects a set of end machines (e.g., virtual machines, physical servers, containers, etc.) to a set of physical machines using a set of logical forwarding elements (e.g., logical L2 and L3 switches). In some embodiments, different subsets of end machines reside on different host machines that execute managed forwarding elements (MFEs), also known as virtualization software or hypervisors. The MFEs implement the logical forwarding elements of the logical network to which the local end machines are logically connected. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case they execute a pipeline for each logical forwarding element that may be required to process a packet.

Figure 2:
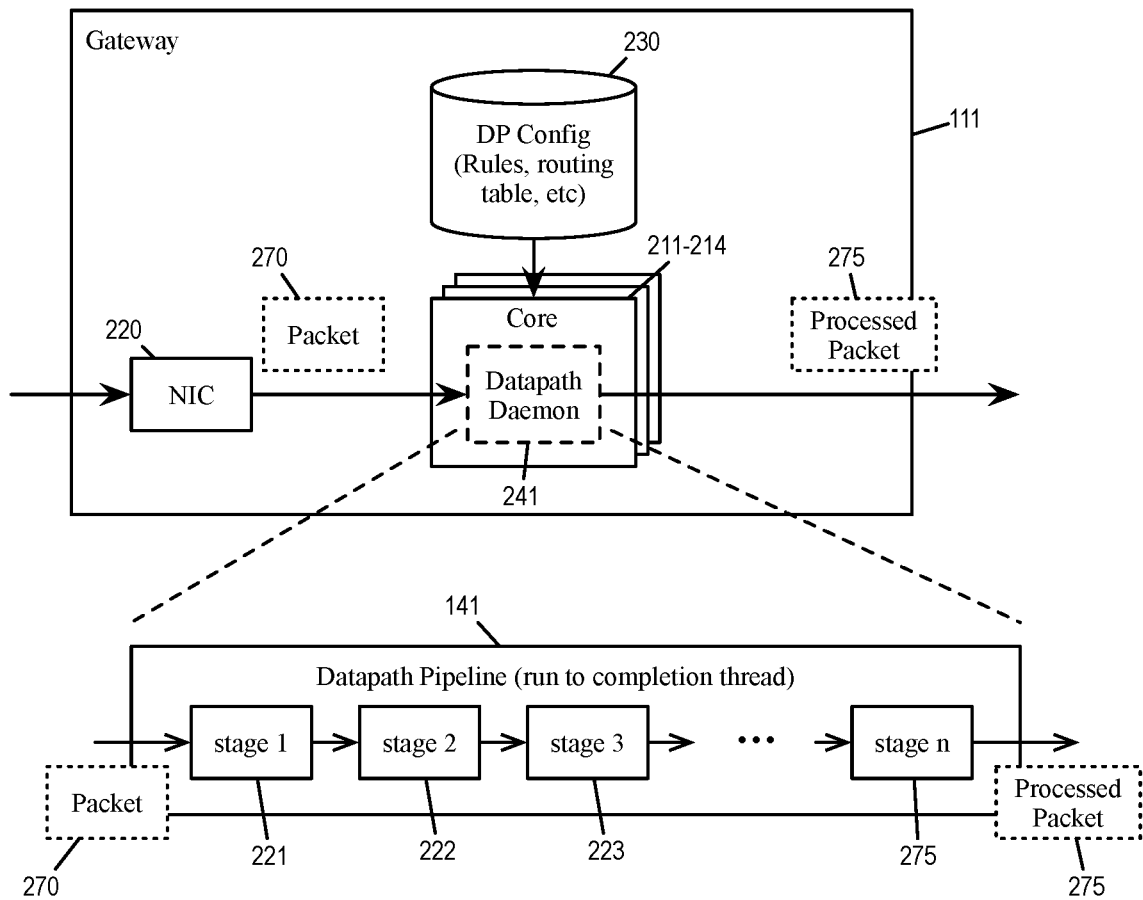
FIG. 2 illustrates a gateway machine implementing a datapath pipeline in greater detail.

FIG. 2 illustrates a gateway machine implementing a datapath pipeline in greater detail. As illustrated, the gateway 111 comprises processing cores 211-214 and a network interface controller (NIC) 220. The NIC 220 receives data packets from the network communication medium that connects the gateway 111 and provide the received packets to the cores 211-214 for processing.

Each of the processing cores is operating one or more processing threads. Specifically, the core 211 is operating the datapath pipeline 141 as a processing thread that is referred to as a datapath daemon 241. As illustrated, the datapath daemon 241 receives a packet 270 and processes the packet 270 through a series of stages 221-229 to produce a processed packet 275. In some embodiments, each core performs only one thread at a time, and each thread processes one packet at a time. In other words, each packet processing thread is a run-to-completion (RTC) thread that does not start to process another packet until it has completed processing the current packet (i.e. 270) through all of its stages 221-229.

The operations of the datapath daemon 241 is defined or specified by a data path configuration database storage (DP configuration database) 230. The configuration data stored in DP configuration database 230 specifies what functions or operations each stage of the pipeline should perform with regard to each incoming packet. For some stages that correspond to logical routers or switches, the DP configuration database in some embodiments provide content for routing tables or forwarding tables that specify next hops. For some stages that correspond to network services such as firewall, the DP configuration database 230 provides service rules. In some embodiments, the network controller 170 (or the network manager 180) loads and updates the content of DP configuration database 230.

In some embodiments, the sequence of the stages that are to be executed as part of the datapath pipeline is dynamically determined according to the content of the received packet. In the context of FIG. 2, this means that the content of the packet 270 dynamically determines what processing stages are to be performed as part of the datapath pipeline 141. In some embodiments, the core 211 when processing/parsing the packet at a particular stage determines or identifies the next stage that is to be used for processing the packet. In some embodiments, each stage of the datapath pipeline corresponds to a packet-processing logical entity such as logical router or logical switch, and the next stage identified by the packet processing at the stage corresponds to the next hop of the packet in the logical network, the next hop being another packet-processing logical entity. (A packet-forwarding logical entity will be referred to as a logical entity throughout this document for simplicity).

In some embodiments, a pipeline stage that corresponds to a logical router or a logical switch is a complete functional model of the logical router or switch, i.e., it specifies all of its logical ports, its routing/forwarding tables, the services it provides, its security policies, its encapsulation protocols, etc. In some embodiments, all of these features of the logical routers are specified by a package of computer executable code and can be performed as a pipeline stage by a function call. It performs forwarding either by destination MAC (L2 switching) or destination IP (L3 routing). Such a pipeline stage is therefore distinguishable from a flow table under OpenFlow or Open vSwitch, which performs flow forwarding according to a set of flow entries, each entry describing a match condition and a corresponding action.

In some embodiments, the packet processing operations of each logical entity (i.e., pipeline stage) is based on the configuration data stored in the DP configuration database for that logical entity. Such configuration data also defines the criteria or the rules for identifying the next hop of the packet. In some embodiments, such next hop identifying rules are stored in the DP configuration database as routing tables or forwarding tables associated with the stage. Such next hop identifying rules in some embodiments allow the datapath daemon to determine the identity of the next hop by examining the content of the packet (e.g., its source and destination addresses) and/or by noting the logical port through which the packet enters the logical entity. In other words, the DP configuration database can be regarded as storing the logical relationship between the various hops of a logical network, and the datapath daemon processes each packet by traversing the logical network according to those logical relationships and the content of the packet.

Figure 3:
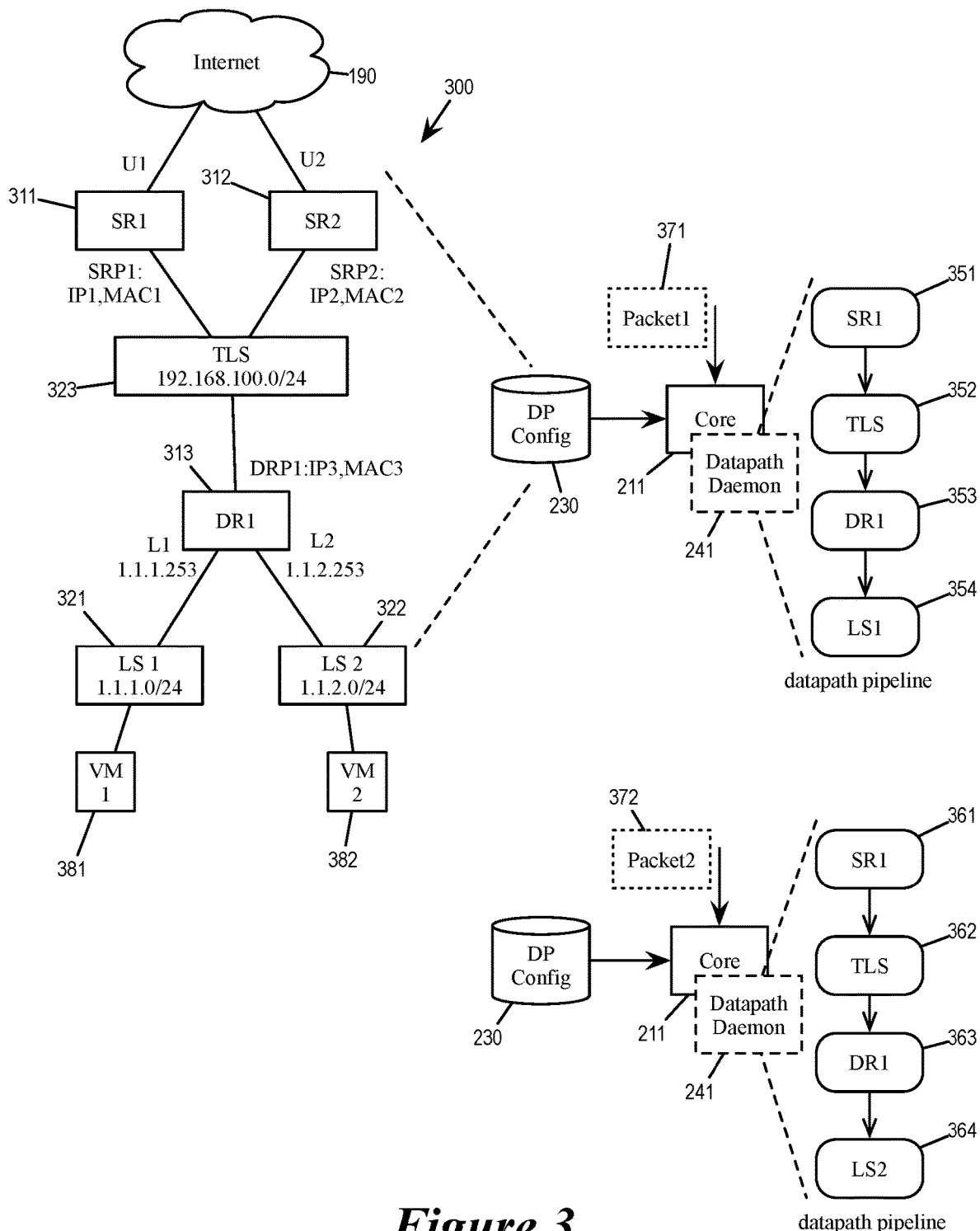
FIG. 3 illustrates the dynamic identification of processing stages by a datapath daemon.

FIG. 3 illustrates the dynamic identification of processing stages by a datapath daemon. As illustrated, the core 211 is operating the datapath daemon 241 as a processing thread. The datapath daemon 241 is processing a packet 371 according to a logical network 300, whose configuration data is stored in the DP configuration database 230.

As illustrated, the logical network 300 includes service routers 311 and 312 (SR1 and SR2), logical switches 321, 322, and 323 (LS1, LS2, and TLS), and distributed router 313 (DR). Each of the service routers SR1 and SR2 has an uplink (U1 and U2) for connecting to the external network 190. The logical switch TLS 323 is a transit logic switch that provides L2 switching for packets from routers SR1 311, SR2 312, and DR1 313, which are assigned logical ports with MAC address "MAC1", "MAC2", and "MAC3" respectively. The distributed router DR1 313 on the other hand provides L3 routing among L2 network segments defined by the logical switches LS1 321, LS2 322, and TLS 323.

The figure illustrates how the datapath daemon 241 processes two different packets 371 and 372 according to the configuration data stored in the DP configuration database 230. The two different packets cause the datapath daemon 241 to traverse the logical network 300 differently and to execute different corresponding pipeline stages.

The packet 371 is a packet from the external network 190 that is destined for a VM 381 (VM1) behind the L2 segment of the logical switch LS1. The processing core 211 upon receiving the packet 371 performs a packet processing stage 351 that corresponds to the service router SR1 311. The operations of the stage 351 are defined by the configuration in the DP configuration database. The service router SR1 311 logically forwards the packet to the logical switch TLS 323, which causes the datapath daemon 241 to identify a next packet processing stage 352 that corresponds to the logical switch TLS 323.

The processing stage 352 is configured by DP configuration database 230 to perform L2 switching operations as the logical switch TLS 323, which forwards the packet 371 from its "MAC1" port to its "MAC3" port. The MAC3 port correspond to the distributed router DR1, and the datapath daemon 241 correspondingly identifies a next packet processing stage 353 that corresponds to DR1 313.

The processing stage 353 is configured by the DP configuration database 230 to perform L3 routing operations as the distributed logical router DR1 313, which operates according to a routing table provided by the DP configuration database 230. According to the routing table and the destination IP address of the packet 371, the logical router DR1 routes the packet 371 from the L2 segment defined by the logical switch TLS 323 to an L2 segment defined by the logical switch LS1 321. Correspondingly, the datapath daemon 241 identifies a next packet processing stage 354 that corresponds to LS1 321.

The processing stage 354 is configured by DP configuration database 230 to perform L2 switching operations as the logical switch LS1 321, which forwards the packet 371 toward the virtual machine VM1 (381) according to the packet's destination MAC address.

The packet 372 is destined for a VM 382 that is attached to a L2 segment defined by the logical switch LS2. The packet 372 causes the datapath daemon 241 to identify a packet processing stage 361 to perform the service router SR1, then identify a packet processing stage 362 to perform the logical switch TLS 323, then identify a packet process stage 363 to perform the distributed router DR 313. When processing the packet 372, the packet processing stage 363 routes the packet from the L2 segment defined by the logical switch TLS 323 to an L2 segment defined by the logical switch LS2 322. Correspondingly, the datapath daemon 241 identifies a next packet processing stage 364 that corresponds to the logical switch LS2 322, which forwards the packet 372 toward the virtual machine VM2 (382) according to the packet's destination MAC address.

In the example of FIG. 3, though the datapath daemon 241 operate according to the same DP configuration database 230, the two different packets 371 and 372 causes the datapath daemon to traverse the logical network 300 differently and performed different packet processing stages (SR1-TLS-DR1-LS1 for the packet 371, SR1-TLS-DR1-LS2 for the packet 372).

In some embodiments, each packet processing stage is implemented as a function call for the datapath daemon thread. In some embodiments, a function (also known as a subroutine or a procedure) is a sequence of program instructions that are packaged as unit to perform a specific task. In some embodiments, the function being called to implement the various stages of the datapath is part of the programming of the datapath daemon operating at the core, but the called function performs different operations based on different configuration data for different network identities. In other words, the programming of the core provides functions that can be called by the datapath daemon to perform the functions of the various logical routers, logical switches, and service providing entities.

The function call uses the content of the packet as an input argument. In some embodiments, the function call also uses the identity of the logical port through which the packet enters the corresponding logical entity as an input argument. In some embodiments, the function call also identifies an egress port, which is used to identify the ingress port of the next function call for the next pipeline stage.

In some embodiments, some of the logical entities/elements of a logical network are distributed among multiple physical machines in the datacenter, i.e., each of these host machines has a copy or instance of the distributed logical entity. A packet requiring processing by a distributed logical entity can be processed by any machine that is running an instance of the distributed logical entity. On the other hand, some of the logical entities/entities are not distributed but are instead centralized or concentrated on one physical machine, i.e., the logical entity has only one physical instance. Such a centralized routers acts as centralized point for routing packets between logical network and external routers in some embodiments. A packet requiring processing by a centralized logical entity has to be forwarded to the machine that is operating the centralized logical entity. Distributed logical routers and centralized logical routers are described in U.S. patent application Ser. No. 14/814,473, titled "Logical Router with Multiple Routing Components" and filed on Jun. 30, 2015.

A datapath daemon in some embodiments when processing an incoming packet would execute both distributed logical entities and centralized logical entities as its pipeline stages. In some embodiments, service routers (SRs) are centralized logical routers. Each service router has only one instance running on one gateway machine. A datapath daemon running on a gateway machine would therefore invoke the service router that is centralized or concentrated on the gateway machine as one of its datapath pipeline stages.

In some embodiments, the configuration data (DP configuration database) that controls the operation of a service router stage includes definitions of any services the logical router should provide, whether the logical router will be configured in active-active or active-standby mode, how many uplinks are configured for the logical router, the IP and MAC addresses of the uplinks, the L2 and L3 connectivity of the uplinks, the subnets of any southbound interfaces of the logical router, any static routes for the routing information base (RIB) of the logical router, as well as other data.

Figure 4:
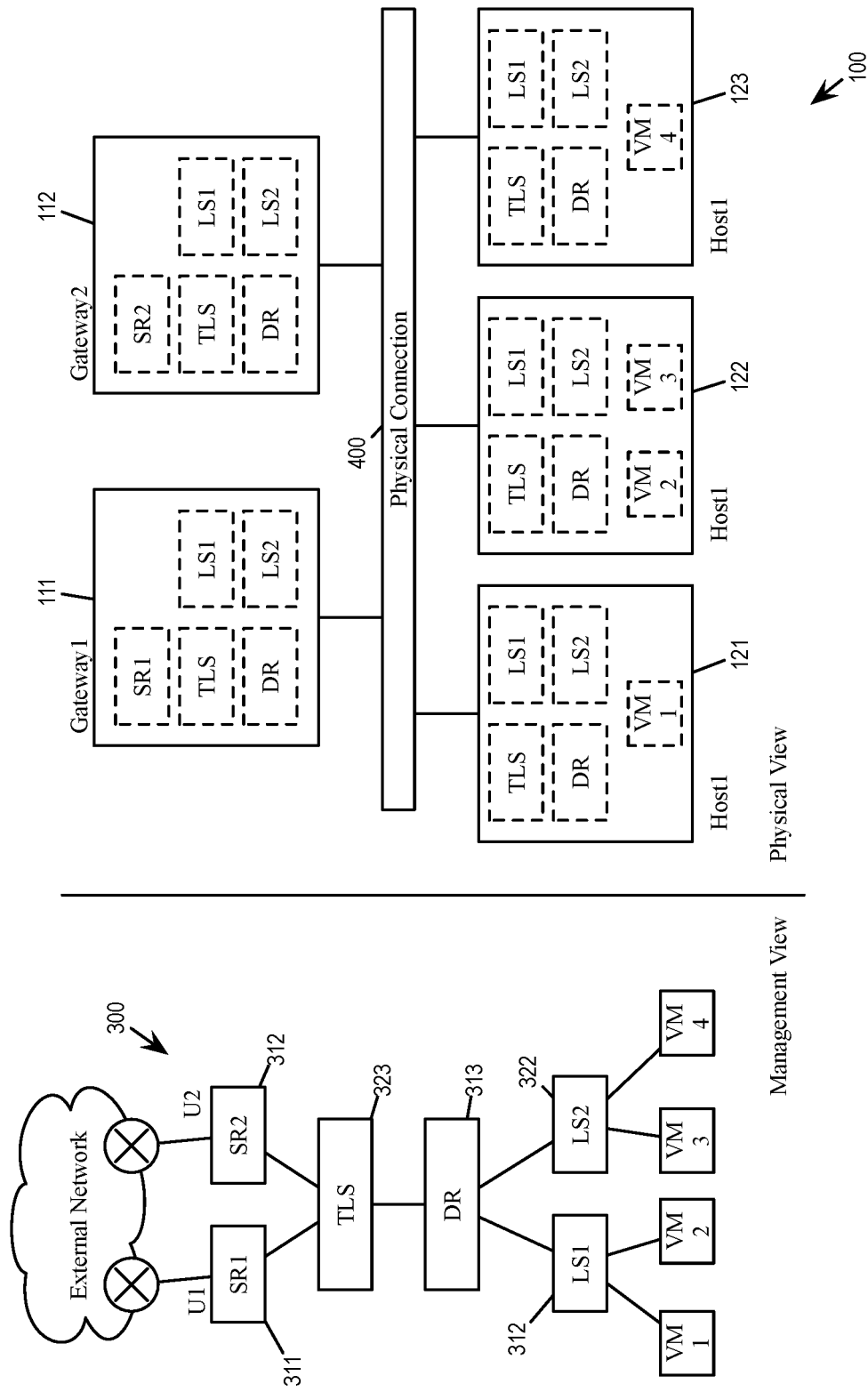
FIG. 4 illustrates a logical network with both distributed and centralized logical entities.

FIG. 4 illustrates a logical network with both distributed and centralized logical entities. Specifically, the figure illustrates a logical view and a physical view of the logical network 300. The logical view of the logical network 300 shows the logical relationship and connection between the various logical entities of the network. The physical view of the logical network 300 shows the physical instantiation of the various logical entities in the physical host machines and the physical gateways of the datacenter.

According to the logical view, the logical network 300 includes service routers 311 and 312 (SR1 and SR2), logical switches 321, 322, and 323 (LS1, LS2, and TLS), and distributed router 313 (DR). Among these logical entities, the service routers SR1 and SR2 are centralized logical entities, while LS1, LS2, TLS and DR are distributed logical entities.

Some embodiments provide a distributed logical router implementation that enables first-hop routing in a distributed fashion (rather than concentrating all of the routing functionality at the gateways). In the physical realization, the logical router of some embodiments includes a single distributed routing component (also referred to as a distributed router or a DR) and one or more service routing components (also referred to as service routers or SRs). The DR, in some embodiments, spans managed forwarding elements (MFEs) that couple directly with virtual machines (VMs) or other data compute nodes that are logically connected, directly or indirectly, to the logical router. The DR of some embodiments also spans the gateways to which the logical router is bound as well as one or more physical routers that are capable of performing routing operations. The DR of some embodiments is responsible for first-hop distributed routing between logical switches and/or other logical routers that are logically connected to the logical router. The service routers (SRs) span only the edge nodes of the logical networks and are responsible for delivering services that are not implemented in a distributed fashion (e.g., some stateful services).

The physical view of the network shows the physical instantiation of these centralized and distributed logical entities in the actual physical machines of the datacenter 100. As illustrated, the datacenter 100 includes gateways 111-112 and host machines 121-123 that are interconnected by physical connection 400. The instances of the distribute elements TLS, LS1, LS2, and DR are distributed across the gateways 111-112 and the host machines 121-123. In some embodiments, different physical instances of a distributed element operate according to a same set of forwarding tables. However, the centralized element SR1 is active only in the gateway 111 while the centralized element SR2 is active only in gateway 112. In other words, only the datapath daemon of gateway 111 executes SR1 as a pipeline stage and only the datapath daemon of gateway 112 executes SR2 as a pipeline stage.

II. Datapath and External Processes

As mentioned, though a datapath daemon is a run-to-completion thread of a processor core, some embodiments offload workload from one or more of the datapath stages from the datapath daemon to processes or threads that are external to the datapath daemon. Such processes can be performed by the same processing core that performs the datapath daemon, by a different processing core as the core that performs the datapath daemon, or by multiple processing cores. In some embodiments, the gateway is operating an operating system such as Linux that divides memory space into user space and kernel space. In some embodiments, the kernel space is reserved for running a privileged operating system kernel, kernel extensions, and most device drivers. In contrast, user space is a memory area where application software and some device drivers execute. The datapath daemon in some of these embodiments is a process operating in the user space. The user space datapath daemon dispatches packet to processes operating in the kernel space or to other processes operating in the user space in some embodiments.

In some embodiments, the datapath daemon copies packets to processes or threads outside of the datapath daemon. This packet copying operation is analogous to operations of a Switched Port Analyzer (SPAN), which mirrors packet to a port for monitoring purposes. In some embodiments, such packet replication occurs when the datapath daemon is at a particular point or stage of the datapath pipeline when processing an incoming packet. In other words, the datapath daemon mirrors packets out of the daemon before or after certain packet processing operations.

Figure 5:
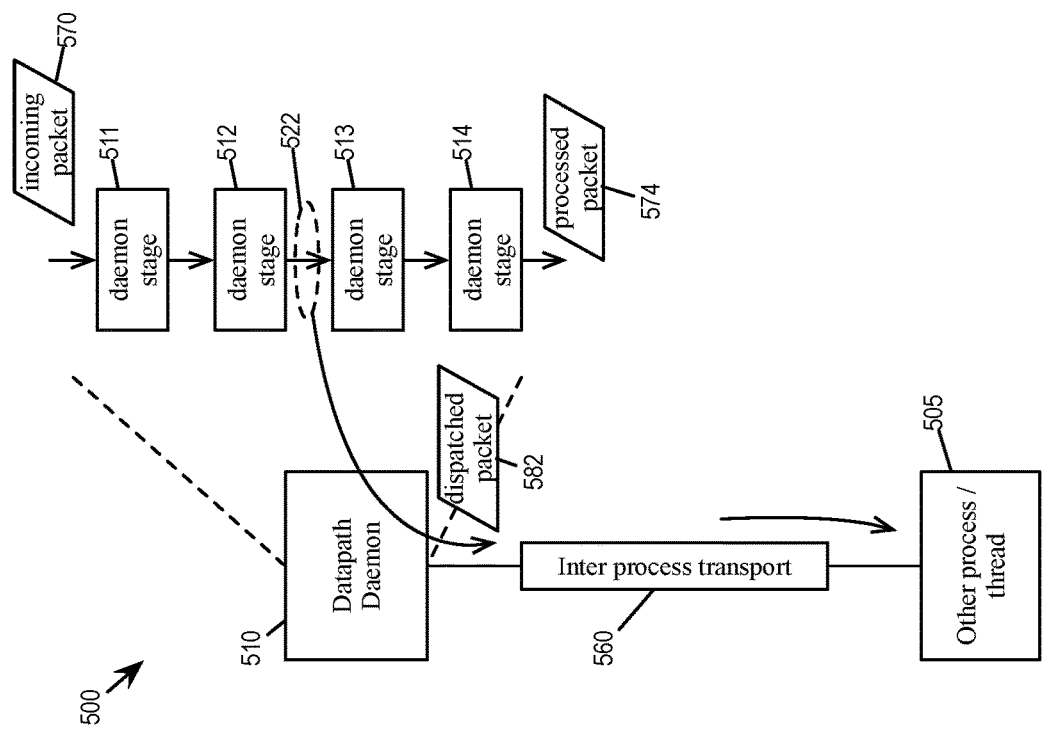
FIG. 5 illustrates a datapath daemon mirroring packets to an external process.

FIG. 5 illustrates a datapath daemon 510 mirroring packets to an external process. As illustrated, the datapath daemon 510 of a gateway machine 500 is processing an incoming packet 570 by executing pipeline stages that includes stages 511-514. Each of the daemon stages 511-514 performs certain operations such as L2 switching, L3 routing, firewall, load balancer, NAT, etc. on the incoming packets 570. Some of the stages alter the content of the packet (e.g., such as inserting VLAN tags or changing source/destination addresses). As illustrated, following the daemon stage 514, the datapath daemon produces a processed packet 574 that is the result of processing the incoming packet 570 after daemon stages 511-514.

The datapath daemon 510 also mirrors packets at a mirroring point 522 of the datapath. The mirroring point 522 is after the daemon stage 512 and before the daemon stage 513. As illustrated, the datapath daemon produces a packet 572 at the point 522, the packet 572 is the processed packet produced by the daemon stage 512. The packet 572 then continues onto stage 513 and 514 and becomes processed packet 574. The datapath daemon also copies the packet 572 to create a mirrored packet 582 at the point 522. The datapath daemon dispatches the mirrored packet 582 to another process 505 that is external to the datapath daemon 510. The dispatched packet 582 reaches the other process 505 through an inter-process transport 560.

In some embodiments, the datapath daemon of an edge gateway offloads workload by performing one or more of its stages or operations by using processes or processing threads that are external the datapath daemon. In some of these embodiments, the datapath daemon dispatches packets to those external processes at certain points of the datapath daemon. In some embodiments, the datapath daemon uses the result of the external process to execute subsequent pipeline stages. For example, in some embodiments, a gateway datapath daemon includes a L7 load balancing stage (application layer load balancer) that dispatches packet to an external process or daemon to handle the load balancing tasks before returning a resulting packet to the datapath daemon to continue subsequent stages.

Figure 6:
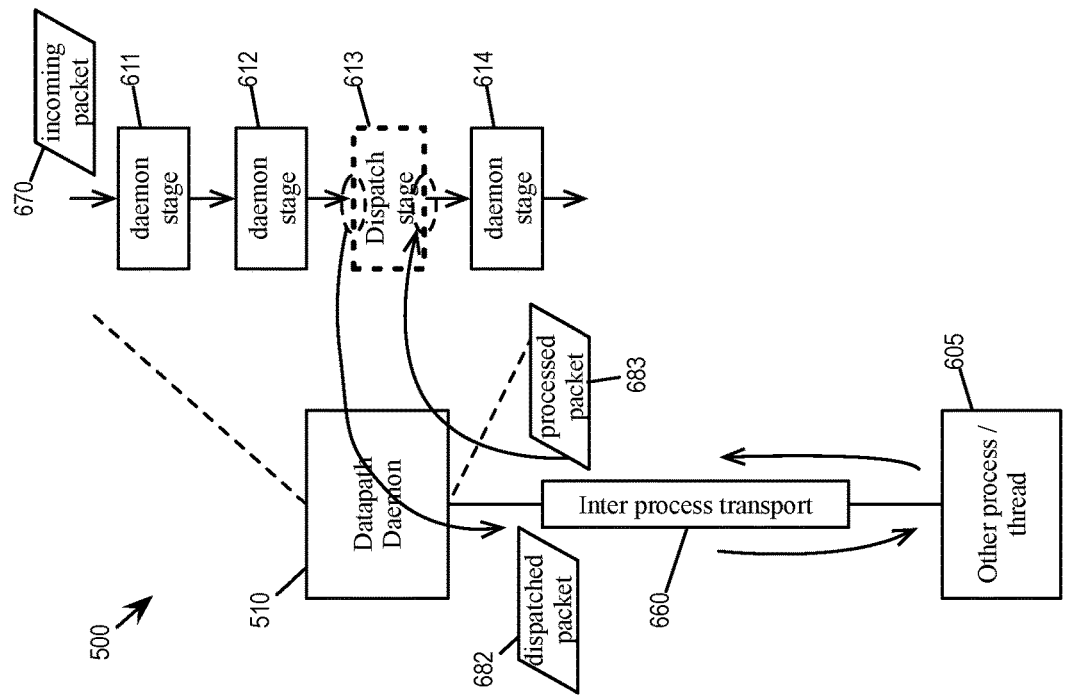
FIG. 6 illustrates a datapath daemon performing one of its stages by using an external process (or external daemon).

FIG. 6 illustrates the datapath daemon 510 performing one of its stages by using an external process (or external daemon) 605. As illustrated, the datapath daemon 510 is executing pipeline stages 611-614 for processing a packet 670. The stages 611, 612, and 614 are daemon stages that are handled by the datapath daemon. The stage 613 is a dispatch stage during which the datapath daemon 510 dispatches (or exports) a packet 682 to the external process 605 through an inter-process transport 660. The dispatched packet 682 is a packet from an output of the stage 612. The external process 605 processes the packet 682 and produces a processed packet 683, which is returned to the datapath daemon 510 through the inter-process transport 660 (or through another inter-process transport). The datapath daemon 510 uses the returned data 683 to continue execution of the datapath pipeline at the subsequent stage 614.

Though FIG. 6 illustrates a datapath daemon executing only one stage that relies on an external process, one of ordinary skill would understand that in some embodiments, there can be multiple stages in the datapath that dispatches packet to external processes or daemons for processing. For example, in some embodiments, a datapath daemon can have one stage for dispatching packets to an external L7 LB processing daemon, and another stage for dispatching packets to an external HTTPS processing daemon.

Figures 7A, 7B:
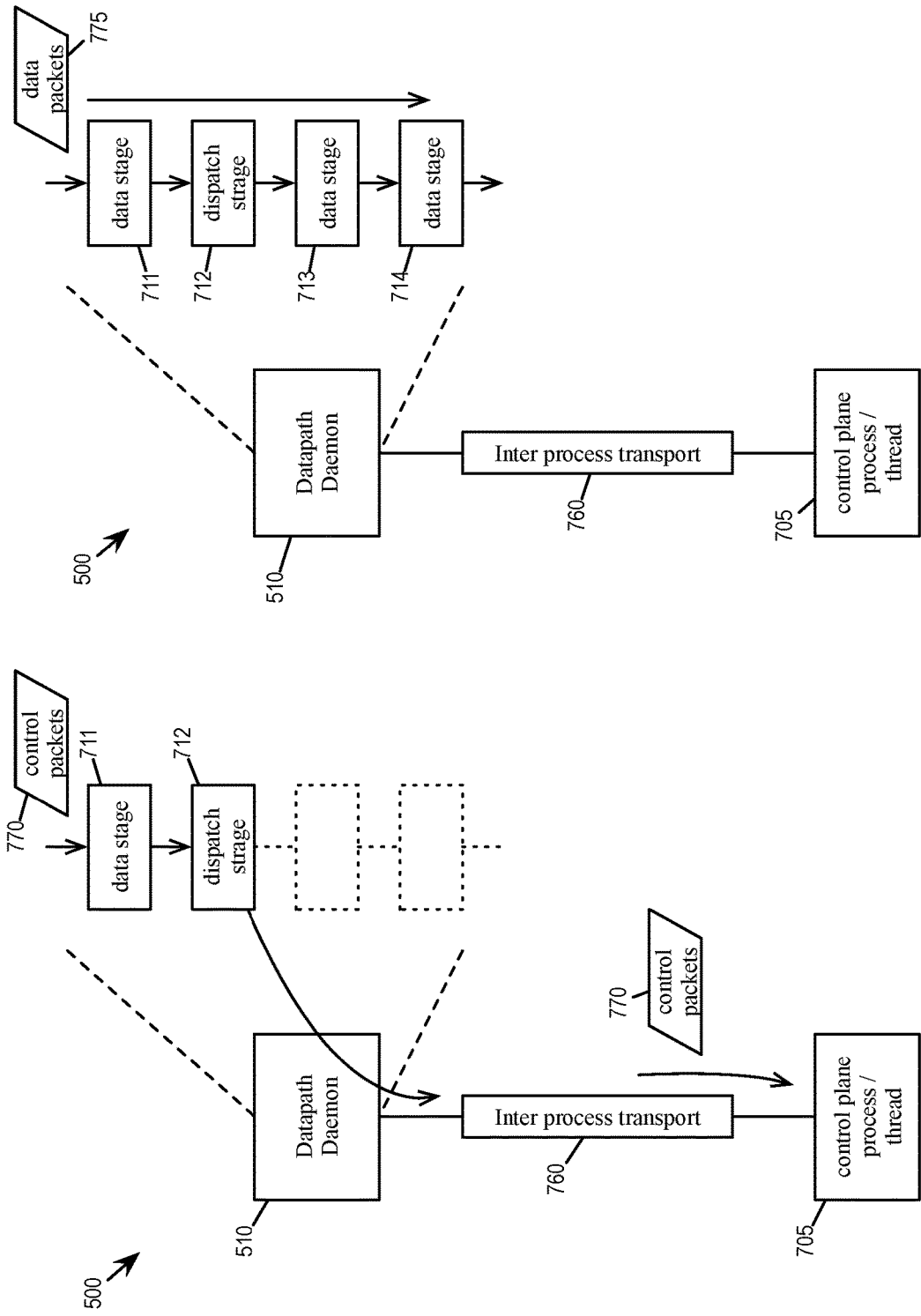
FIGS. 7a-b illustrates a datapath daemon handling an incoming packet that is destined for the control plane by dispatching the control plane packet to a control plane process.

In some embodiments, an incoming packet is a control plane packet (e.g., containing route information exchange under BGP or Border Gateway Protocol) that is destined for the control plane of the network. In some embodiments, the datapath daemon does not process the packet (as it is not a data plane packet), but rather forward it to an external control plane process, which consumes the packet. FIGS. 7a-b illustrate the datapath daemon 510 handling an incoming packet that is destined for the control plane by dispatching the control plane packet to a control plane process 705.

As illustrated, the datapath daemon 510 receives a control plane packet 770 (from e.g., an external physical router) and performs stages 711 and 712. After the datapath daemon performs some preliminary processing operations at the stage 711, it dispatches the control plane packet 770 to the control plane process 705 through an inter-process transport 760. The control plane process 705 in turn consumes the packet (by e.g., storing and distributing BGP routing information.). In some embodiments, the inter-process transport forwards the mirror packet from the datapath to a network stack process initially, and the network stack process in turn forwards the mirrored packet to the control plane process. Section III.B below further discusses the handling of control plane traffic by packet dispatch from the datapath daemon.

In some embodiments, the datapath daemon determines at one of its stages whether the packet is destined for a particular control plane process. In the example of FIG. 7a, the datapath daemon makes this determination at the dispatch stage 712. In some embodiments, such a dispatch stage is a dispatching step based on packet parsing and matching rather than an actual processing stage (as the actual processing of the stage is performed by external control plane process 705). If the packet is a packet of the particular control plane process, the daemon dispatches the packet to the control plane process 705 as illustrated in FIG. 7a. If not, the datapath daemon proceeds to perform subsequent datapath pipeline stages 713 and 714 as illustrated in FIG. 7b. In the example of FIG. 7b, the datapath daemon 510 receives another packet 775, which datapath daemon 510 determines at the dispatch stage 712 not to be a packet for the control plane process 705. Consequently, the datapath daemon does not dispatch a packet at the stage 712 but proceeds to perform stages 713 and 714.

As mentioned, in some embodiments, the gateway is operating an operating system that divides memory space into user space and kernel space. In some embodiments, both the datapath daemon and the external process are user space processes, and the inter-process transport (550 or 750) needed for sending packets from the datapath daemon to the external process are simply shared memory structures such as rings buffers in the user space. In some embodiments, the datapath daemon is a user space process while the external process is either a kernel space process or a user space process that communicates with the datapath daemon through kernel space process or processing thread such as a network protocol stack (e.g., TCP/IP stack.) In some of these embodiments, datapath daemon uses user-kernel data transport mechanism such as KNI (Kernel NIC Interface) or TUN/TAP virtual network kernel devices to transport packets between the user space datapath daemon and the external process (e.g., through the kernel network stack).

A network stack, or a protocol stack is an implementation of a computer networking protocol suite. It is therefore also referred to as a TCP (Transmission Control Protocol) stack. In some embodiments, the operating system (such as Linux) of the gateway machine provides a network stack as a processing thread that operates in the kernel space. In a machine that does not implement the datapath daemon of the current invention, the network stack is responsible handling the network protocols of packets being received and transmitted by a NIC. In some embodiments that do implement a datapath daemon, the network stack handles packets from the datapath daemon through a user-kernel transport (e.g., KNI) as if the transport is a NIC.

TUN and TAP are virtual network kernel devices that are backed up by hardware network adapters. TUN simulates a network layer device and it operates with layer 3 packets like IP packets. TAP simulates a link layer device and it operates with layer 2 packets like Ethernet frames. Packets sent by an operating system via a TUN/TAP device are delivered to a user space program that attaches itself to the device. A user-space program may also pass packet into a TUN/TAP device. In this case the TUN/TAP device delivers or injects these packets to the operating system network stack (TCP/IP stack) thus emulating their reception from an external source.

KNI is provided by DPDK® (Data Path Development Kit) in order to allow user space applications access to the Linux kernel. It allows management of DPDK ports using standard Linux net tools such as ethtool, ifconfig, and tcpdump. It also functions as a NIC for receiving and transmitting packets for the kernel network stack.

Figure 8:
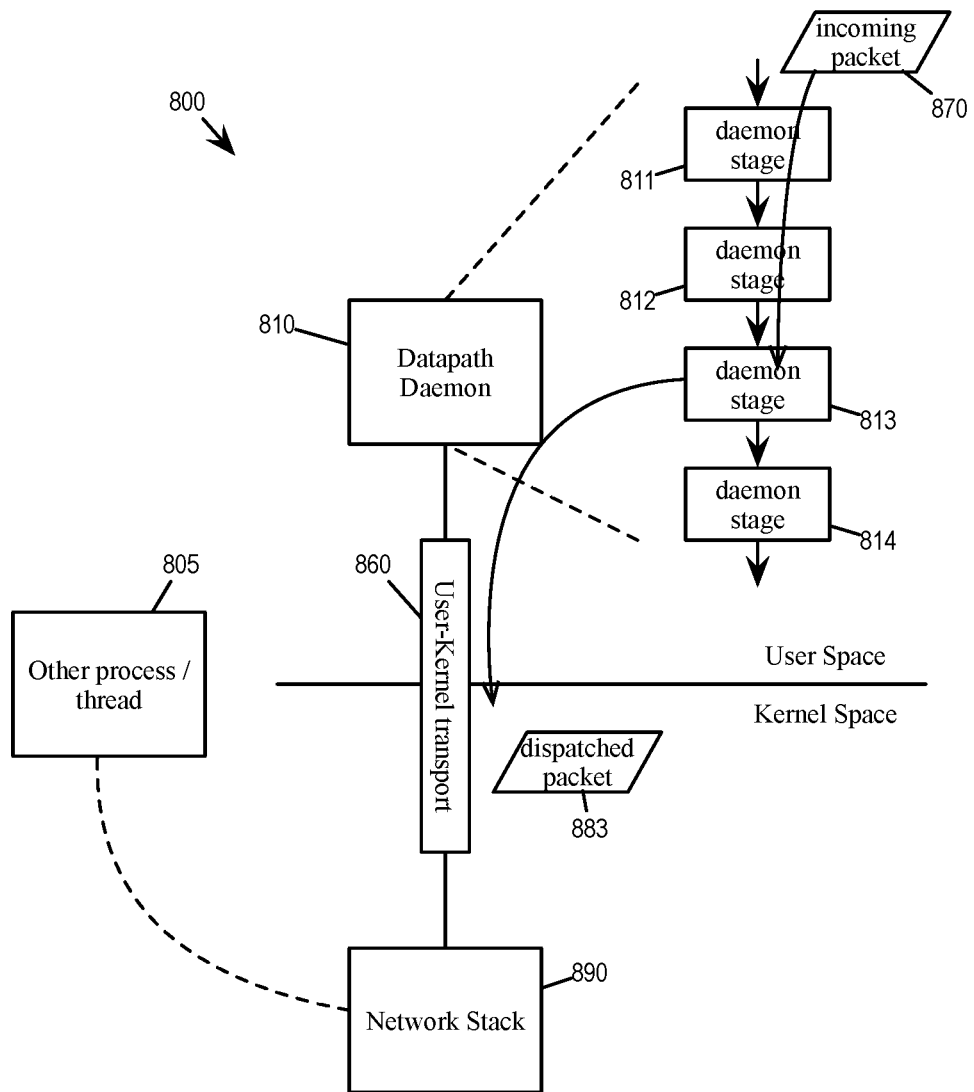
FIG. 8 illustrates a user space datapath daemon that communicates with a kernel network stack through a user-kernel transport and a network stack.

FIG. 8 illustrates a user space datapath daemon 800 that communicates with a kernel network stack 890 through a user-kernel transport 860 and a network stack 890. The data path daemon is 800 is performing several stages 811-814 for processing a packet 870. The user-kernel transport 860 receives a packet 883 dispatched from the stage 813 (i.e., when the datapath is performing the stage 813), and the dispatched packet 883 is delivered to the network stack 890.

The network stack 890 is in the kernel space of the operating system. The kernel network stack 890 processes the dispatched packet 883 and makes it ready for consumption by other processes in the machine such as a user space process 805 that is external to the datapath daemon 810 (i.e., not part of the run-to-completion thread). In some embodiments, the user space process is in a namespace that the network stack 890 is able to deliver packet to. In some embodiments, the external process 805 is a control plane process that consumes the dispatched packet and does not return a result packet back to the datapath daemon as described above by reference to FIG. 7*a*-*b*. In some embodiments, the external process 805 is a data plane process that returns a resulting packet back to the datapath daemon 810 to continue processing as described above by reference to FIG. 6.

Figure 9:
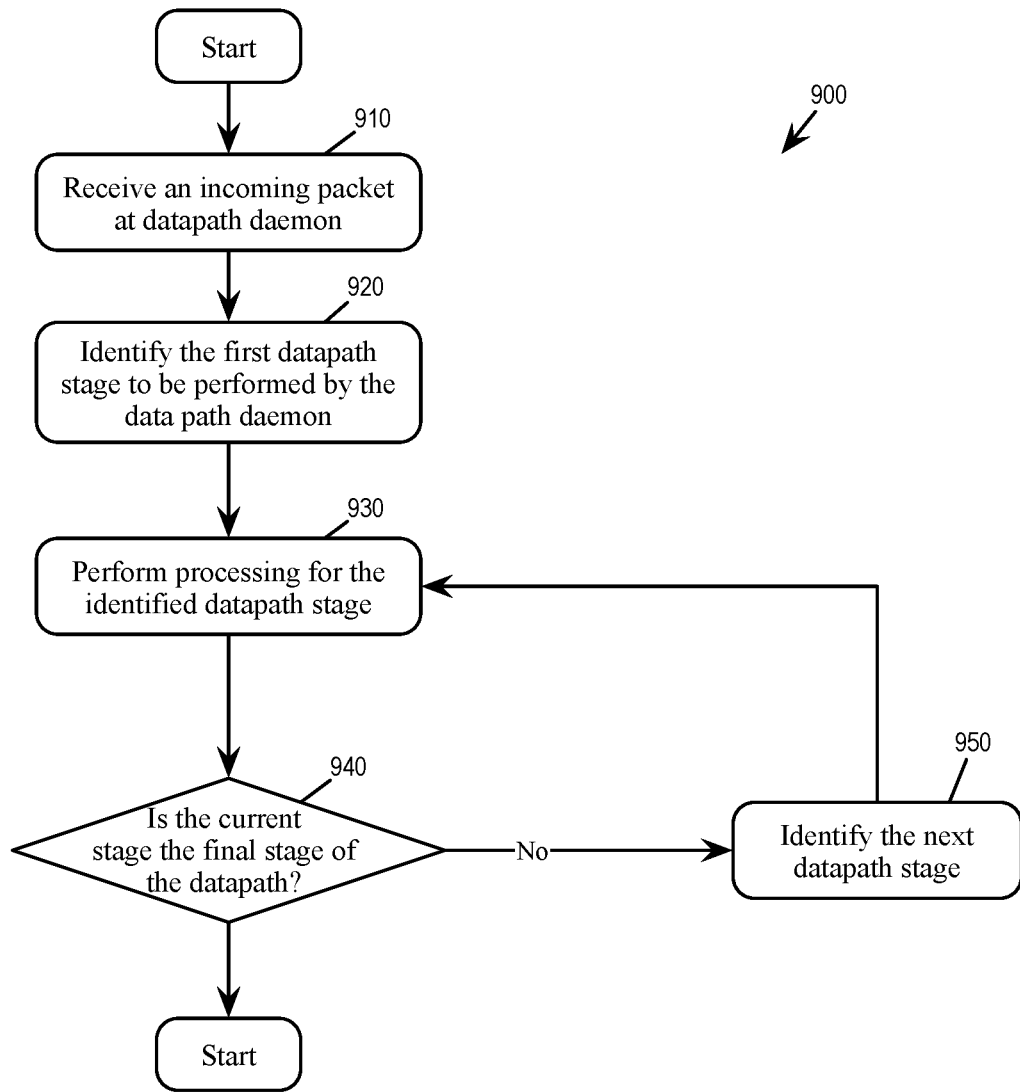
FIG. 9 conceptually illustrates a process for performing a gateway datapath.

FIG. 9 conceptually illustrates a process 900 for performing a gateway datapath. In some embodiments, the process performs the stages of a datapath at the datapath daemon while dispatching packets to a process or processing thread external to the datapath daemon. The process is performed by the processing unit(s) of the gateway machine in some embodiments. The process 900 starts when the gateway machine receives (at 910) an incoming packet from the network. This packet can be a northbound packet leaving the datacenter through the gateway for an external network (e.g., external physical network 190), or a southbound packet entering the logical networks of the datacenter through the gateway. In some embodiments, the gateway machine has a user space poll mode driver that polls the queues of the physical NIC for receiving the incoming packets.

The process then identifies (at 920) the first datapath stage to be performed by the datapath daemon. In some embodiments, the process identifies the next datapath stage based on the configuration data stored in the DP configuration database (i.e., 230) and the content of the incoming packet. The identification of a datapath pipeline stage is further described in in Section I above.

Next, the process performs (at 930) the packet processing of the identified datapath stage. In some embodiments, the datapath stage can be a stage that is performed entirely by the datapath daemon (i.e., part of the run-to-completion thread), such as the stages 611 and 612. In some embodiments, the datapath stage can be a dispatch stage (such as the stage 613) that dispatches packets to be processed by another process or daemon that is external to the datapath daemon (i.e., not part of the run-to-completion thread) through an inter-process transport (e.g., the inter-process transport 560 or the user-kernel transport 860). In some embodiments, the process dispatches a packet to an external process by redirecting the packet away from the datapath daemon, i.e., the packet flows to the other process rather than through the datapath daemon, and the datapath daemon stops processing the packet (at least until the external process returns a resulting packet to the datapath daemon). In some embodiments, the process dispatches a packet to an external process by mirroring or replicating a packet that flow through a specified logical port or logical entity to the external process. The operations of 930 are further described below by reference to the process 1000 of FIG. 10, the process 1400 of FIG. 14, the process 1600 of FIG. 16, the process 2200 of FIG. 22, and the process 2400 of FIG. 24.

The process then determines (940) whether the current datapath stage is the final stage of the datapath for this packet. If the current datapath stage is the last stage of the datapath, the process 900 ends. If the current datapath stage is not the last stage of the datapath, the process identifies (at 950) the next datapath stage to be performed (based on e.g., the DP configuration database) and returns to 930.

In some embodiments, the processed packet is a control plane packet that is handled by a control plane process rather than by the data plane. For such packets, the process 900 would end without producing any packets, because the control plane packet has already been transported to the corresponding control plane process through the inter-process transport. On the other hand, if the processed packet is a data plane packet, the process 900 would produce an output packet that is to be forwarded to a next hop machine when it ends.

Figure 10:
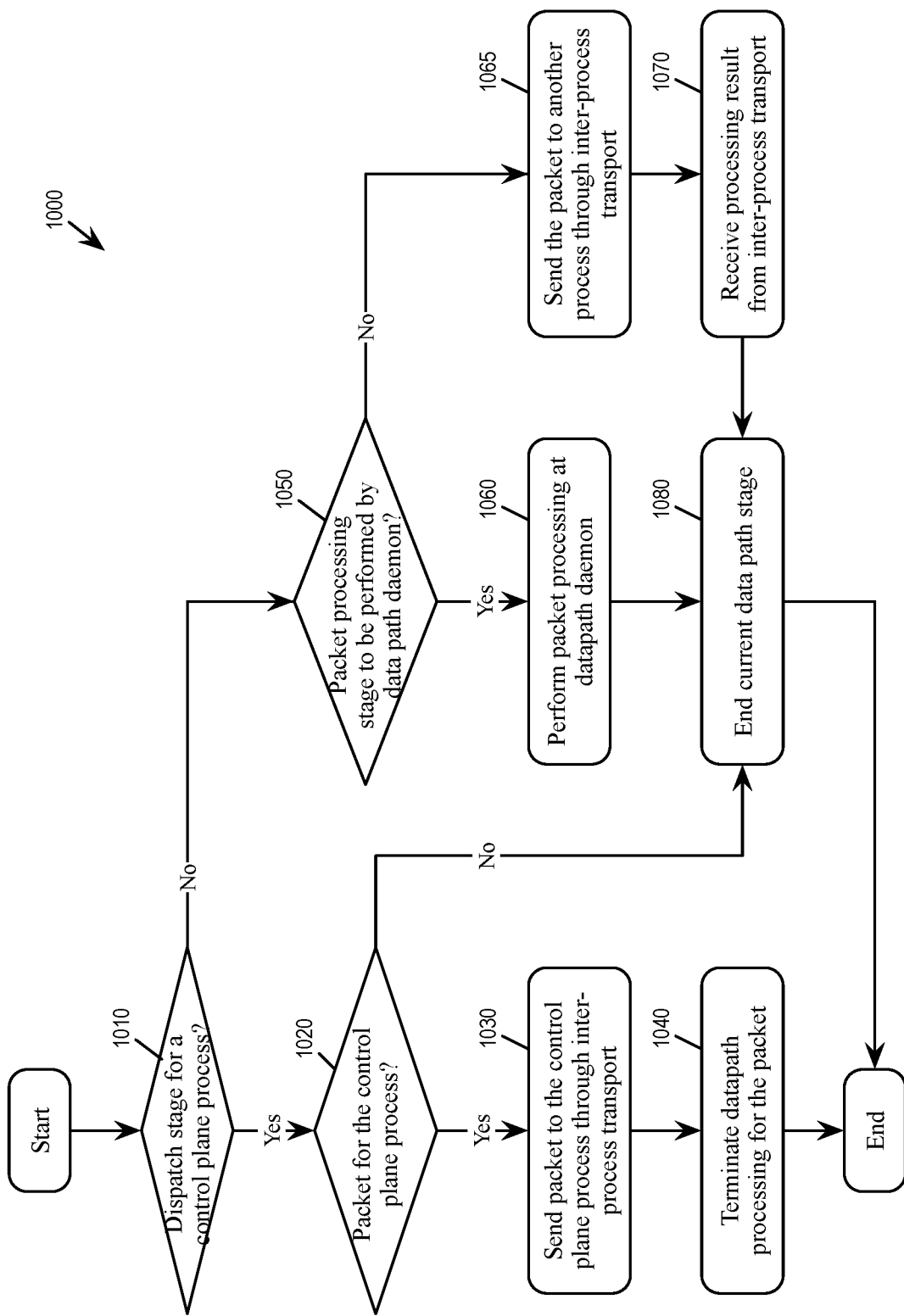
FIG. 10 conceptually illustrates a process for performing a datapath stage.

FIG. 10 conceptually illustrates a process 1000 for performing a datapath stage. Some embodiments perform the process 1000 when the gateway datapath process 900 performs the operation 930 to process an incoming packet.

The process 1000 starts by determining (at 1010) whether the datapath stage is a dispatch stage for a control plane process (e.g., 712), i.e., if this is a stage that examines whether the packet should be further handled by the datapath daemon. In some embodiments, the dispatch stage receives the incoming packet after it has already been processed by one or more previous datapath pipeline stages. If the stage is a dispatch stage for a control plane process, the process proceeds to 1020. Otherwise the process proceeds 1050.

At 1020, the process examines the packet for determining whether the incoming packet is a control plane packet of the control plane process targeted by the dispatch stage. For example, if the dispatch stage is for dispatching packets to a BGP control plane daemon, the process 1000 would determine whether the control plane packet is a BGP packet. If the packet is a control plane packet of the control plane process targeted by the dispatch stage, the process proceeds to 1030. If the packet is not a control plane packet of the control plane process targeted by the dispatch stage, e.g., if the packet is a data plane packet, or if the packet is a control plane packet that is not targeted by this dispatch stage, the process proceeds to 1080.

At 1030, the process sends the packet to the corresponding control plane process through the inter-process transport. In some embodiments, the control plane process requires the packet to first be processed by a network protocol stack. For some embodiments in which the network stack is a processing thread operating in the kernel space, the process 1000 would dispatch the packet to the network stack through a user-kernel transport (such as KNI or TUN/TAP). The process 1000 then proceeds to 1040 to terminate the datapath processing of the packet and ends.

At 1050, the process determines whether the packet processing stage is to be performed by the datapath daemon or is to be performed by a process or processing thread outside of the daemon. If the packet processing stage is to be performed by the datapath daemon, the process proceeds to 1060. If the packet processing stage is to be performed by an external process, the process proceeds to 1065. In some embodiments, whether a stage is to be performed by the daemon or by an external process is determined by the configuration data in DP configuration database, or alternatively by the programming of the datapath daemon.

At 1060, the process performs packet processing of the datapath stage at the datapath daemon, i.e., as part of the run-to-completion thread. Upon completion of the processing stage, the process then proceeds to 1080.

At 1065, the process has determined that the datapath stage is to be performed by an external data plane process. The process 1000 then sends the packet to the external data plane process through an inter-process transport. In some embodiments, the external data plane process requires the packet to first be processed by a network protocol stack. For some embodiments in which the network stack is a processing thread operating in the kernel space, the process 1000 dispatches the packet to the network stack through a user-kernel transport (such as KNI or TUN/TAP). The process then receives (1070) the resulting processed packet from the external data plane process. In some embodiments, this resulting processed packet is received from an inter-process transport by using the kernel network stack. The process then proceeds to 1080.

At 1080, the process completes the processing of the current datapath stage and ends. Upon completion of the process 1000, some embodiments proceeds to the next stage of the datapath pipeline at the datapath daemon, or alternatively ends the datapath daemon processing of the packet if the current stage is the last stage in the datapath pipeline.

III. Mirroring Packets to Network Stack

As mentioned, in some embodiments, the operating system of the gateway machine provides a network protocol stack as a processing thread in its kernel space. Such a network stack is normally used to handle network protocols for packets at a NIC of the gateway machine. Rather than implementing another network protocol stack in the user space, some embodiments leverages the existing kernel network stack to perform various operations. Some embodiments mirrors or copies packets flowing through various points of the datapath and send the mirrored packets to a kernel network stack through user-kernel transport (such as KNI), which is treated as a NIC by the kernel network stack. Once the packet reaches the kernel network stack, the gateway machine is able to utilize the functionalities of the kernel stack as if the datapath packet is directly provided by the physical NIC.

Some embodiments dispatch packets from the datapath daemon to other user space processes. In some embodiments, these user space processes are for processing control plane packets of the network such as BGP packets. These packets are not to be forwarded in the data plane, but are instead used by control plane processes such as configuring routing tables.

As mentioned above by reference to FIGS. 7a-b, datapath daemon in some embodiments forwards these control plane packets to their corresponding control plane processes by packet dispatching from the datapath daemon. Specifically, the packets are dispatched to the network stack from the datapath daemon through user-kernel transport, and the network stack in turn forwards the packet to its corresponding control plane process. In some embodiments, a control plane packet (such as BGP packet) has identifiers that are recognizable by the network stack so the network stack can deliver the packet to the corresponding control plane user process.

In some embodiments, the control plane process is regarded as being performed by a logical entity in the logical network, specifically in the service router. In some embodiments, the datapath has a dispatch stage that corresponds to the control plane process. In some embodiments, such a stage is for determining whether the packet is for the control plane process or not. For example, in some embodiments, the datapath's service router includes a BGP dispatch stage for determining whether the incoming packet is a BGP packet. If so, the datapath daemon terminates processing of the packet (i.e., bypassing subsequent datapath stages) and let the BGP process consumes the BGP packet and performs the corresponding BGP operations.

FIGS. 11a-b illustrates a datapath daemon 1110 that forwards BGP packets to a BGP daemon 1105 that is external to the datapath. FIG. 11a illustrates the datapath daemon processing a data plane packet 1171. For processing the packet 1171, the datapath daemon executes several pipeline stages 1111-1116. Among these, the stage 1112 is a BGP stage. The BGP stage 1112 does not perform BGP control plane operations, but it is a dispatch stage during which the datapath daemon examines the incoming packet to determine whether it is a BGP packet. In the example of FIG. 11a, the packet 1171 is a data plane packet that is destined for the L2 segment of logical switch A (LS-A). The datapath daemon therefore does not stop at the BGP stage 1112 but instead continues to execute all the way through to stage 1116, which correspond to LS-A.

FIG. 11b illustrates the datapath daemon 1110 processing a BGP packet 1172. For processing the packet 1172, the datapath daemon 1110 excutes an initial pipeline stage 1111 and then the BGP stage 1112. Since the packet 1171 is a BGP packet, the datapath daemon stops executing and let the BGP daemon 1105 process the BGP packet in order to learn routes from an external router.

As illustrated, the datapath daemon 1110 dispatches the BGP packet to the BGP daemon through a user-kernel transport 1160 and a kernel network stack 1190. In some embodiments, this dispatching occurs when the datapath daemon 1110 is executing the BGP dispatch stage 1112. In some embodiments, the BGP stage 1112 is part of a service router stage 1120, and the datapath daemon dispatches all packets from the uplink and downlink interfaces of the service router 1120 to the kernel network stack 1190. The network stack in turn processes the dispatched packets and delivers any BGP packets to the BGP daemon 1105.

Figure 12:
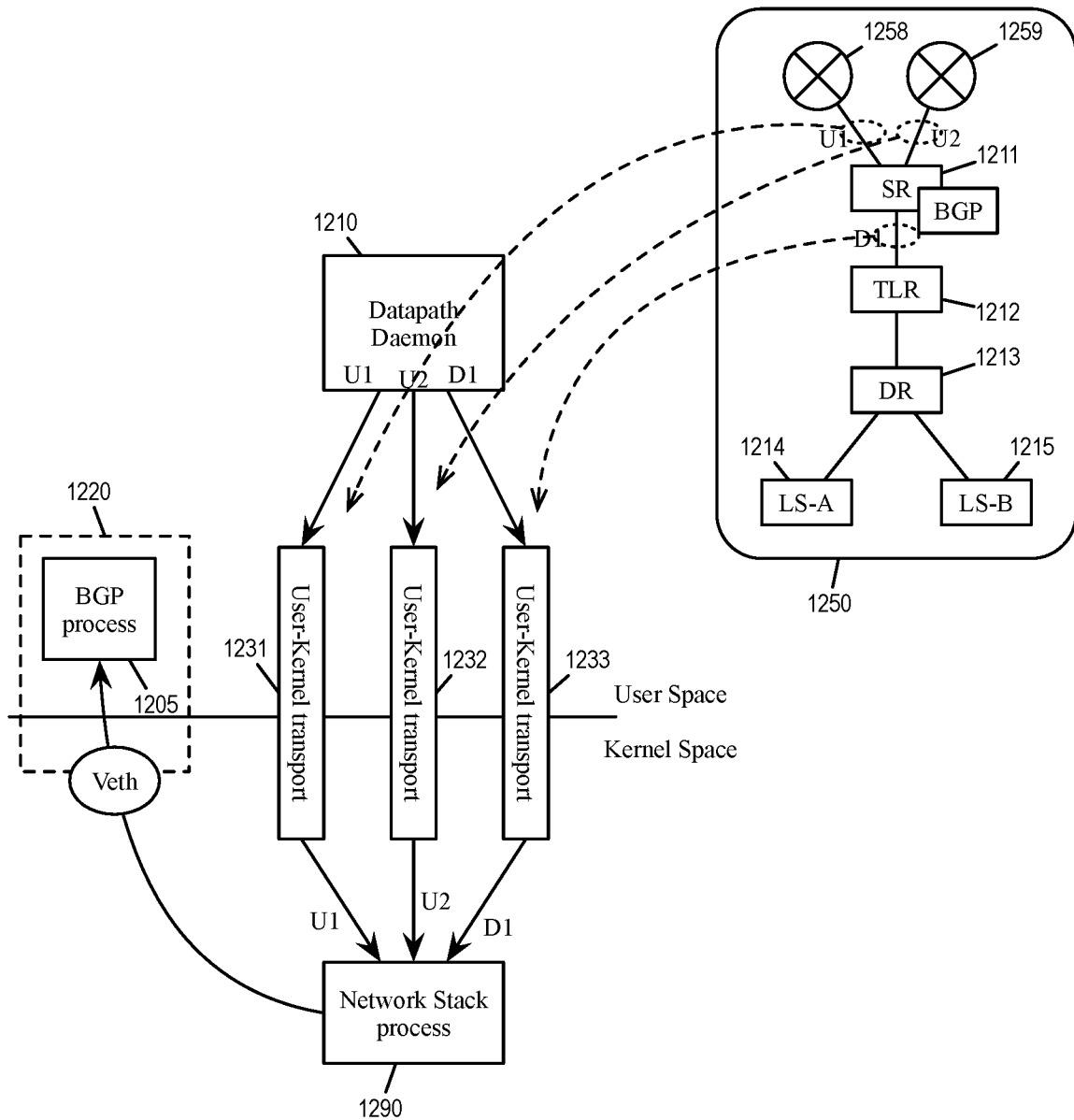
FIG. 12 illustrates the mirroring of packets from a datapath daemon to a BGP daemon.

FIG. 12 illustrates the dispatching of packets from a datapath daemon to a BGP daemon. As illustrated, a gateway 1200 is executing a datapath daemon 1210 while dispatching BGP control plane packets to a control plane process 1205. The BGP control plane process 1205 is external to the datapath daemon, and the dispatched packets are forwarded to the BGP control plane process 1205 (BGP daemon) by a kernel space network stack 1290. The BGP packets have identifiers that are recognizable by the network stack 1290 so the network stack can deliver them to the BGP daemon 1205. As illustrated, the BGP daemon 1205 is within its own namespace 1220, and the network stack delivers the BGP packets to the BGP process through the virtual interfaces (e.g, Veth0 or Veth1) of the name space 1220.

The datapath stages of the daemon 1210 correspond to logical entities of a logial network 1250, which includes a service router (SR) 1211, a transit logical router (TLR) 1212, a distributed router (DR) 1213, a logical switch for L2 segment A (LS-A) 1214, and a logical switch for L2 segment B (LS-B) 1215. The service router 1211 has two uplinks U1 and U2 for connecting to external physical routers 1258 and 1259 as well as a downlink D1 for connecting to the TLR 1212.

Logically, the service router 1211 supports BGP exchange, though the datapath daemon 1210 dispatches BGP packets to a BGP process 1205, which is performed outside of the datapath daemon 1210 as illustrated. For some embodiments in which control plane operations are (logically) handled by the service router, each of service router's interfaces is assigned a user-kernel transport for dispatching packets to the network stack 1290. In the example of FIG. 12, the service router 1211 has three interfaces that correspond to the uplink U1, the uplink U2, and the downlink D1. The datapath daemon 1210 has at least three user-kernel transports 1231-1232 for dispatching packets from these three interfaces to the kernel network stack 1290, and therefrom to the BGP process 1205 in user space. In some embodiments each uplink of the service router gathers its own set of the BGP routing information from its own corresponding external physical router (1258 for U1 and 1259 for U2) so the BGP process 1205 would be able to identify BGP routing information from different physical routers.

Figure 13:
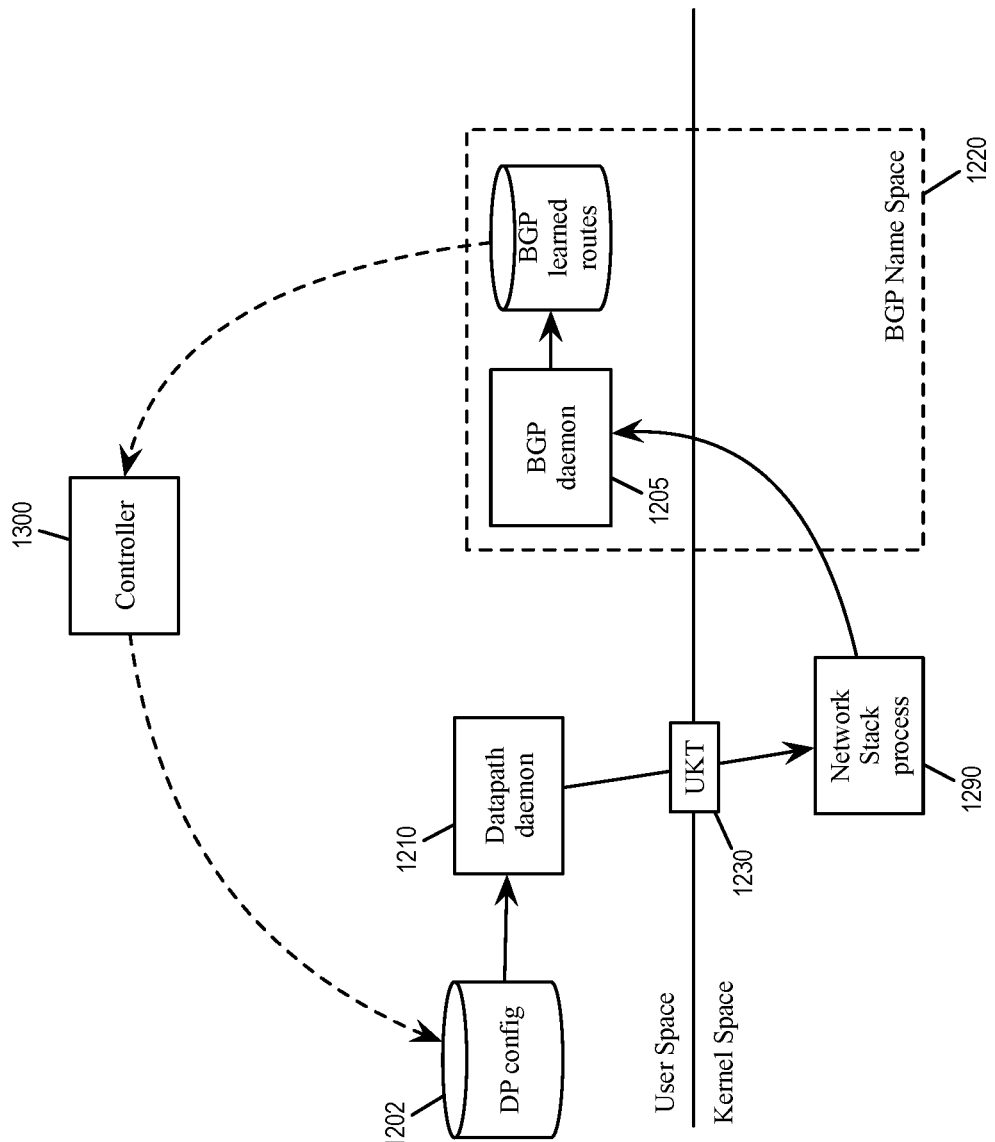
FIG. 13 illustrates the configuring of a datapath daemon by BGP routes learned by BGP control plane processes external to the dataphat daemon.

In some embodiments, BGP routing information gathered by the BGP process is used to program the routing tables and forwarding tables of the datapath daemon. FIG. 13 illustrates the configuring of a datapath daemon by BGP routes learned by BGP control plane processes external to the datapath daemon. The figure illustrates a network controller 1300 that fetches the routes learned by the BGP process 1205 and configures the datapath daemon 1210 by programming the learned routes into the DP configuration database 1202. The learned BGP routes are gathered from the BGP packets delivered to the BGP namespace 1220 by the kernel network stack 1290, which receives the BGP packets from the datapath daemon 1210 through the user-kernel transports 1230.

Figure 14:
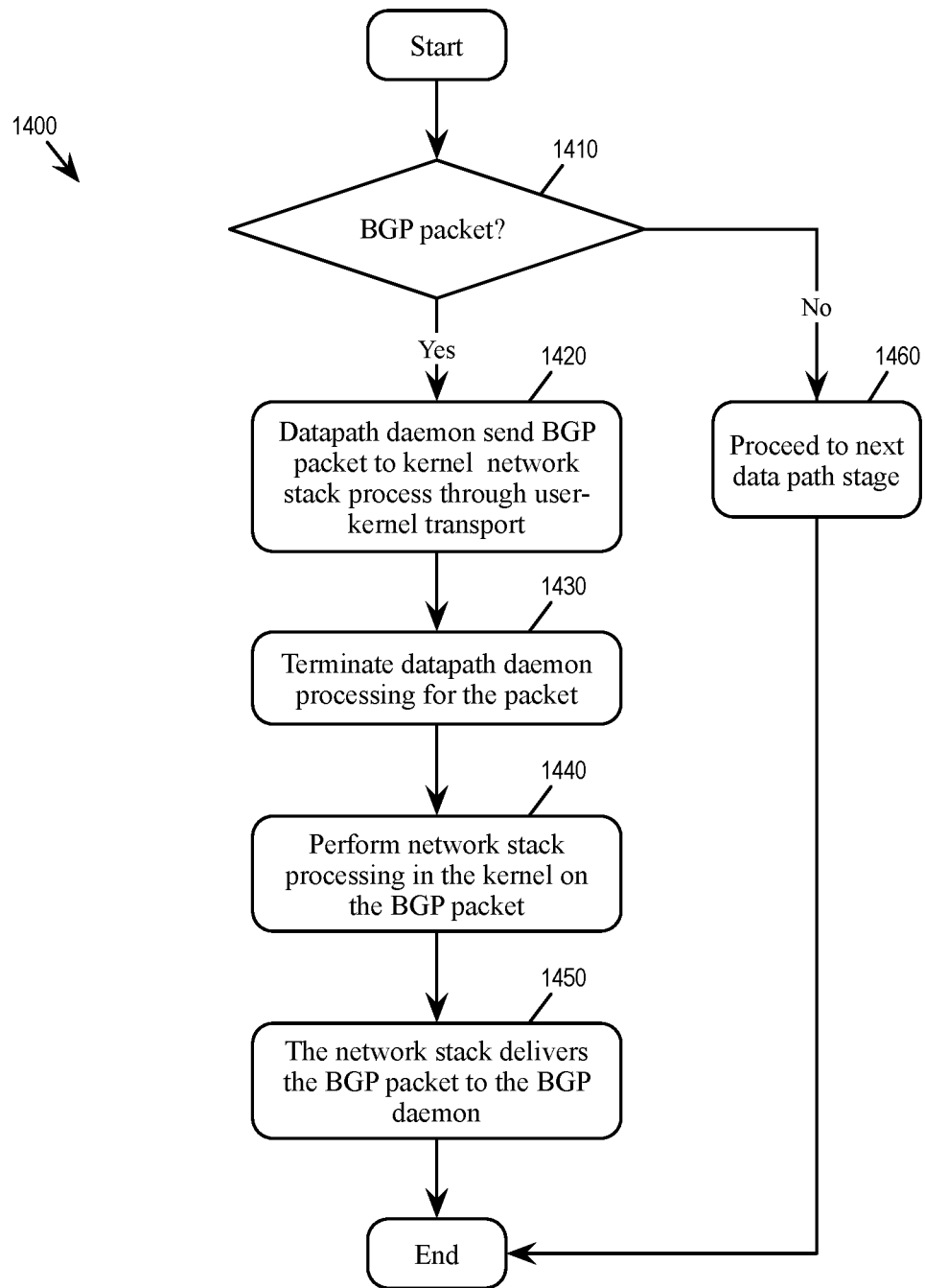
FIG. 14 conceptually illustrates a process by which the datapath daemon sends control plane packet to an external control plane process.

FIG. 14 conceptually illustrates a process 1400 by which the datapath daemon sends control plane packet to an external control plane process. The description of the process uses BGP as example, but one of ordinary skill would understand the process 1400 is a general process that is applicable to other types of control plane traffic as well. In some embodiments, the gateway machine performs the process 1400 by using one or more processing threads in user space and in kernel space. Some embodiments perform the process 1400 when the gateway datapath process 900 performs the operation 930 to process an incoming packet.

The process 1400 starts when the datapath daemon receives a packet and has performed certain preliminary processing on the packet. For some embodiments in which the datapath daemon includes a dispatch stage for a particular control plane process (e.g., the BGP stage 1112 performed by the datapath daemon 1110), the process starts when the packet has reached the dispatch stage for the control plane process.

The process determines at 1410 whether the packet is a BGP packet, i.e., if the packet is a control plane packet of the type that corresponds to the control plane stage in the datapath. In some embodiments, this determination is made based upon identifiers available within the packet, such as transport protocol, IP addresses, etc. If the packet is not a BGP packet (e.g., a data plane packet or a control plane packet that is not a BGP packet), the process proceeds to 1460 for the datapath daemon to execute the next processing stage. If the packet is a BGP packet, the process proceeds to 1420.

At 1420, the process sends the BGP packet from the datapath daemon to the kernel network stack through a user-kernel transport (e.g., the transports 1231-1233). The process then terminates (at 1430) datapath processing of the incoming packet at the datapath daemon since the packet is not a data plane packet.

Next, the process performs (at 1440) network stack processing on the BGP packet, based on which the kernel network stack delivers (at 1450) the BGP packet to the BGP control plane process. In some embodiments, the BGP control plane process is a BGP daemon that operates within a BGP namespace, and the namespace has virtual interfaces that receive packets from the kernel network stack. The process 1400 then ends.

IV. External Data Path Processing

In some embodiments, not all datapath tasks are performed by the datapath daemon. Specifically, the datapath daemon in some embodiments offloads workload by exporting/dispatching packets to an external data plane process for some of the datapath stages. In some embodiments, the external data plane process would transport the resulting processed packet back to the datapath daemon to continue datapath processing. Exporting packets from the datapath daemon to an external process and importing result to continue datapath is described by reference to FIG. 6 above.

A. Higher Level Data Plane Traffic

In some embodiments, datapath operations at lower layers of the network protocol model are processed by the datapath daemon within its run-to-completion thread, while datapath operations at higher layers of the network protocol model are processed by data plane processes external to the datapath daemon. In some embodiments, application layer (L7) datapath stages are performed by external data plane processes, while transport layer (L4), network layer (L3), and data link layer (L2) datapath stages are performed by the datapath daemon itself. For example, some embodiments use the datapath daemon to perform Layer 4 load balancer (L4 LB) operations while dispatching packets to a separate Layer 7 load balancer (L7 LB) process for performing application layer load balancing.

In some embodiments, L4 load balancing operates at the intermediate transport layer, which deals with delivery of messages with no regard to the content of the messages. Transmission Control Protocol (TCP) is the L4 protocol for Hypertext Transfer Protocol (HTTP) traffic on the Internet. L4 load balancer simply forward network packets to and from the upstream server without inspecting the content of the packets. They can make limited routing decisions by inspecting the first few packets in the TCP stream.

In some embodiments, L7 load balancing operates at the high-level application layer, which deals with the actual content of each message. HTTP is the predominant L7 protocol for website traffic on the Internet. L7 load balancers route network traffic in a much more sophisticated way than L4 load balancers, particularly applicable to TCP-based traffic such as HTTP. A L7 load balancer terminates the network traffic and reads the message within. It can make a load-balancing decision based on the content of the message (the URL or cookie, for example). It then makes a new TCP connection to the selected upstream server (or reuses an existing one, by means of HTTP keep-alives) and writes the request to the server.

Some embodiments uses data plane processes external to the datapath daemon to handle higher layer network processing because higher layer processes are less robust than lower layer processes, i.e., higher layer data plane processes are more likely to crash the entire datapath if performed by the datapath daemon. Having a separate data plane process (e.g., a L7 LB process) to perform higher layer data plane operations provide fault isolation for some embodiments. In some embodiments, the external data plane process operates in the user space of its own namespace to further segregate itself from other user space processes such as the datapath daemon.

Figure 15:
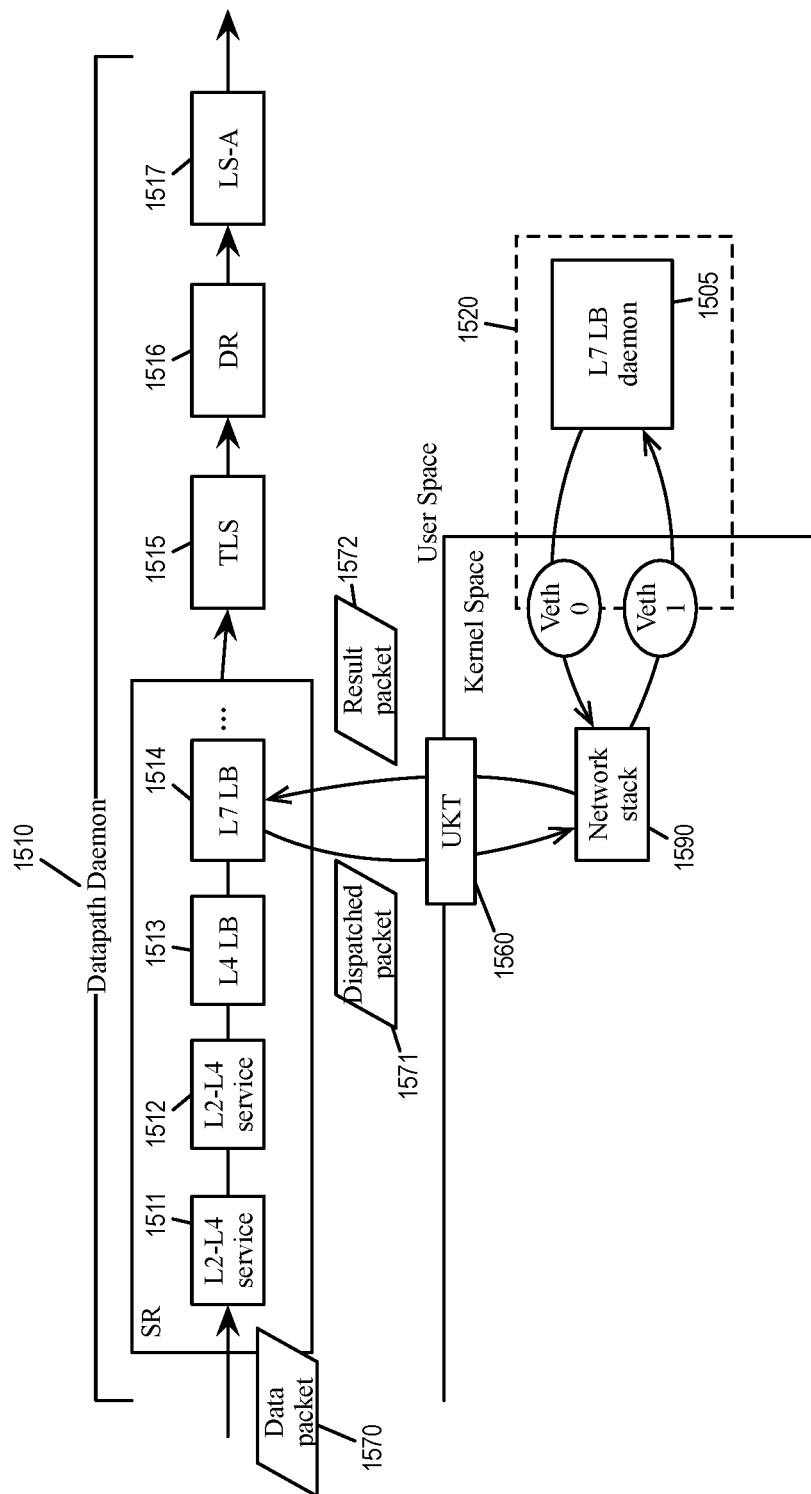
FIG. 15 illustrates a datapath daemon that uses external data plane processes to perform operations for some of the datapath stages.

FIG. 15 illustrates a datapath daemon 1510 that uses external data plane processes to perform operations for some of the datapath stages. As illustrated, the datapath daemon is processing a data packet 1570, for which the datapath daemon executes datapath stages 1511-1517. Among these, the datapath stages 1511-1514 are service stages that are logically performed by a service router (SR). As illustrated, the service stages 1511 and 1512 are services at layer 2 through layer 4 of the networking protocol. These L2-L4 service stages can include firewall, network address translation (NAT), etc. The service stage 1513 is a L4 load balancer, while the service stage 1514 is a L7 load balancer.

The datapath daemon 1510 performs service stages 1511-1513, including the L4 LB stage 1513, without resorting to external processes. However, the L7 LB stage 1514 is a dispatch stage that does not perform the actual L7 LB operations but instead exports the packet to an external L7 LB process 1505. As illustrated, the datapath daemon 1510 exports a packet 1571 through a user-kernel transport 1560 to a kernel network stack 1590. The packet 1571 is dispatched from the output of the previous stage (in this case the stage 1513) when the datapath daemon reaches the L7 LB dispatch stage 1514 in its execution.

The transported packet 1571 is processed by the kernel network stack 1590 and delivered to the external L7 LB process (or L7 LB daemon) 1505. The L7 LB daemon is a user space process that operates within its own namespace 1520. The namespace 1520 has an ingress virtual interface Veth0 for receiving packets from the network stack 1590 and an egress virtual interface Veth1 for sending packets to the network stack 1590. The L7 LB daemon 1505 performs L7 LB operations based on the dispatched packet 1571 to produce a processed result packet 1572. The result packet 1572 is sent to the network stack 1590, which delivers it to the datapath daemon 1510 in user space through a user-kernel transport (e.g., 1560). The datapath daemon 1510 the uses the result packet 1572 to continue datapath operations through its subsequent stages (1515-1517).

Though FIG. 15 illustrates a datapath daemon executing only one datapath stage that relies on an external process (dispatch stage 1514 to the external process 1505), one of ordinary skill would understand that in some embodiments, there can be multiple datapath stages that dispatch packet to external processes or daemons for processing. For example, in some embodiments, a datapath daemon can have one stage for dispatching packets to an external L7 LB processing daemon, and another stage for dispatching packets to an external HTTPS processing daemon.

Figure 16:
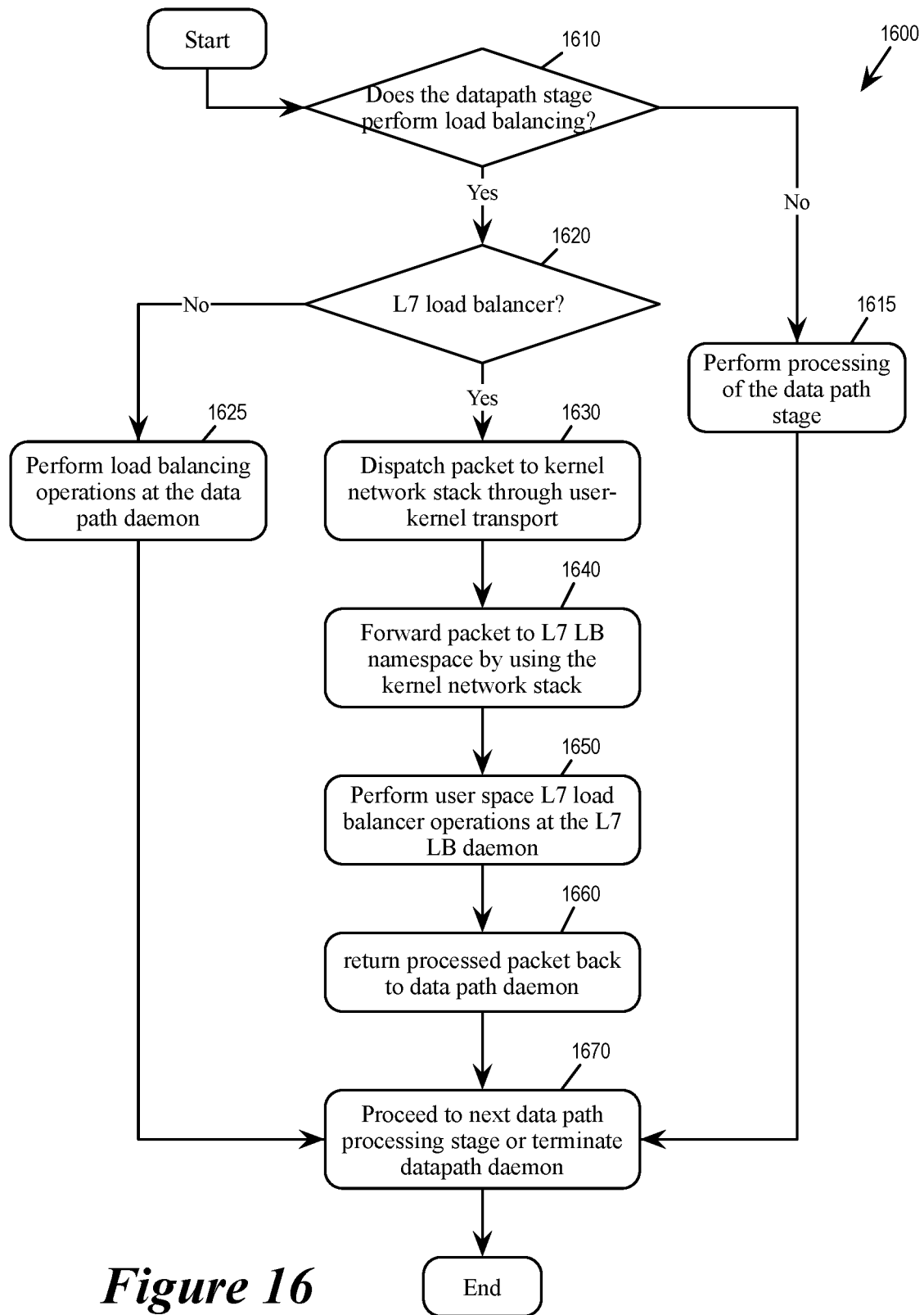
FIG. 16 conceptually illustrates a process for using processes external to the datapath daemon to perform datapath stages.

FIG. 16 conceptually illustrates a process 1600 for using processes external to the datapath daemon to perform datapath stages. Specifically, the process relies on external processes in their own namespaces to perform service stages for higher protocol layer (e.g., application layer) services while using datapath daemon to perform lower protocol layer (e.g., transport layer and network layer) services.

The description of the process uses L7 LB as an example, but one of ordinary skill would understand the process 1600 is a general process that is applicable to other higher layer network services as well (e.g., HTTPS). In some embodiments, the gateway machine performs the process 1600 by using one or more processing threads in the user space and/or in the kernel space. Some embodiments perform the process 1600 when the gateway datapath process 900 performs the operation 930 to process an incoming packet.

The process 1600 starts when the datapath daemon starts a processing stage. It then determines (at 1610) whether the processing stage is a load balancer stage. If so, the process proceeds to 1620. If the processing stage is not a load balancer stage, the process proceeds to 1615 to perform the processing of the datapath stage according to the requirement of the stage (which can require processing by daemons or processes external to the datapath daemon.)

At 1620, the process determines if the stage is a L7 load balancer stage. If so, the process proceeds to 1630. If the stage is not a L7 load balancer stage but instead a lower level network protocol layer balancer stage (e.g., a L4 or transport layer load balancer), the process proceeds to 1625.

At 1625, the process performs the lower protocol layer load balancing operations at the datapath daemon without dispatching a packet to an external process. The process then proceeds to 1670.

At 1630, the process dispatches the packet from the current datapath stage to the kernel network stack through the user-kernel transport (e.g., 1560). The process then delivers (at 1640) the packet to the L7 LB namespace by using the kernel network stack. In some embodiments, the packet reaches the L7 LB daemon through the virtual interface of the namespace. The process then performs (at 1650) the L7 LB operations by using the L7 LB daemon.

Once the L7 LB daemon has completed its operations on the packet, the process returns (at 1660) the processed packet back to the datapath daemon through the namespace's virtual interface, the kernel network stack, and the user-kernel transport.

Finally, the process proceeds (at 1670) to the next datapath stage at the datapath daemon or terminate the datapath. The process 1600 then ends.

B. For Multiple Different Tenants

In some embodiments, the datacenter supports multiple logical networks for multiple different tenants. Different tenant logical networks share a same set of gateway machines, and each of the gateway machines provides packet switching, forwarding, routing operations for all of the connected tenant logical networks. In some embodiments, a datapath daemon is capable of executing packet-processing stages for packets to and from different logical networks belonging to different tenants. In some of these embodiments, the DP configuration database provides the configuration data (i.e. routing table, forwarding tables, etc.) and the service specifications that enable tenant-specific packet forwarding operations at the gateway.

In some embodiments, the overall network of a datacenter implementing a two-tier logical network structure. These tiers include a top tier of a provider logical router (PLR) and a lower tier of tenant logical routers (TLRs), in some embodiments. The two-tiered structure enables both the provider (e.g., datacenter owner) and the tenant (e.g., datacenter customer, often one of many such customers) control over their own services and policies. In some embodiments, the PLR layer is the logical layer that interfaces with external physical networks, and therefore dynamic routing protocols (e.g., BGP) may be configured on the PLR to enable the exchange of routing information with physical routers outside the datacenter. Some embodiments also allow the configuration of bidirectional forwarding detection (BFD) or similar protocols for monitoring whether physical network routers are active and operational. Some datacenters may not have multiple tenants, in which case the need for separate PLR and TLRs is removed. In such cases, some embodiments use a single-tier logical router topology, with the single tier having the functionality of PLRs. The two-tier logical topology of some embodiments is described in greater detail in U.S. patent application Ser. No. 14/222,557, filed Mar. 21, 2014, and now issued as U.S. Pat. No. 9,647,883, which is incorporated herein by reference.

The two-tier structure of some embodiments includes (1) a single logical router (referred to as a provider logical router (PLR) and administered by, e.g., the owner of the datacenter) for connecting the logical network to a network external to the datacenter, and (2) multiple logical routers (each referred to as a tenant logical router (TLR) and administrated by, e.g., different tenants of the datacenter) that connect to the PLR and do not separately communicate with the external network. In some embodiments, the control plane defines a transit logical switch (TLS) between the distributed component of the PLR and the service components of the TLR.

Figure 17:
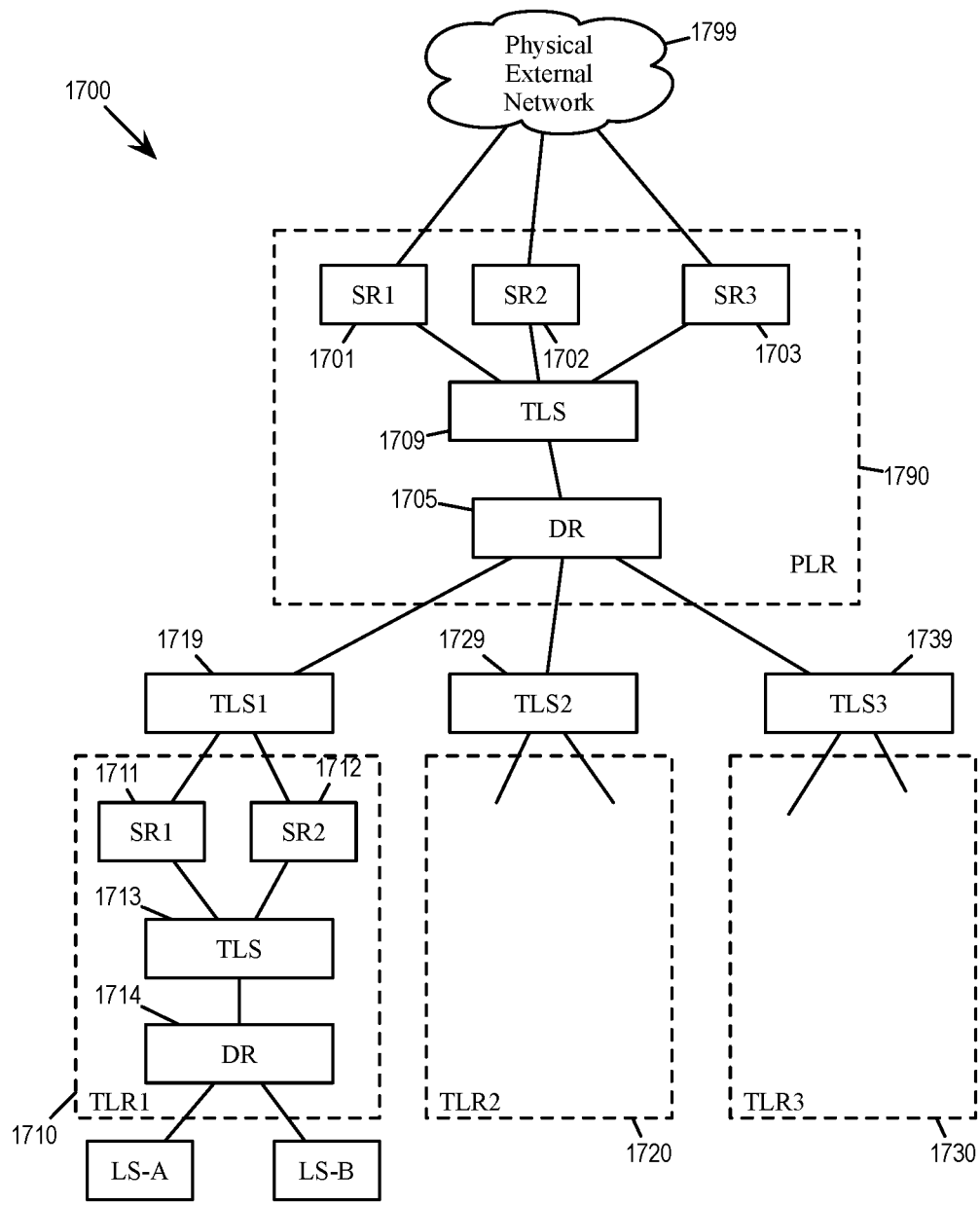
FIG. 17 illustrates a logical view of a datacenter that includes several logical networks for several different tenants.

FIG. 17 illustrates a logical view of a datacenter 1700. The overall logical network of the datacenter 1700 includes several logical networks for several different tenants. Each tenant logical network includes various tenant logical entities such as tenant logical routers and tenant logical switches. The datacenter 1700 also includes various provider logical entities such as provider logical routers and provider logical switches. The provider logical entities are shared by all of the tenants in order to access the external network through the gateway and to use the services provided the gateway.

The datacenter 1700 includes a provider logical router (PLR) 1790 and tenant logical routers (TLR) 1710, 1720, and 1730 (TLR1, TLR2, and TLR3). The PLR 1790 is connected with the TLR1 1710 through a transit logical router 1719 (TLS1), with the TLR2 1720 through a transit logical router 1729 (TLS2), and with the TLR3 1730 through a transit logical router 1739 (TLS3). TLR1 is for performing L3 routing of a tenant 1, TLR2 is for performing L3 routing of a tenant 2, and TLR3 is for performing L3 routing of a tenant 3. The logical networks of the different tenants are joined together by the PLR 1790. The PLR 1790 serves as the intermediate logical router between the various tenant logical networks and the external physical network (Internet).

In some embodiments, any number of TLRs may be attached to a PLR. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR. Part of the routing table for a PLR includes routes for all of the logical switch domains of its TLRs, so attaching numerous TLRs to a PLR creates several routes for each TLR just based on the subnets attached to the TLR. The PLR 1790, as shown in the figure, provides a connection to the external physical network 1799; some embodiments only allow the PLR to provide such a connection, so that the datacenter provider can manage this connection. Each of the separate TLRs 1710, 1720 and 1730, though part of the overall logical network 1700, are configured independently (although a single tenant could have multiple TLRs if they so chose).

Each logical router (TLR or PLR) described above is implemented by a single distributed routing component (DR) and a set of service routing components (SRs). The PLR includes service routers 1701-1703 (SR1, SR2, and SR3) that provides access to the physical network and edge services. As mentioned, in some embodiments, each service router is a centralized logical router component that is active only in one physical (gateway) machine. The PLR also includes a distributed router 1705 (PLR-DR) for routing packets to and from the different tenant logical networks. The PLR distributed router 1705 is connected to the service routers SR1, SR2, and SR3 through a transit logical switch (PLR-TLS) 1709.

The TLR 1710 includes service routers 1711 and 1712 (TLR1-SR1, TLR1-SR2), distributed router 1714 (TLR1-DR), and a transit logical switch 1713 (TLR1-TLS). Each TLR serve as the L3 hub for a tenant logical network. Each TLR includes a distributed router (DR) for connecting different L2 segments defined by different logical switches. The distributed router 1714 (TLR1-DR) is for routing packets to and from the different tenant logical switches (LS-A and LS-B). The transit logical switch 1713 is for connecting the service routers 1711 and 1712 with the distributed router 1714. For simplicity, the details of TLR 1720 and 1730 are not illustrated, but these other TLRs would each have their own DR, as well as SRs in some cases.

For a PLR logical router, some embodiments use active-active mode whenever possible, and only use active-standby mode when stateful services (e.g., NAT, firewall, load balancer, etc.) are configured for the PLR. In active-standby mode, only one of the service routing components is active, i.e., fully operational at a time, and only this active routing component sends out messages to attract traffic. All other service routing components are in standby mode. In some embodiments, the active service component and a standby service component use the same IP address, but different MAC addresses, for communicating with the distributed component. However, only the active component replies to address resolution protocol (ARP) requests from this distributed component. Furthermore, only the active service component advertises routes to the external network to attract traffic.

For a TLR logical router, some embodiments either use no service components or two service components in active-standby mode when stateful services are configured for the TLR. (The TLR 1710 in the example of FIG. 17 has two service components 1711 and 1712.) The TLR operates internally in the same manner as a PLR in active-standby mode, i.e., having an active component and a standby component sharing the same network layer address, but only the active component responding to ARP requests. To connect to the PLR, some embodiments assign each of the two service components of the TLR a same network layer address (though different from the IP address used to connect to its own distributed component).

Different types of logical routers (e.g., distributed logical router, multi-layer logical routers, etc.) with multiple routing components and implementation of the different types of logical routers on gateways and managed forwarding elements operating on host machines of a datacenter are described in greater detail in the U.S. patent application Ser. No. 14/814,473, filed Jul. 30, 2015, which is incorporated herein by reference.

In some embodiments, the DP configuration database stores as configuration data the routing tables, the forwarding tables, the rules tables, etc. for the different logical entities. The DP configuration database provides mapping between connections identities (ingress ports and egress ports) and network logical entity identities. The datapath daemon in turn performs the datapath pipeline for different tenants by function calls and following the connection mapping between the different logical entities, where some of the logical entities correspond to various tenant-specific logical network constructs (e.g., TLR-LS or TLR-DR for different tenants). The datapath daemon provides common network services to all tenants by executing pipeline stages that correspond to various provider logical entities (e.g., PLR-SRs and PLR-DR).

The packets for different tenants have different destination IP or MAC addresses, and the datapath daemon accordingly identify and execute different pipeline stages (e.g., function calls for different network logical entities) that corresponds to different tenants. The datapath daemon initially invoked PLR stages PLR-SR1, PLR-TLS, PLR-DR, which routes the packet to their corresponding TLSs based on the destination addresses of the packets. These TLSs in turn switched the packets to their corresponding tenant-specific TLRs.

Among these logical entities, PLR-SR1, PLR-TLS, and PLR-DR are provider constructs common to all tenants. TLS1, TLR1-DR, LS-A are tenant-specific constructs for tenant 1. TLS2, TLR2-DR, and LS-D are tenant-specific constructs for tenant 2. TLS3, TLR2-DR, and LS-E are tenant-specific constructs for tenant 3. Each of these stages has corresponding configuration data provided by the DP configuration database for routing packets, identifying next hops, providing services, etc. In some embodiments, tenant-specific logical network constructs use tenant-specific forwarding table, routing table, rules table, and other tenant-specific configuration data.

In some embodiments, packets for different tenants are encapsulated differently for different overlay networks, and the datapath daemon uses the tenant-specific information in the encapsulation to identify and execute different pipeline stages that correspond to different tenants.

In some embodiments in which the data center do not have TLRs, or have TLRs that do not have their service components, nearly the entire packet-processing pipeline will be performed in the first hop. However, in some embodiments that do have TLRs with service components, the packet-processing pipeline is spread across multiple machines for both northbound and southbound traffic.

Figure 18:
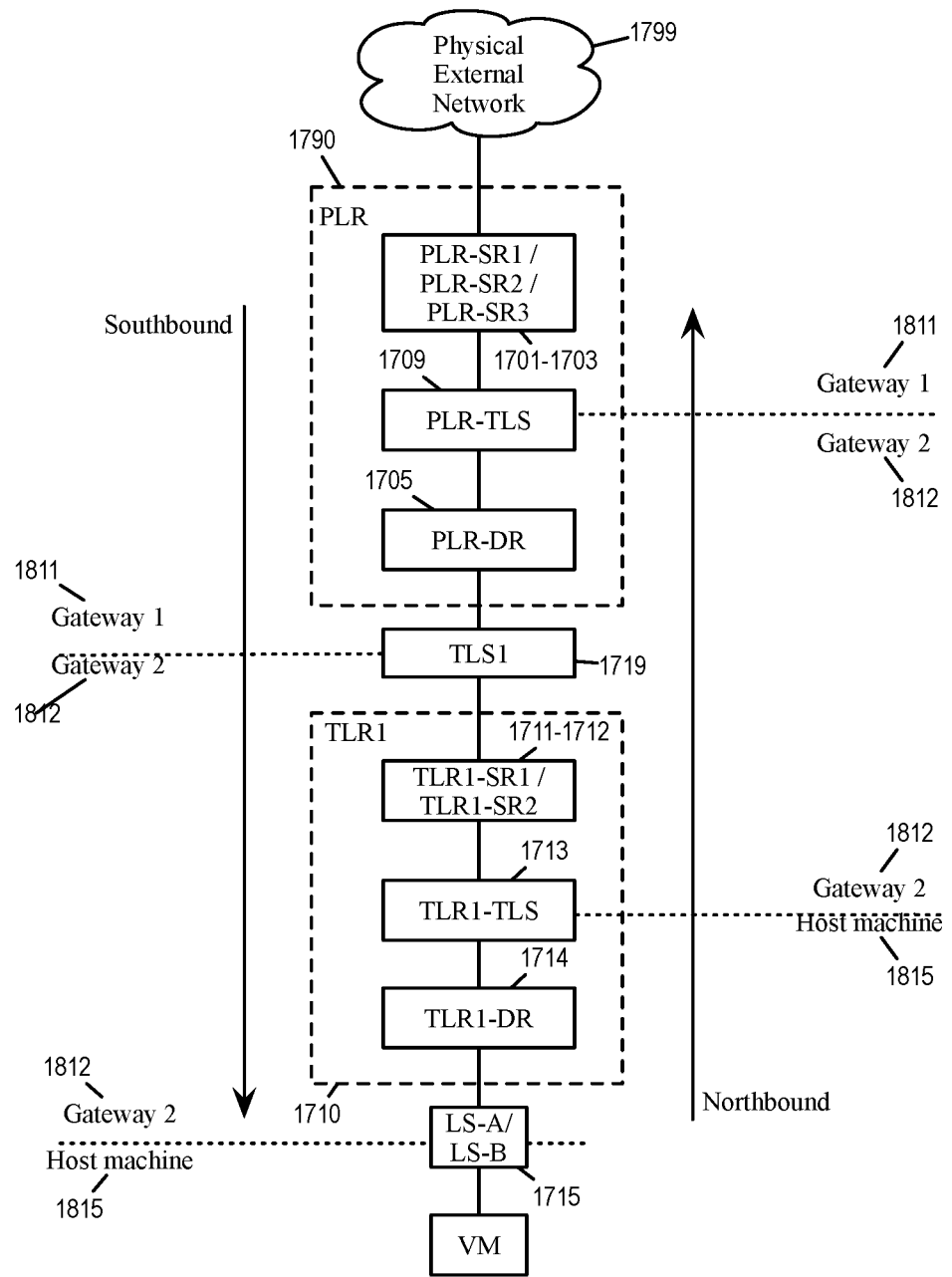
FIG. 18 illustrates example pipelines of northbound and southbound traffic for a two-tier logical topology of the datacenter.

FIG. 18 illustrates example pipelines of northbound and southbound traffic for a two-tier logical topology of the datacenter 1700. The figure illustrates example pipelines based on a packet for the tenant of TLR1 1710, but one of ordinary skill would understand the example applies to other tenants of other TLRs (TLR2 1720 or TLR3 1030) as well. As illustrated, in the datacenter 1700, centralized services are provided by SRs of both TLRs and PLRs, and the packet-processing pipeline for both northbound and southbound traffic are spread across a host machine 1815 as well as two gateway machines 1811 and 1812 in the datacenter 1700.

In some embodiments, the portion of the pipeline assigned to a gateway machine (1811 or 1812) is performed by a datapath daemon in that gateway machine. As illustrated, for northbound traffic from the logical networks toward the physical external network 1799, the MFE of the host machine 1815 performs VM, LS-A (or LS-B) 1715, TLR1-DR 1714, and TLR1-TLS 1713. The datapath daemon of the gateway machine 1812 performs TLR1-TLS 1713, TLR1-SR1 or TLR-SR2 (1711 or 1712), TLS1 1719, PLR-DR 1705, PLR-TLS 1709. The datapath daemon of the gateway machine 1811 performs PLR-TLS 1709 and PLR-SR1 1701 (or PLR-SR2 1702 or PLR-SR3 1703).

For southbound traffic from the physical external network 1799 toward the logical networks, the datapath daemon of gateway machine 1811 performs PLR-SR1 1701 (or PLR-SR2 1702 or PLR-SR3 1703), PLR-TLS 1709, PLR-DR 1705, and TLS1 1719. The datapath daemon of the gateway machine 1812 performs TLS1 1719, TLR1-SR1 or TLR1-SR2 (1711 or 1712), TLR1-TLS 1713, TLR1-DR 1714, and LS-A (or LS-B). The MFE of the host machine 1815 performs LS-A (or LS-B) and VM.

When a VM or other data compute node on the host machine 1815 sends a northbound packet, the datapath on the MFE of the source machine 1815 initially runs the source logical switch pipeline. This pipeline specifies to forward the packet to the DR 1714 of the TLR1 1710, the pipeline stage for which is also executed on the source (first-hop) MFE. This DR pipeline stage identifies the southbound interface of one of the TLR1 SRs 1711 or 1712 as its next hop IP address.

In some embodiments, the TLR SRs are always configured in active-standby mode, so the next hop is the same for both of the SRs but the packet is routed to the MAC address of the active SR.

The MFE of the source machine 1815 then executes the pipeline for the TLS 1713 internal to the TLR1 1710, which specifies to tunnel the packet to the appropriate gateway machine (edge node) that hosts the selected SR of the TLR 1710 (which the TLS 1713 identifies based on the destination MAC address after routing by the DR 1714 pipeline). The gateway machine 1812 receives the packet, decapsulates it, and identifies the SR (1711 or 1712) based on the logical context information on the packet (e.g., the VNI of the transit logical switch 1713) as well as the destination MAC address that corresponds to the SR's southbound interface. The SR pipeline stage (including any of the stateful services) is then executed by the datapath daemon, which specifies the southbound interface of the PLR-DR 1705 as its next hop address. The TLS 1719 pipeline stage is executed on the current edge node (the gateway machine 1812), as is the DR 1705 pipeline stage of the PLR 1790. This DR pipeline identifies one of the SRs 1701, 1702, and 1703 as the next hop for the packet.

The datapath daemon of the gateway 1812 executes the pipeline stages for the TLS 1709 internal to the PLR 1790, which specifies to tunnel the packet to the appropriate gateway machine that hosts the selected SR 1701, 1702, or 1703 (identified by the TLS 1709 pipeline stage based on MAC address, in some embodiments). The gateway machine 1811 receives the packet, decapsulates it (to remove the tunneling encapsulation), and identifies the SR based on the logical context information on the packet (e.g., the VNI of the TLS 1709) as well as the destination MAC address that corresponds to the SR's southbound interface. The SR pipeline stage is then executed by the datapath daemon of the gateway 1811. The SR pipeline stage then sends the packet to the physical network 1799. If the SR pipeline specifies a local interface, then the packet is delivered directly to the physical network 1799; on the other hand, if the SR pipeline specifies a dummy interface, the packet may be redirected through a tunnel to a different gateway machine to which the specified interface is local.

Southbound traffic processing is also distributed across the three machines 1811, 1812 and 1815 (unless the SR (1701 or 1702) for the PLR 1790 and the SR (1711 or 1712) for the TLR 1710 are located on the same gateway machine). As shown in FIG. 18, a southbound packet is received at the gateway machine 1811 on which an SR of the PLR 1790 operates. The datapath daemon at the gateway machine 1811 identifies the destination SR based on the VLAN and destination MAC address of the incoming packet, and runs the SR pipeline stage. The SR pipeline identifies the DR 1705 as its next hop, so the datapath daemon then executes the TLS 1709 pipeline stage, which forwards the packet to the DR 1705. The DR 1705 pipeline identifies the northbound interface of one of the SRs 1711 and 1712 of the TLR 1710 as its next hop. In the active-standby case, the active SR is selected.

The datapath daemon on the gateway machine 1811 then executes the TLS 1719 pipeline stage, which specifies to tunnel the packet to the gateway machine 1812 on which this second SR that performs stateful services for the TLR 1710 is located. The gateway machine 1812 decapsulates the packet and identifies the destination SR based on the VNI and MAC address on the packet. The datapath daemon of the gateway machine 1812 runs the SR pipeline stage, which identifies the DR 1714 as the next hop. The datapath daemon of the gateway machine 1812 thus executes the TLS 1713 pipeline stage, which forwards the packet to the DR 1714, and then executes this DR pipeline stage as well. The pipeline stage of the DR 1714 routes the packet to its destination, so the destination logical switch pipeline stage 1715 (one of the logical switches LS-A or LS-B) is executed, and the packet is tunneled to the MFE of the host machine 1815 on which the destination VM resides. After decapsulating the packet, the destination MFE of the host machine 1815 delivers the packet to the VM.

For east-west traffic within a TLR, the source logical switch, DR, and destination logical switch pipelines are all executed at the first-hop MFE, then the packet is tunneled to the destination MFE. IF the packet requires processing by the centralized services, only the source logical switch, DR, and TLS pipeline stages are performed at the first-hop MFE, with the SR pipeline, transit logical switch (again), DR (again), and destination logical switch pipelines performed by the gateway machine before tunneling the packet to the destination. For cross-TLR traffic, the packet starts out in the same way, with the first-hop MFE performing the source logical switch, DR, and transit logical switch pipelines to select a SR. The gateway machine on which the selected SR runs then executes the SR pipeline to identify the DR of the PLR, the transit logical switch pipeline between the TLR and the PLR, the DR of the PLR pipeline (which identifies a next hop as a component of a different TLR), and at least the transit logical switch between the PLR and the destination TLR. If the destination TLR has only a DR, then that pipeline is also executed at the first gateway machine, along with the destination logical switch, before tunneling the packet to its destination MFE. If the destination TLR has SRs, the transit logical switch specifies to tunnel the packet to the gateway machine for a selected SR of the destination TLR. That second gateway machine executes the SR pipeline, the transit logical switch pipeline internal to the destination TLR, the DR pipeline for that TLR, and the destination logical switch pipeline, before tunneling the packet to the destination MFE.

The same principle applies in all of the above cases, which is to perform the processing pipelines as early as possible. Thus, all of the pipelines for a given packet are performed at the first-hop MFE (e.g., the hypervisor-based virtual switch that receives a packet from a VM on that hypervisor), until the packet needs to be sent to a SR pipeline only present on a specific gateway machine. That gateway machine then performs all of the processing it can, until the packet is sent out to a physical network or to a different gateway machine (or to its destination for east-west traffic).

As mentioned, a datapath daemon in some embodiments dispatches packets to an external processes or daemons through a kernel network stack in order to perform processing for some of its pipeline stages. In some embodiments, each TLR has its own namespace in the operating system, and a packet exported by the datapath daemon when processing a TLR is sent to a daemon in a corresponding namespace for the TLR by the kernel network stack.

Figure 19:
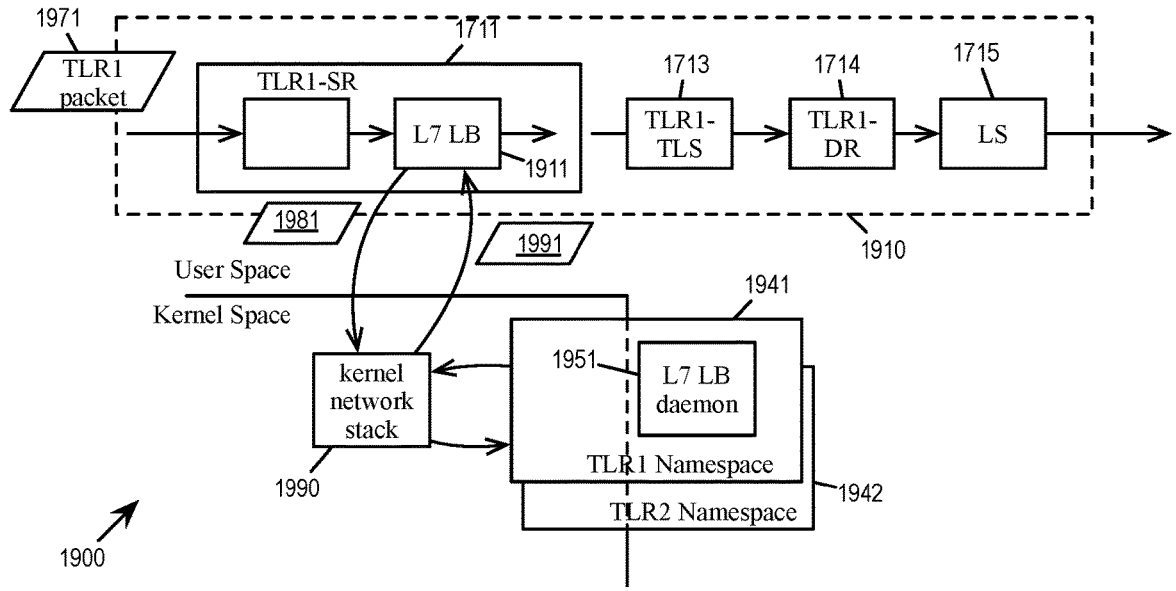
FIG. 19 illustrates a datapath daemon in a gateway machine that dispatches packets to TLR-specific namespace when performing packet processing for a TLR stage.
Figure 19:
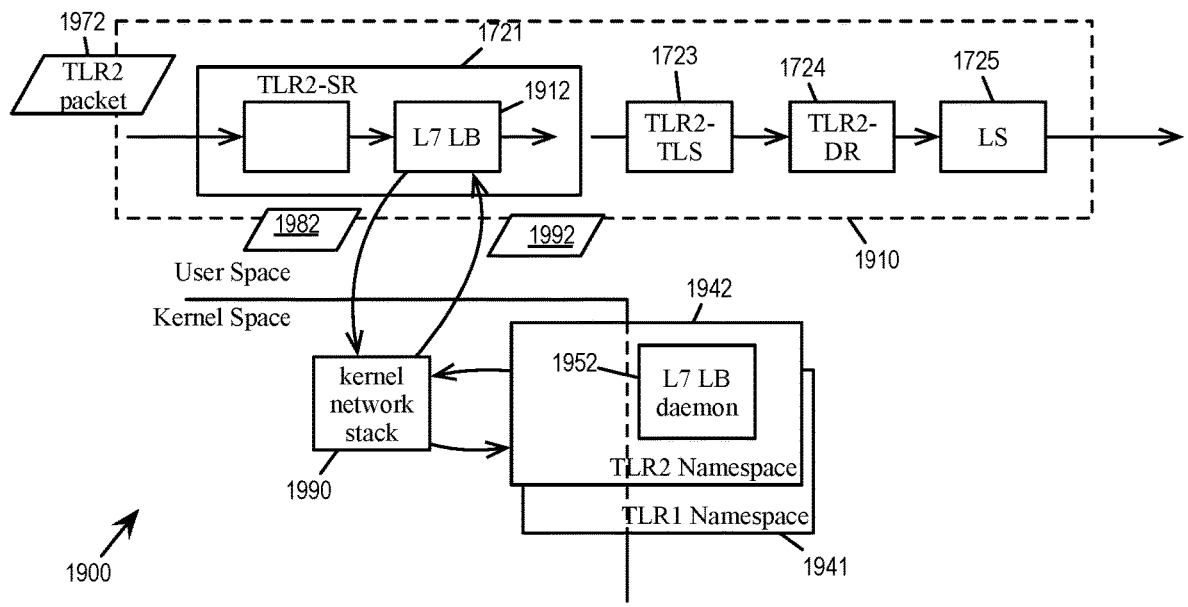

FIG. 19 illustrates a datapath daemon 1910 in a gateway machine 1900 that dispatches packets to TLR-specific namespace when performing packet processing for a TLR stage. The figure illustrates the datapath daemon 1910 processing two different packets 1971 and 1972. The packets 1971 and 1972 are southbound packets for TLR1 and TLR2, respectively. Consequently, the PLR 1790 has forwarded the packet 1971 to the TLR1 1710 and the packet 1972 to the TLR2 1720. (In the example of FIGS. 17, the datapath daemon of the gateway machine 1811, after executing pipeline stages for the PLR 1790, has forwarded the packet to the gateway machine 1812 for the datapath daemon to execute the pipeline stages for the TLR1 1710 or TLR2 1720. In some embodiments, a datapath daemon of a same gateway machine executes the pipeline stages for the PLR 1790 before performing the pipeline stages for the TLR1 1710 or the TLR2 1720).

As illustrated, when processing the packet 1971, the datapath daemon 1910 executes pipeline stages for the TLR1 1710, specifically the TLR1-SR1 1711, TLR1-TLS 1713, TLR1-DR 1714, and an LS stage 1715. The pipeline stages for the service router TLR1-SR 1711 include an application layer load balancing (L7 LB) stage 1911. The L7 LB stage 1911 is a data plane stage that exports/dispatches a packet 1981 to the kernel network stack 1990 for delivery to a namespace 1941 that contains the L7 LB daemon 1951 for the TLR1 1710. The L7 LB daemon 1951 returns a result packet 1991 back to the datapath daemon 1910 through the kernel network stack 1990 for processing by subsequent pipeline stages at the daemon 1910, including stages 1713-1715.

Likewise, when processing the packet 1972, the datapath daemon 1910 executes pipeline stages for the TLR2 1720, specifically the TLR2-SR1 1721, TLR1-TLS 1723, TLR1-DR 1724, and an LS stage 1725. The pipeline stages for the service router TLR2-SR 1721 include an application layer load balancing (L7 LB) stage 1912. The L7 LB stage 1912 is a data plane stage that exports/dispatches a packet 1982 to the kernel network stack 1990 for delivery to a namespace 1942 that contains the L7 LB daemon 1952 for the TLR2 1720. The L7 LB daemon 1952 then returns a result packet 1992 back to the datapath daemon 1910 through kernel network stack for subsequent pipeline stages at the daemon 1910.

As mentioned, some embodiments use user-kernel transport such as KNI to transport packets between user space process such as the datapath daemon and the kernel space network stack, and the transport of packets between datapath daemon and the external TLR daemons in TLR-specific namespaces likewise rely on user-kernel transports. However, some embodiments allow only a limited number of user-kernel transports (as permitted by the operating system running on the gateway machine) while allowing the number of TLRs to scale to whatever the number of tenants or TLRs the datacenter or the gateway machine can support.

Figure 20:
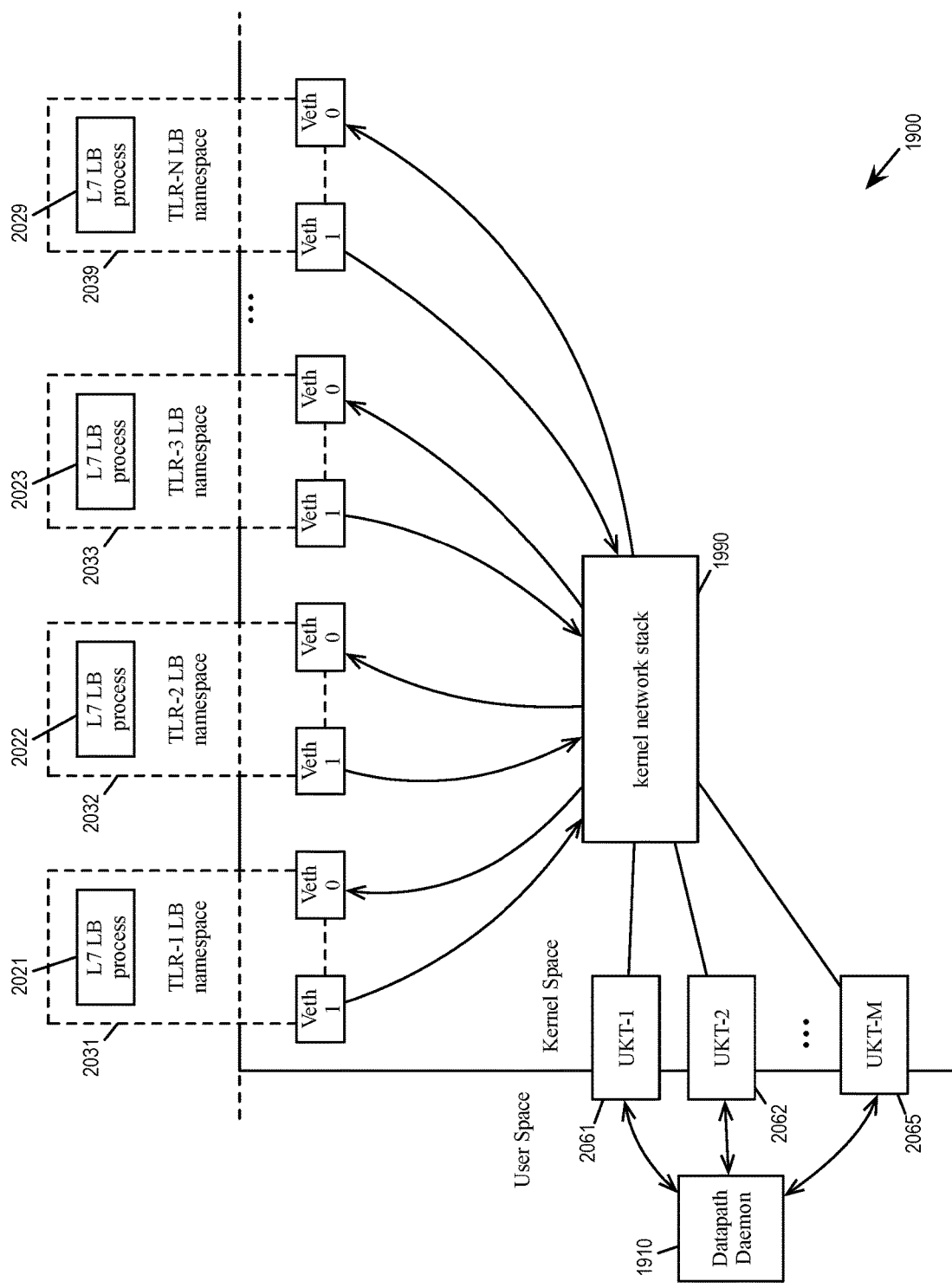
FIG. 20 conceptually illustrates the gateway machine that uses multiple user-kernel transports to deliver packets between datapath daemon and namespaces of different TLRs.

FIG. 20 conceptually illustrates the gateway machine 1900 that uses multiple user-kernel transports to deliver packets between a datapath daemon and namespaces of different TLRs. As illustrated, the gateway 1900 includes the datapath daemon 1910 operating in the user space. The gateway 1900 also includes multiple data plane processes 2021-2029 that are external to the datapath daemon. In this example, each of the external data plane processes 2021-2029 is a L7 LB process, however, one of ordinary skill in the art would understand that these external data plane process can also be of other types of network service operations such as HTTPS.

Each of these external data plane processes is for a different TLR or different tenant logical network, and each is in a TLR-specific namespace that segregates the data plane process from other TLR processes. As illustrated, the data plane process 2021-2029 are operating in namespaces 2031-2039, respectively. Each of these namespaces has virtual interfaces (Veth1 and Veth0) for sending packets to and receiving packets from the kernel network stack 1990, which forwards packets between the datapath daemon 1910 and the TLR-specific namespaces 2031-2039. The kernel network stack 1990 communicates with datapath daemon 1910 through a number of user-kernel transports 2061-2065.

As illustrated, there are M user-kernel transports for transporting packets with N TLR-specific name spaces. In some embodiments, M is a number that is smaller than N, i.e., there are fewer user-kernel transports than there are TLRs handled by the gateway. Consequently, there is no one-to-one correspondence between the user-kernel transport and the TLR namespaces.

For some embodiments in which operating system allows as many user-kernel transports as there are TLRs in the data center, the gateway can assign a user-kernel transport to each TLR such that the datapath daemon can dispatch each packets to its correct corresponding TLR namespace by using the corresponding user-kernel transport. However, for some embodiments in which the number of TLRs (as handled by the gateway) exceeds the number of available user-kernel transports, the gateway cannot rely on correspondence between user-kernel transports and TLR namespaces to send packets from the datapath daemon to the correct TLR namespaces and vice versa.

The datapath daemon in some embodiments inserts TLR identifiers into packets that are to be handled by external, TLR-specific processes. However, in some embodiments, the kernel network stack as provided by the operating system does not recognize identifiers other than those provided by VLAN syntax. Some embodiments therefore inserts TLR identifiers as VLAN tags into the dispatched packets from the datapath daemon so that the network stack can deliver them to the correct TLR-specific namespace.

Figure 21:
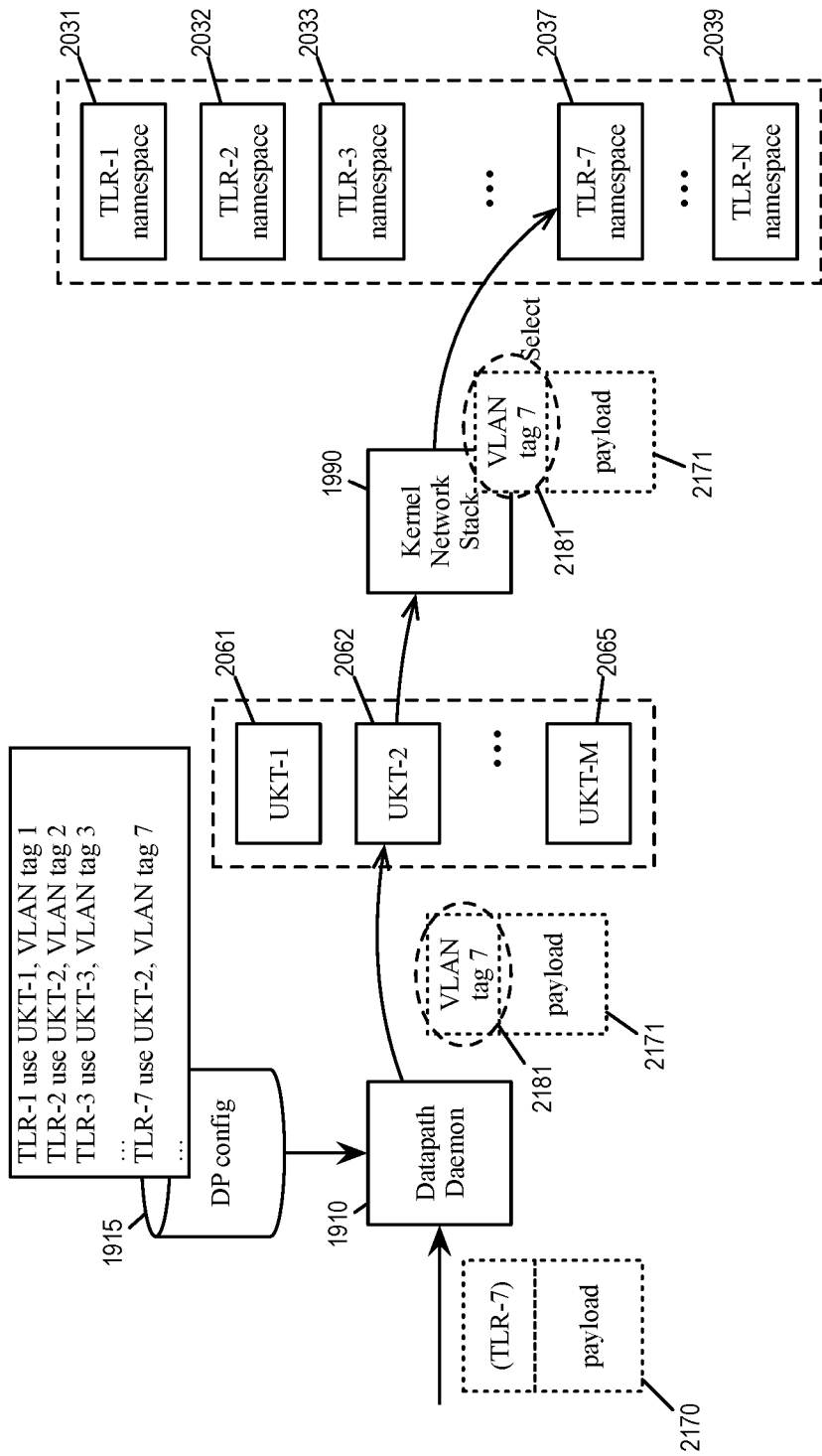
FIG. 21 illustrates the use of an inserted TLR identifier to direct a packet from the datapath daemon to its corresponding TLR namespace.

FIG. 21 illustrates the use of an inserted TLR identifier to direct a packet from the datapath daemon to its corresponding TLR namespace. The datapath daemon 1910 is using user-kernel transports 2061-2065 to transport dispatched packets to TLR namespaces 2021-2029 through the kernel network stack 1990.

As illustrated, the datapath daemon 1910 receives a packet 2170. The packet 2170 can be from an external physical network. Such a packet is in VLAN format but does not directly carry any TLR identifier. The packet 2170 can also be an encapsulated packet tunneled in from another machine within the data center. Such a packet in some embodiments carries the identifier of the tenant logical network in its encapsulation header. However, the kernel network stack 1990 cannot process the encapsulation header. In either instance, the packet 2170 does not carry a TLR identifier that can be readily processed by the kernel network stack 1990 to identify the correct TLR namespace.

The datapath daemon 1910 determines the identity of the TLR of the packet 2170. In some embodiments, this is based on routing and other operations performed by the PLR as described above by reference to FIGS. 17 and 18. In some embodiments, this is based on the TLR/tenant logical network identifying information stored in the encapsulation header. In either instance, the datapath daemon process the packet 2170 and determines the identity of the TLR/tenant logical network based on the content of the packet 2170. The datapath daemon 1910 in turn dispatches a packet 2171 when the daemon 1910 is executing a corresponding dispatch stage (e.g., 1911). The dispatched packet 2171 is to be processed by an external processing daemon residing in one of the TLR namespaces 2031-2039. The packet 2171 includes a VLAN tag 2181 for identifying the TLR of the packet. As illustrated, the VLAN tag identifies the TLR-7 (associated with namespace 2037). In some embodiments, a DP configuration database 1915 of the datapath daemon 1910 specifies the VLAN tag of each TLR. The datapath daemon 1910 inserts this VLAN tag 2181 into the packet 2171 before transporting the packet through the user-kernel transport.

Based on the processing of the packet 2170, the datapath daemon 1910 dispatches a packet 2171 to one of the user-kernel transports in order to send the packet to the kernel network stack 1990. Different embodiments use different methods to select an available user-kernel transport. In some embodiments, the datapath daemon selects a user-kernel transport randomly. In some embodiments, the datapath daemon selects a user-kernel transport by round-robin. In some embodiments, the datapath daemon selects a user-kernel transport while attempting to balance the load between the available user-kernel transports. In some embodiments, the datapath daemon selects a user-kernel transport by hashing TLR identifiers or content of the packet. In some embodiments, the datapath daemon selects user-kernel transport based on a mapping between TLRs and user-kernel transports. In some embodiments, this mapping is provided by the DP configuration database 1915 of the datapath daemon 1910.

As illustrated, the datapath daemon 1910 selects the user-kernel transport 2062 for transporting the packet 2171 to the network stack 1990. The network stack 1990 in turn uses the VLAN tag 2181 to identify TLR-7 namespace 2037 as the namespace containing the corresponding external data plane processing daemon for the packet. The network stack 1990 then delivers the packet 2171 to the namespace 2037.

Though not illustrated, upon completion of the packet processing by the processing daemon in the namespace 2037, the namespace 2037 returns a resulting packet back to the datapath daemon 1910 through the network stack 1990 and one of the user-kernel transports 2061-2065. In some embodiments, this returning packet also carries the TLR identifying the VLAN tag 2181 in order for the network stack 1990 to send the packet back to the datapath daemon 1910.

Figure 22:
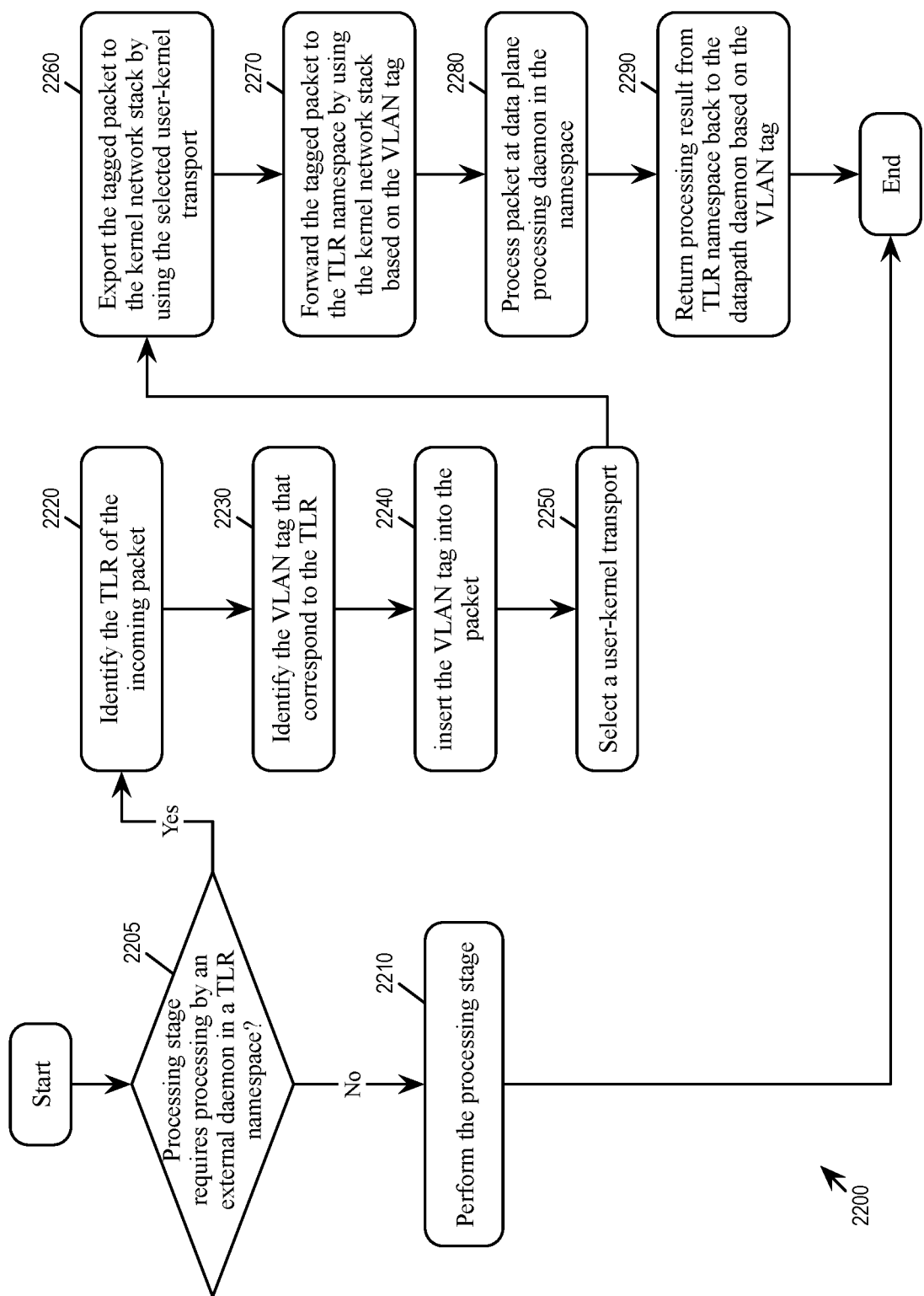
FIG. 22 conceptually illustrates a process for dispatching packet from a datapath daemon to a TLR-specific namespace.

FIG. 22 conceptually illustrates a process 2200 for dispatching a packet from a datapath daemon to a TLR-specific namespace, specifically when the number of available user-kernel transport is limited. In some embodiments, the gateway machine performs the process 2200 by using one or more processing threads in user space and in kernel space. Some embodiments perform the process 2200 when the gateway datapath process 900 performs the operation 930 to process an incoming packet. Some embodiments perform the process 2200 when the gateway performs the operations 1065 in the process 1000.

The process 2200 starts when the datapath daemon receives a packet and has performed certain preliminary processing on the packet before arriving at a particular processing stage. The process then determines (at 2205) whether the particular processing stage is one that requires processing by an external daemon in a TLR namespace. If so, the process proceeds to 2220. Otherwise the process 2200 proceed to 2210 to performing the processing stage (at the datapath daemon or at external process that is not TLR-specific) and ends.

At 2220, the process identifies the TLR, i.e., the tenant logical network of the incoming packet. For a southbound packet arriving from the external physical network destined for a machine within the datacenter, a datapath daemon (of this gateway machine or another gateway machine) has already executed PLR packet processing stages to identify the TLR. For a northbound packet tunneled in from another machine in the data center, the datapath daemon in some embodiments identifies the TLR based on logical network identifier (e.g, VNI) in the encapsulation header.

The process then identifies (at 2230) the VLAN tag that corresponds to the identity of the TLR and inserts (at 2240) the VLAN tag into the packet that has arrived at the current processing stage (i.e., the incoming packet after being processed by previous datapath stages).

Next, the process selects (at 2250) a user-kernel transport for communicating with the network kernel stack. As mentioned, in some embodiments, there are fewer available user-kernel transports in a gateway than there are TLRs, so the process has to select a user-kernel transport for sending a packet to one of the TLR-specific namespaces. Different embodiments use different methods to select a user-kernel transport as described above by reference to FIG. 21. The process then exports (at 2260) the tagged packet (e.g., the packet 2171 with the VLAN tag 2181) to the kernel network stack through the selected user-kernel transport.

Once the tagged packet has been transported to the kernel network stack, the process delivers (at 2270) the packet to the corresponding TLR namespace by letting the kernel network stack use the inserted VLAN tag to identify the TLR namespace.

The process then processes (at 2280) the packet at the external data plane daemon contained within the TLR namespace. Once such processing is complete, the process returns (2290) the processing result from the TLR namespace back to the datapath daemon by using the same inserted VLAN tag to identify the source TLR of the packet at the kernel network stack. The process 2200 then ends. Upon completion of the process 2200, some embodiments proceeds to the next stage of the datapath pipeline at the datapath daemon.

V. User-Space Network Stack

Sections above describe some embodiments of the invention in which the datapath daemon relies on a pre-existing network stack provided by the operating system to redirect or dispatch packets from the datapath daemon to external user space. Since this provided network stack operate in the kernel stack of the operating system, some embodiments rely on user-kernel transport mechanism to communicate packets between the network stack in the kernel space and the datapath daemon in the user space.

Rather than relying on the kernel network stack provided by the operating system, some embodiments implement a network stack in the user space to relay packets between the datapath daemon and processes or daemons external to the datapath daemon. Such an external process can be a control plane processing daemon that consumes a control plane packet dispatched to it, or a data plane processing daemon that processes a dispatched packet and returns a resulting packet back to the datapath daemon.

Figure 23A:
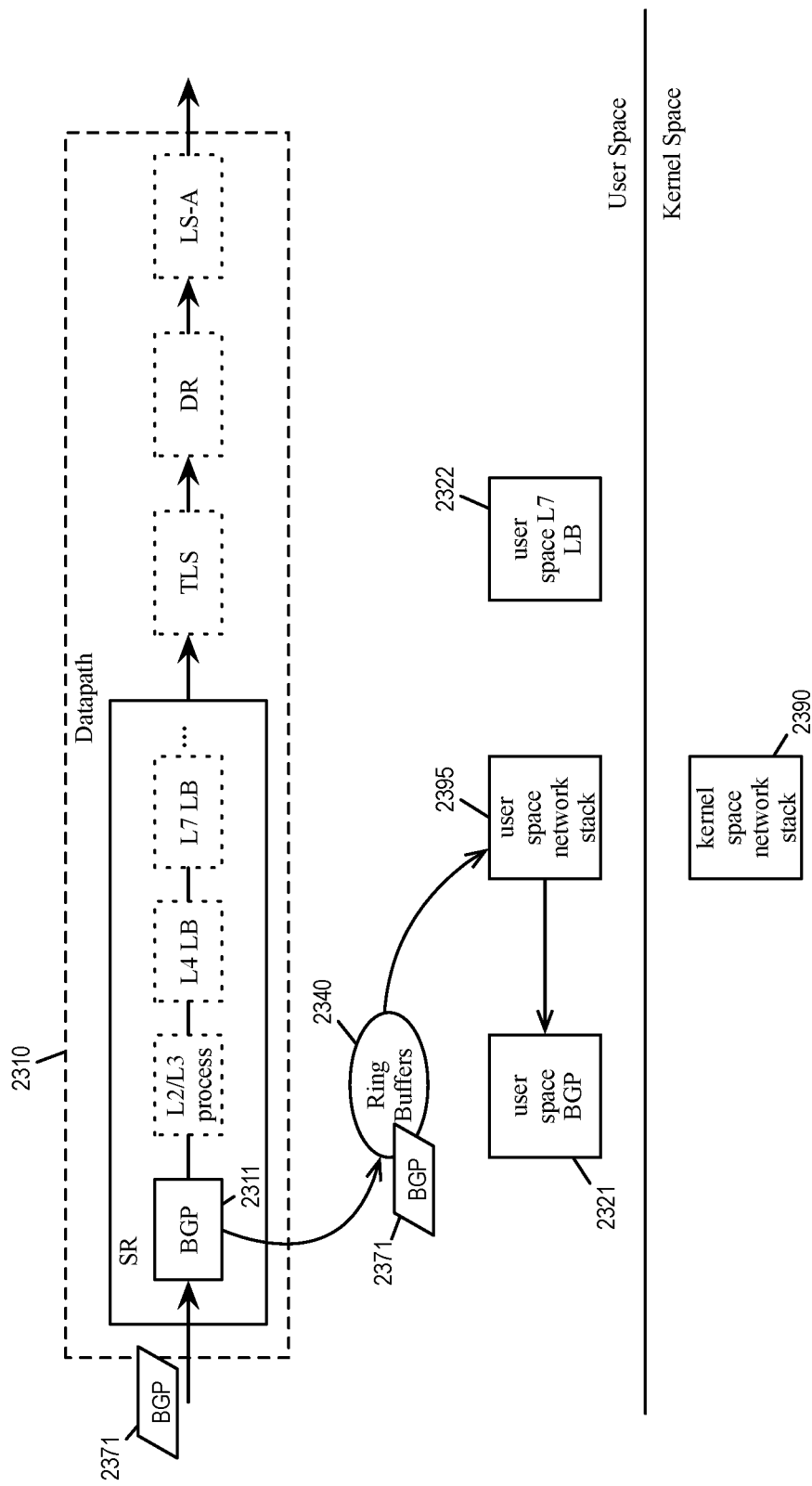
FIGS. 23a-b illustrate a gateway machine that uses a user space network stack to relay packets between a datapath daemon and external processing daemons.
Figure 23B:
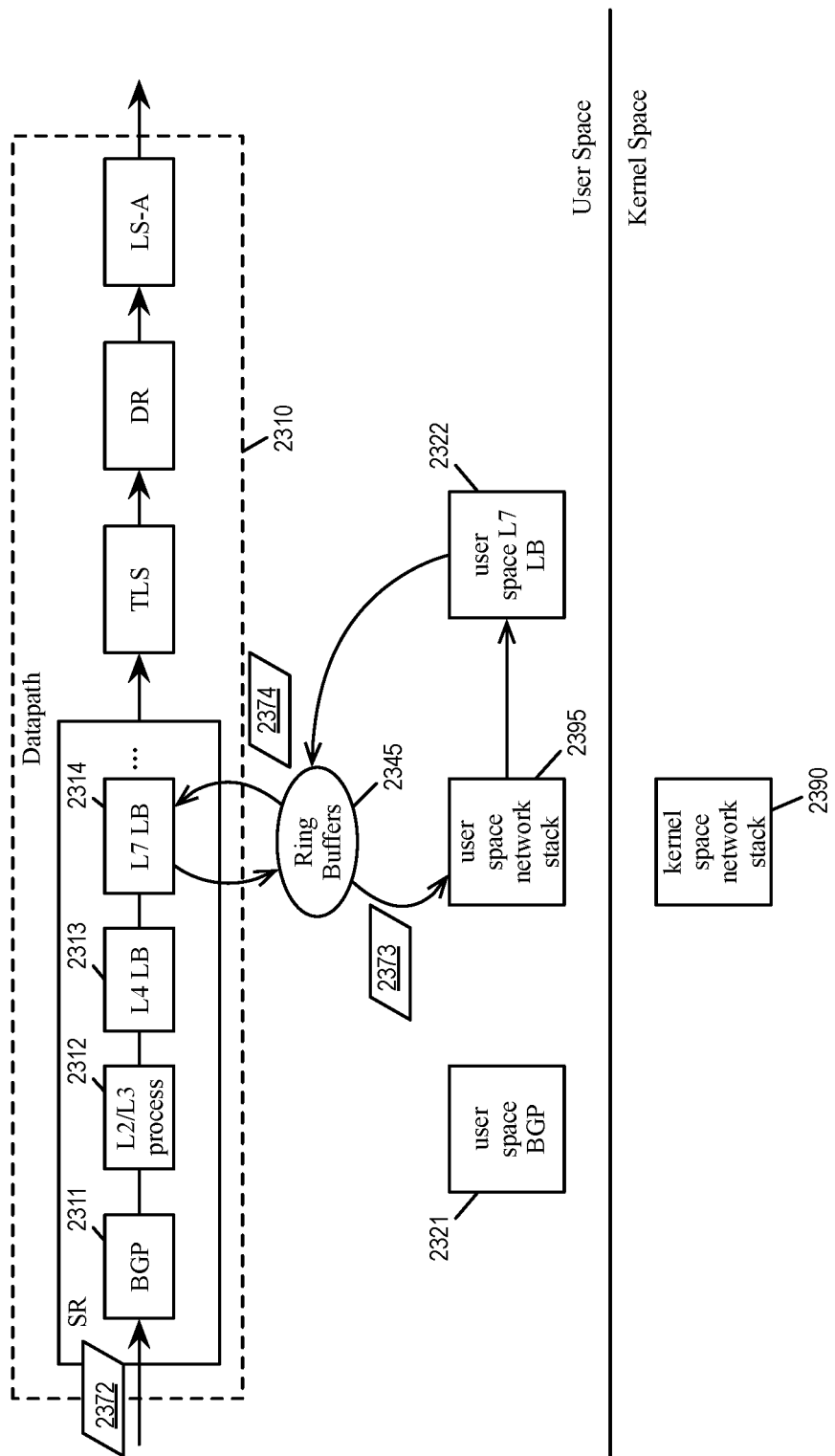

FIGS. 23a-b illustrate a gateway machine 2300 that uses a user space network stack 2395 to relay packets between a datapath daemon 2310 and external processing daemons 2321 and 2322. The external processing daemon 2321 is a control plane processing daemon 2321 (e.g., a BGP daemon). The external processing daemon 2322 is a data plane processing daemon 2322 (e.g., a L7 LB daemon). The gateway machine 2300 is operating an operating system (e.g., Linux) that already provides a network stack 2390 in the operating system's kernel space. On the other hand, the datapath daemon 2310, the user space network stack 2395, and the external processing daemons 2321 and 2322 are processes operating in the user space.

FIG. 23a illustrates the processing of a control plane packet 2371 by using the user space network stack 2395 to deliver packets to the control plane processing daemon 2321. As illustrated, the datapath daemon 2310 receives the control plane packet 2371 (a BGP packet), which is an incoming packet from a physical router of an external physical network. The datapath daemon 2310 executes a corresponding control plane stage 2311 (BGP stage) which recognizes the packet as a control plane packet that needs to be processed by the external control plane daemon 2321 (BGP daemon). The datapath daemon dispatches the control plane packet 2371 to the user space network stack 2395, which then delivers it to the external control plane process 2321.

Since the datapath daemon, the user space network stack, and the external processing daemons are all user space processes, there is no need to invoke any user-kernel transport such as KNI or TUN/TAP for delivering packets between processes. Rather, some embodiments use user space data structures such as ring buffers to communicate data between different processes. A ring allows the management of queues without having a link list of infinite size. As illustrated, the BGP stage dispatches the packet 2371 to ring buffers 2340 in the user space, and the user space network stack 2395 retrieves the packet 2371 from the ring buffer and deliver it to the BGP daemon 2321.

Since the BGP daemon 2321 is a control plane process that consumes the packet rather than producing a result for the datapath daemon, the datapath daemon terminates the datapath processing for the packet 2371.

FIG. 23b illustrates the processing of a data plane packet 2372 by using the user space network stack 2395 to deliver packets to the data plane processing daemon 2322. As illustrated, the datapath daemon 2310 receives the data plane packet 2372, which is an incoming packet from either the external physical network or another machine within the data center. The datapath daemon 2310 executes several stages 2311-2313 for a service router (SR), which yields a processed packet 2373. In this example, one of the stages executed by the datapath daemon is a L4 LB stage 2313.

The datapath daemon 2310 then executes a plane stage 2314 (L7 LB), which causes the datapath daemon to dispatch the packet 2373 to the user space network stack 2390, which then delivers it to the external data plane process 2322 (for L7 LB). The packet 2373 is dispatched to ring buffers 2345 so the user space network stack 2395 can retrieve and deliver. The external data plane process 2322 then returns a resulting packet 2374 back to the ring buffers 2345 to be retrieved by the datapath daemon 2310.

Though FIG. 23b illustrates a datapath daemon executing only one stage that relies on an external process, one of ordinary skill would understand that in some embodiments, there can be multiple stages in the datapath that dispatches packets to external processes or daemons for processing. For example, in some embodiments, a datapath daemon can have one stage for dispatching packets to an external L7 LB processing daemon, and another stage for dispatching packets to an external HTTPS processing daemon.

Figure 24:
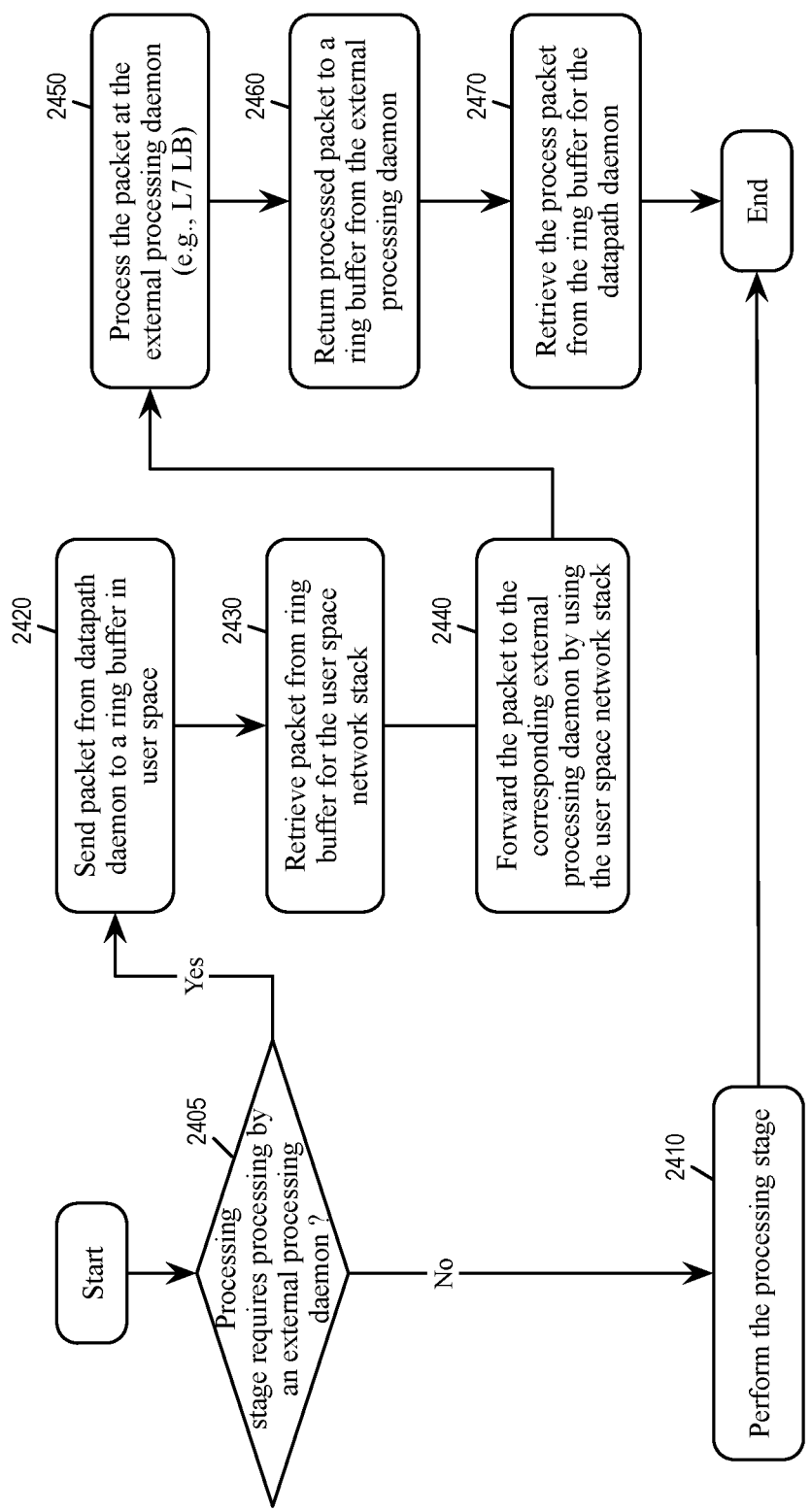
FIG. 24 conceptually illustrates a process for using a user space network stack to dispatch packet from a datapath daemon.

FIG. 24 conceptually illustrates a process 2400 for using a user space network stack to dispatch packet from a datapath daemon. In some embodiments, the gateway machine performs the process 2400 by using one or more processing threads. Some embodiments perform the process 2400 when the gateway datapath process 900 performs the operation 930 to process an incoming packet. Some embodiments perform the process 2400 when the gateway performs the operations 1065 in the process 1000.

The process 2400 starts when the datapath daemon receives a packet and has performed certain preliminary processing on the packet before arriving at a particular processing stage. The process then determines (at 2405) whether the processing stage is one that requires processing by an external daemon. If so, the process proceeds to 2420. Otherwise the process 2400 proceed to 2410 to performing the processing stage (at the datapath daemon) and ends.

At 2420, the process dispatches a packet to the external processing daemon by sending a packet to the ring buffer in the user space. The process retrieves (at 2430) the dispatched packet from the ring buffer for the user space network stack. The process then delivers (at 2440) the dispatched packet to the corresponding external processing daemon by using the user space network stack to perform the necessary network protocol handling.

Next, the process uses (at 2450) the external processing daemon to process the packet (e.g., for L7 LB, HTTPS). The process then returns (at 2460) the resulting packet (e.g., 2374) to a ring buffer from the external process daemon. The process then retrieves (at 2470) the resulting packet from the ring buffer for the datapath daemon. The process 2400 then ends. Upon completion of the process 2400, some embodiments proceeds to the next stage of the datapath pipeline at the datapath daemon.

Some embodiments use user space network stack to dispatch packets to external processing daemons from the datapath daemon for different TLRs. In some embodiments, each TLR has its own processing daemon in its own TLR-specific namespace as in the case of using kernel network stack. In some embodiments, different TLRs use the same external processing daemon, but the external processing daemon performs the processing for the different TLRs with different sets of configuration data. Since there is only one external processing daemon, the datapath daemon does not insert VLAN tag into the dispatch packet for identifying a TLR. The datapath daemon in some of these embodiments directly relays TLR identifying information to the external processing daemon (because there is no need to go through a user-kernel transport) through e.g., user space ring buffers. The external processing daemon in turn uses relayed identifier from the ring buffers to identify the corresponding TLR-specific configuration.

Figure 25:
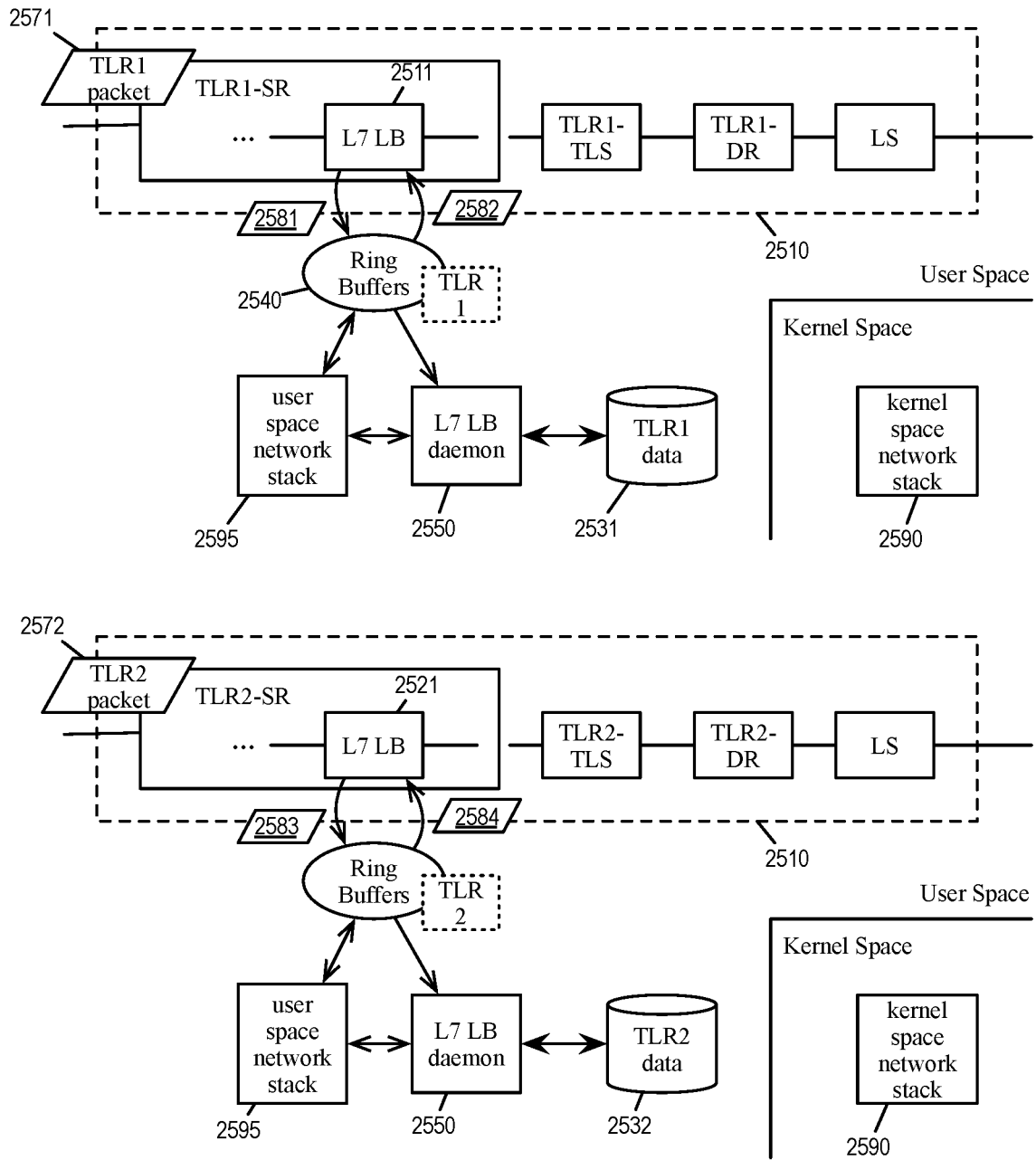
FIG. 25 illustrates using user space network stack to dispatch packets to an external user space processing daemon for different TLRs.

FIG. 25 illustrates using user space network stack to dispatch packets to an external user space processing daemon for different TLRs. As illustrated, a gateway 2500 is operating a datapath daemon 2510 in its user space. The gateway is also operating a user space network stack 2595 and a processing daemon 2550 (for performing L7 LB in this example) as processes outside of the datapath daemon. The operating system of the gateway 2500 does provide a kernel network stack 2590, but it is not used for dispatching packet from the datapath daemon 2510.

The figure illustrates the datapath daemon 2510 processing two different packets 2571 and 2572 for two different tenant logical networks. Specifically, the packets 2571 and 2572 are southbound packets that have been processed by PLR (in this gateway machine 2500 or another gateway machine), which determined them to be for TLR1 and TLR2, respectively.

When processing the packet 2571, the datapath daemon 2510 executes several pipeline stages for TLR1, including TLR1-SR, TLR1-TLS, TLR1-DR, and a logical switch (LS). The TLR1-SR stage includes a stage 2511 for performing L7 LB operations. The L7 LB stage 2511 is a dispatch stage that dispatches a packet 2581 to be processed by the external L7 LB daemon 2550 through the ring buffer 2540 and the user network stack 2595. The user network stack 2595 performs all of the necessary network protocol stack operations that are performed by the kernel space network stack 2590.

In addition to sending the packet 2581 to the user space network stack 2595 through the ring buffer 2540, the datapath daemon 2510 also sends other parameters to the L7 LB daemon 2550 through the ring buffer 2540. In some embodiments, these parameters include an identifier for TLR1 that the L7 LB daemon 2550 can use to retrieve TLR1 configuration data 2531. In some embodiments, some or all of the TLR1 configuration data for the L7 LB daemon is provided by the datapath daemon 2510 through the ring buffer 2540. Once the L7 LB daemon has completed processing the packet 2581, it returns a result packet 2582 back to the datapath daemon 2510 through the ring buffers 2540.

When processing the packet 2572, the datapath daemon 2510 executes several pipeline stages for TLR2, including TLR2-SR, TLR2-TLS, TLR2-DR, and a logical switch (LS). The TLR2-SR stage includes a stage 2521 for performing L7 LB operations by dispatching a packet 2583 to be processed by the external L7 LB daemon 2550 through the ring buffer 2540 and the user network stack 2595. The datapath daemon 2510 sends TLR2-specific parameters to the L7 LB daemon 2550 through the ring buffer 2540. These parameters can include an identifier for TLR2 that the L7 LB daemon 2550 can use to retrieve TLR2 configuration data 2532. These parameters can also include some or all of the TLR2 configuration data for the L7 LB daemon in some embodiments. Once the L7 LB daemon 2550 has completed processing the packet 2583, it returns a result packet 2584 back to the datapath daemon 2510 through the ring buffers 2540.

In the example of FIG. 25, the user space network stack is a processing thread or a process that is external to the datapath daemon. Instead of implementing the user space network stack as a separate processing thread from the datapath daemon, some embodiments implements the user space network stack as a processing stage that is executed by the datapath daemon's run-to-completion thread.

Figure 26:
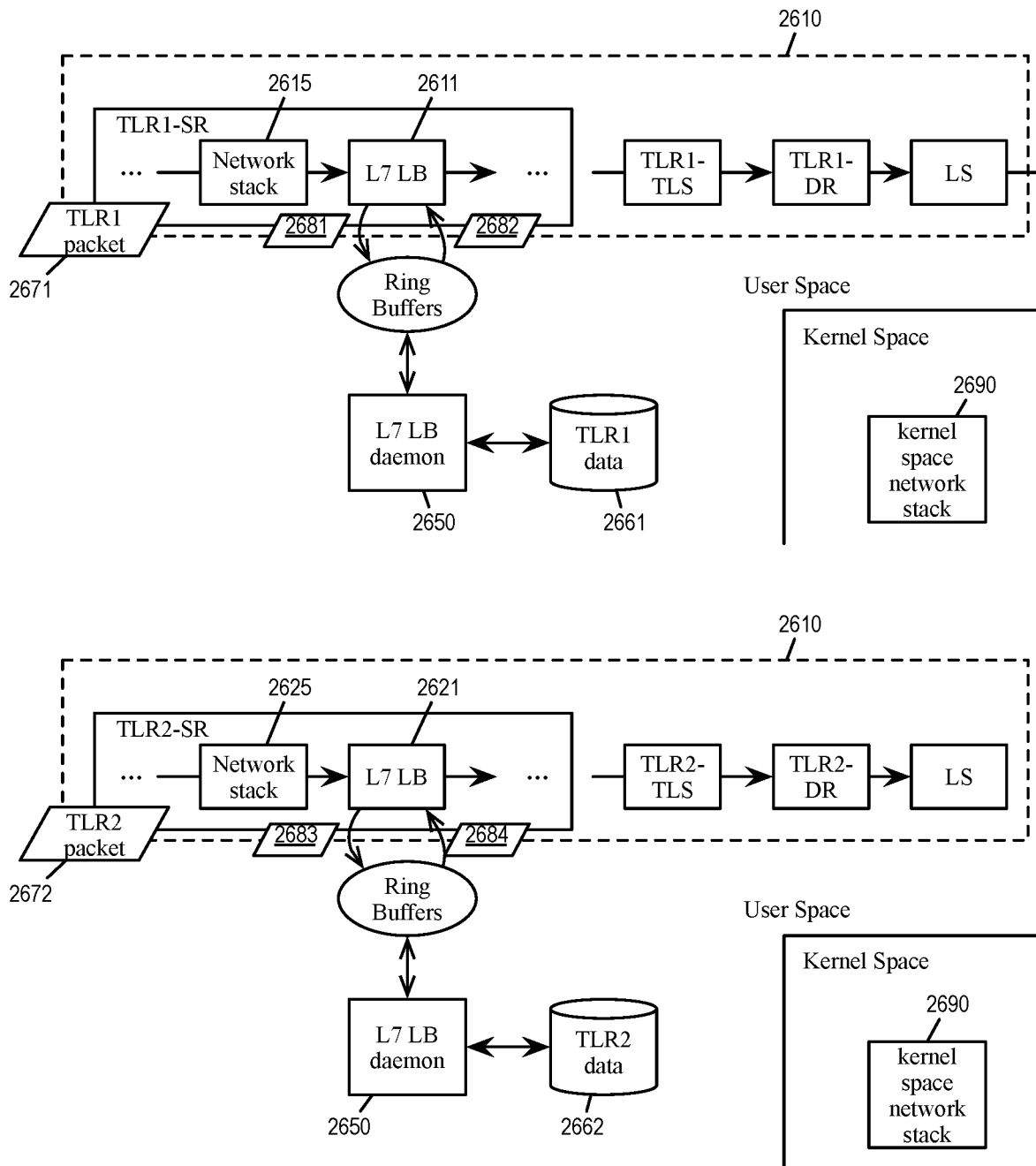
FIG. 26 illustrates a datapath daemon that executes its own network stack stage rather than relying on an external network stack for network protocol handling.

FIG. 26 illustrates a datapath daemon 2610 that executes its own network stack as a stage in its own pipeline rather than relying on an external network stack (user space or kernel space) for network protocol handling. As illustrated, a gateway 2600 is operating the datapath daemon 2610 in its user space. The gateway is also operating a data plane processing daemon 2650 (for performing L7 LB in this example) as a process outside of the datapath daemon 2610. The operating system of the gateway 2600 does provide a kernel network stack 2690, but it is not used for dispatching packet from the datapath daemon 2610.

The figure illustrates the datapath daemon 2610 processing two different packets 2671 and 2672 for two different tenant logical networks. Specifically, the packets 2671 and 2672 are southbound packets that have been processed by a PLR (in this gateway machine 2600 or another gateway machine), which determined them to be for TLR1 and TLR2, respectively.

Similar to the datapath daemon 2510, the datapath daemon 2610 also executes a stage 2611 for dispatching packets to an external processing daemon 2650. However, instead of dispatching a packet to the external processing daemon 2650 through a external network stack (whether in kernel space or in user space), the datapath daemon 2610 performs the necessary network stack processing itself, e.g., as a pipeline stage within the run-to-completion thread of the datapath daemon 2610.

When processing the packet 2671 for TLR1, the datapath daemon 2610 process the packet in pipeline stages for TLR1-SR, which includes a L7 LB stage 2611. But before the packet 2671 arrives at the L7 LB stage, the datapath daemon executes a network stack stage 2615 to handle the network protocol processing of the packet 2671. The datapath daemon 2610 then dispatches a network stack processed packet 2681 from the L7 LB dispatch stage 2611 to a ring buffer 2640 for the external L7 LB processing daemon 2650. The L7 LB process daemon 2650 would process the packet 2681 based on TLR1 specific configuration 2661 and returns a resulting packet 2682 back to the datapath daemon 2610.

Likewise, when processing the packet 2672 for TLR2, the datapath daemon 2610 executes a network stack stage 2625 before a L7 LB dispatch stage 2621 for TLR2. The network stack stage 2625 of the datapath daemon handles the network protocol processing of the packet 2672. The datapath daemon 2610 then dispatches a network stack processed packet 2683 from the L7 LB dispatch stage 2621 to a ring buffer 2640 for the external L7 LB processing daemon 2650. The L7 LB process daemon 2650 would process the packet 2683 based on TLR2 specific configuration 2662 and returns a resulting packet 2684 back to the datapath daemon 2610.

VI. Software Architecture

Figure 27:
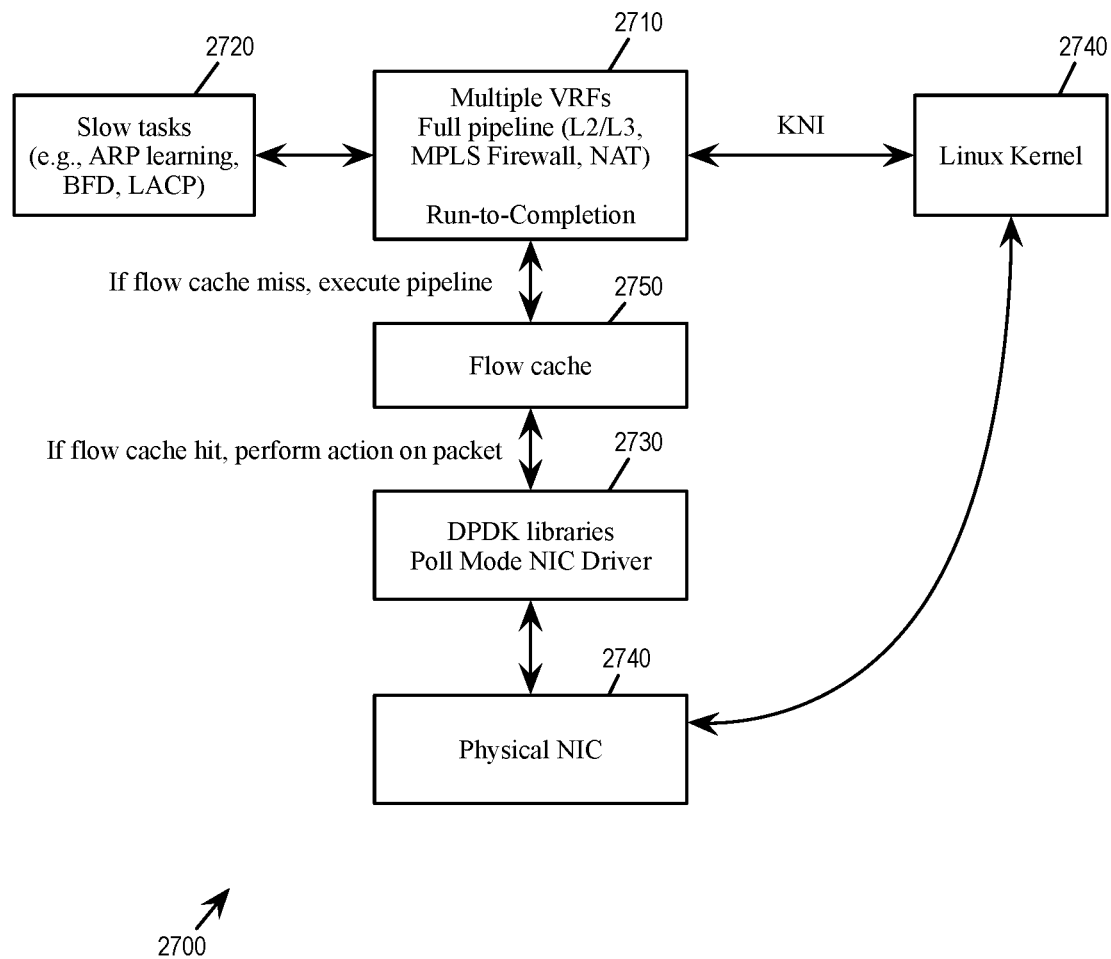
FIG. 27 illustrates the architecture of a gateway machine according to some embodiments of the invention.

FIG. 27 illustrates the architecture of a gateway machine 2700 according to some embodiments of the invention. The memory usage of the gateway machine is divided into user space and kernel space. The kernel space is reserved for running a privileged operating system kernel, kernel extensions, and most device drivers. User space is the memory area where application software and some drivers execute.

As illustrated, the packet processing threads 2710 (i.e., the datapath daemon) is operating in the user space for handling L2 switching, L3 routing, and services such as Firewall, NAT. Other service tasks such as ARP (address resolution request) learning, BFD (bidirectional forwarding detection) are considered slower running and therefore handled by separate processes 2720 in the user space. These slower tasks are not handled by the datapath daemon. The packet processing threads 2710 relies on a set of DPDK libraries 2730 (Data Plane Development Kit® by Intel®) for receive packets from a NIC 2740. In some embodiments, the datapath daemon relies on a user space NIC driver that uses poll mode to receive packets from the NIC 2740. Some embodiments implement a flow cache 2750 for the datapath daemon. The flow cache 2750 would produce an immediate datapath processing result if the incoming packet is a cache hit while letting the datapath daemon execute if the incoming packet is a cache miss.

In the kernel space, an operating system kernel 2740 (e.g., Linux) operates TCP/IP stacks and dispatches packets from the NIC 2740 as well as packets from the datapath daemon 2710. Some embodiments use KNI (kernel NIC Interface) to transport data between user space and the kernel space, such as between the datapath daemon 2710 and the kernel network stack 2740.

As mentioned, the gateway machine in some embodiments is implemented by using a processor having multiple cores, and that each datapath daemon performs all of its pipeline stages in a RTC (run-to-completion) thread at one core. In some embodiments, a datapath daemon may insert a service pipeline stage that is performed by service processes performed by another thread at another core.

Figure 28A:
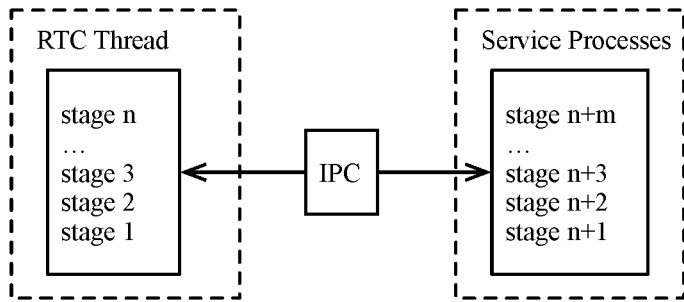
FIG. 28a conceptually illustrates a RTC thread using IPC to communicate with service processes in order to provide services.

In some embodiments, these service processes communicate with the RTC threads using some form of inter-process communications (IPC) such as shared memory or socket. A RTC thread receives packets from NICs, performs the regular L2/L3 forwarding, and classifies packet to determine if a packet requires a service. When a packet requires a service, the packet is sent to the corresponding service process via IPC channel. The IPC service process dequeues and processes the packets. After processing a packet, the service process pass it back to the RTC threads, which continues processing the packet (and may send the packet to another service process for other services.) Effectively, the RTC threads are used to provide basic forwarding and steer packets between service processes. FIG. 28a conceptually illustrates a RTC thread using IPC to communicate with service processes in order to provide services.

In some other embodiments, a service process runs within a container and does not use IPC to communicate with the RTC thread and is in fact unaware of the RTC threads. The process opens standard TCP/UDP socket to send and receive packets from Linux kernel. Instead of using IPC to communicate between service process and RTC threads, tun/tap devices or KNI devices are created within the container. Routing table for the container is properly populated so that packets sent by service process can be routed using the proper tun/tap/KNI devices.

Figure 28B:
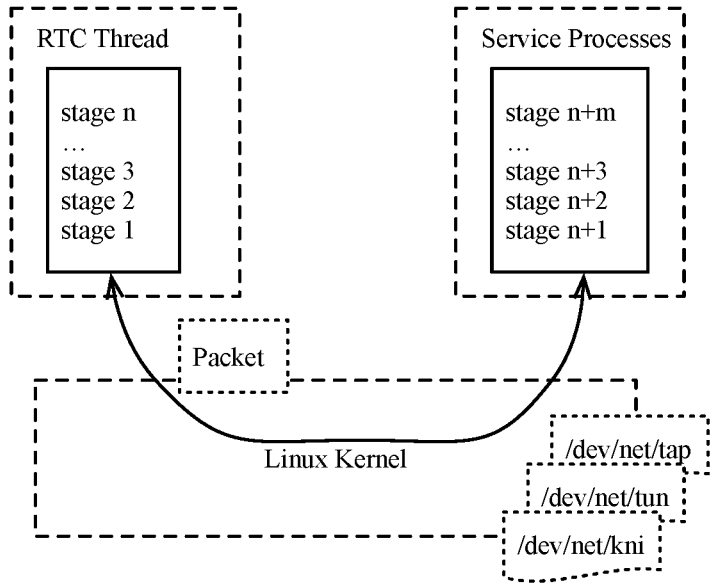
FIG. 28b conceptually illustrates a RTC thread using Linux Kernel to communicate with service processes in order to provide services.

When a RTC thread decides that a packet needs a service, it sends the packet to Linux kernel. After receiving the packet, Linux kernel processes it as if it is received from a NIC. Eventually the packet is delivered to the service process. When the service process finishes processing the packet, it sends the packet to the socket. The packet will be routed by Linux kernel towards one of the tun/tap/KNI devices and will be received by the RTC thread. FIG. 28b conceptually illustrates a RTC thread using Linux Kernel to communicate with service processes in order to provide services.

VII. Computing Device & Virtualization Software

Figure 29:
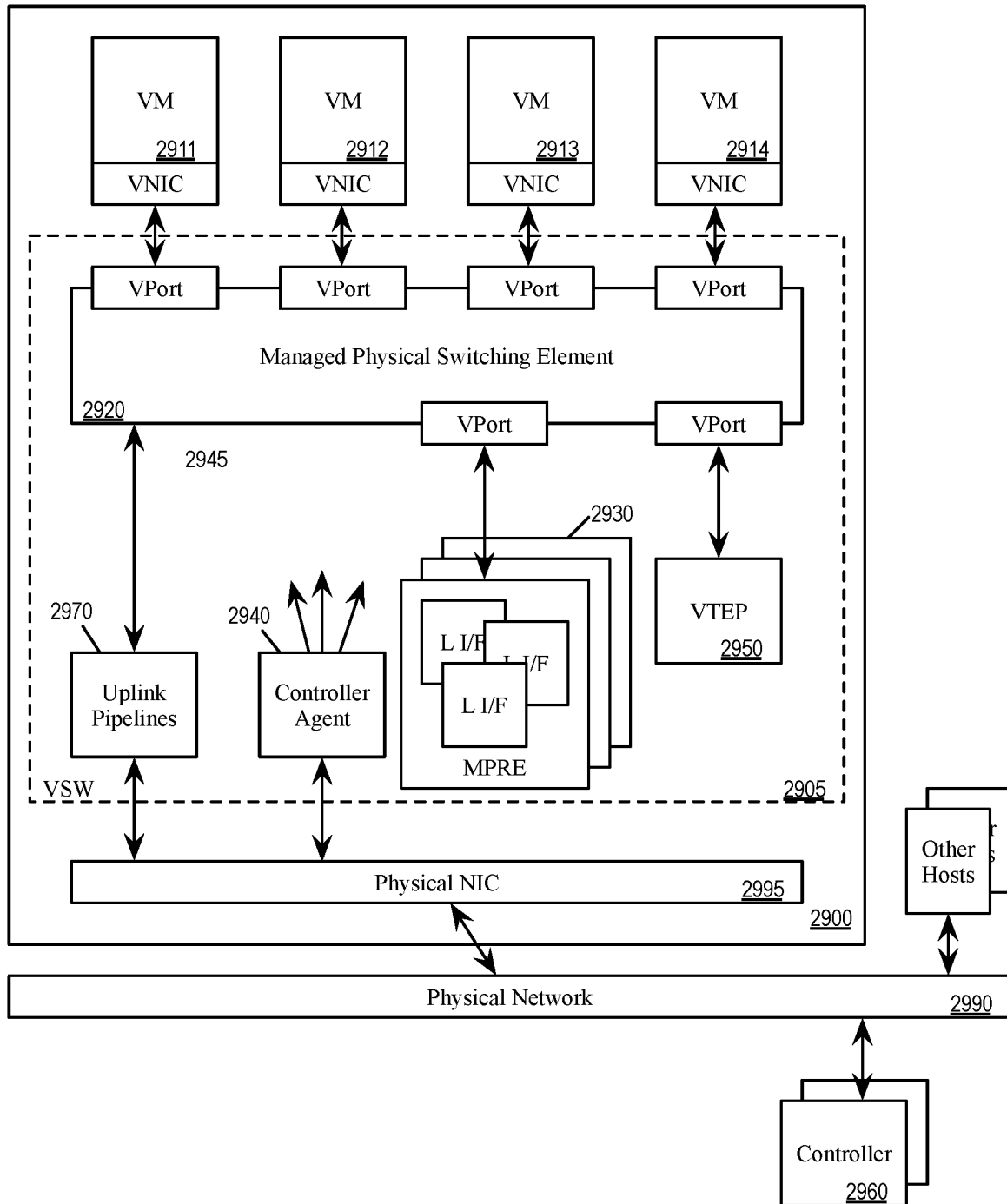
FIG. 29 illustrates a computing device that serves as a host machine that runs virtualization software for some embodiments of the invention.

Virtualization software, also known as managed forwarding element (MFE) or hypervisors, allows a computing device to host a set of virtual machines (VMs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE perform its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 29 illustrates a computing device 2900 that serves as a host machine or a gateway machine that runs virtualization software for some embodiments of the invention.

As illustrated, the computing device 2900 has access to a physical network 2990 through a physical NIC (PNIC) 2995. The host machine 2900 also runs the virtualization software 2905 and hosts VMs 2911-2914. The virtualization software 2905 serves as the interface between the hosted VMs and the physical NIC 2995 (as well as other physical resources, such as processors and memory). Each of the VMs includes a virtual NIC (VNIC) for accessing the network through the virtualization software 2905. Each VNIC in a VM is responsible for exchanging packets between the VM and the virtualization software 2905. In some embodiments, the VNICs are software abstractions of physical NICs implemented by virtual NIC emulators.

The virtualization software 2905 manages the operations of the VMs 2911-2914, and includes several components for managing the access of the VMs to the physical network (by implementing the logical networks to which the VMs connect, in some embodiments). As illustrated, the virtualization software includes several components, including a MPSE 2920, a set of MPREs 2930, a controller agent 2940, a VTEP 2950, and a set of uplink pipelines 2970.

The VTEP (VXLAN tunnel endpoint) 2950 allows the host machine 2900 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 2900 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 2970.

The controller agent 2940 receives control plane messages from a controller or a cluster of controllers. In some embodiments, these control plane message includes configuration data for configuring the various components of the virtualization software (such as the MPSE 2920 and the MPREs 2930) and/or the virtual machines. In the example illustrated in FIG. 29, the controller agent 2940 receives control plane messages from the controller cluster 2960 from the physical network 2990 and in turn provides the received configuration data to the MPREs 2930 through a control channel without going through the MPSE 2920. However, in some embodiments, the controller agent 2940 receives control plane messages from a direct data conduit (not illustrated) independent of the physical network 2990. In some other embodiments, the controller agent receives control plane messages from the MPSE 2920 and forwards configuration data to the router 2930 through the MPSE 2920.

The MPSE 2920 delivers network data to and from the physical NIC 2995, which interfaces the physical network 2990. The MPSE also includes a number of virtual ports (vPorts) that communicatively interconnects the physical NIC with the VMs 2911-2914, the MPREs 2930 and the controller agent 2940. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 2990 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 2930 perform L3 routing on data packets received from a virtual port on the MPSE 2920. In some embodiments, this routing operation entails resolving L3 IP address to a next-hop L2 MAC address and a next-hop VNI (i.e., the VNI of the next-hop's L2 segment). Each routed data packet is then sent back to the MPSE 2920 to be forwarded to its destination according to the resolved L2 MAC address. This destination can be another VM connected to a virtual port on the MPSE 2920, or a reachable L2 network element on the physical network 2990 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 2930 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 2970 relays data between the MPSE 2920 and the physical NIC 2995. The uplink module 2970 includes an egress chain and an ingress chain that each performs a number of operations. Some of these operations are pre-processing and/or post-processing operations for the MPRE 2930. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 29, the virtualization software 2905 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 2920, and hence a same L2 MAC address (vMAC or pMAC). In some other embodiments, each different MPRE belonging to a different tenant has its own port to the MPSE.

The MPSE 2920 and the MPRE 2930 make it possible for data packets to be forwarded amongst VMs 2911-2914 without being sent through the external physical network 2990 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 2900 (and its virtualization software 2905) is able to direct packets of different logical networks to their correct destinations and effectively segregates traffic of different logical networks from each other.

VIII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 30:
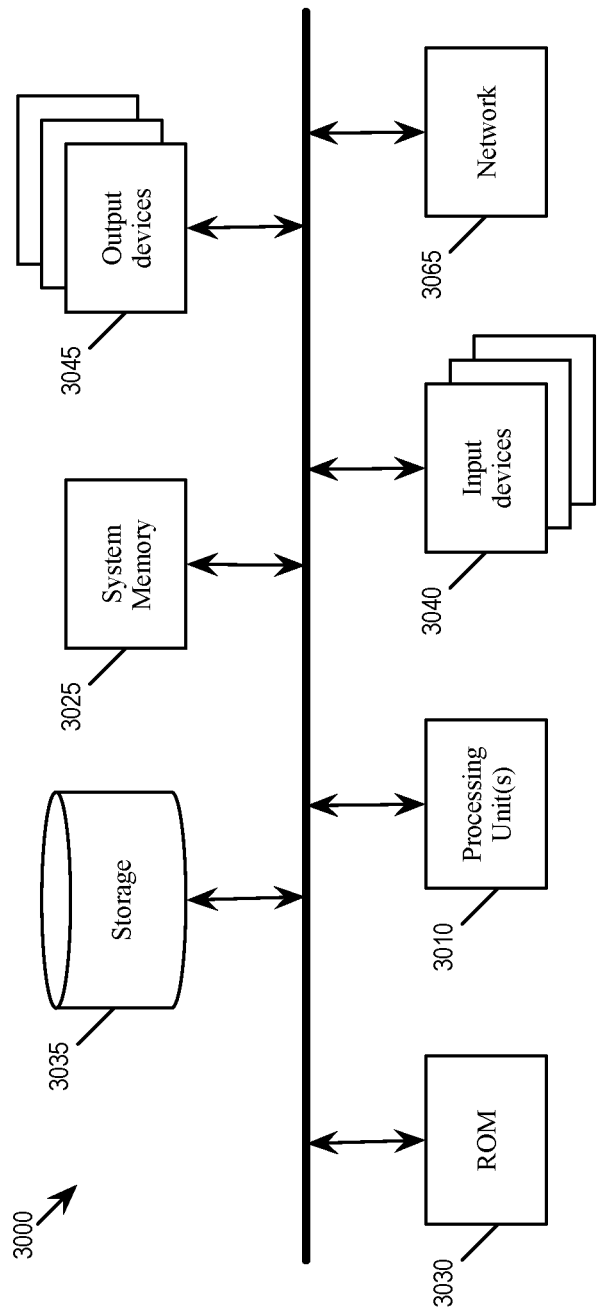
FIG. 30 conceptually illustrates an electronic system with which some embodiments of the invention are implemented.

FIG. 30 conceptually illustrates an electronic system 3000 with which some embodiments of the invention are implemented. The electronic system 3000 can be used to execute any of the control, virtualization, or operating system applications described above. The electronic system 3000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3000 includes a bus 3005, processing unit(s) 3010, a system memory 3025, a read-only memory 3030, a permanent storage device 3035, input devices 3040, and output devices 3045.

The bus 3005 collectively represents all system, peripheral, and chipset buses that communicatively connect the numerous internal devices of the electronic system 3000. For instance, the bus 3005 communicatively connects the processing unit(s) 3010 with the read-only memory 3030, the system memory 3025, and the permanent storage device 3035.

From these various memory units, the processing unit(s) 3010 retrieves instructions to execute and data to process in order to execute the processes of the invention. The processing unit(s) may be a single processor or a multi-core processor in different embodiments.

The read-only-memory (ROM) 3030 stores static data and instructions that are needed by the processing unit(s) 3010 and other modules of the electronic system. The permanent storage device 3035, on the other hand, is a read-and-write memory device. This device is a non-volatile memory unit that stores instructions and data even when the electronic system 3000 is off. Some embodiments of the invention use a mass-storage device (such as a magnetic or optical disk and its corresponding disk drive) as the permanent storage device 3035.

Other embodiments use a removable storage device (such as a floppy disk, flash drive, etc.) as the permanent storage device. Like the permanent storage device 3035, the system memory 3025 is a read-and-write memory device. However, unlike storage device 3035, the system memory is a volatile read-and-write memory, such a random access memory. The system memory stores some of the instructions and data that the processor needs at runtime. In some embodiments, the invention's processes are stored in the system memory 3025, the permanent storage device 3035, and/or the read-only memory 3030. From these various memory units, the processing unit(s) 3010 retrieves instructions to execute and data to process in order to execute the processes of some embodiments.

The bus 3005 also connects to the input and output devices 3040 and 3045. The input devices enable the user to communicate information and select commands to the electronic system. The input devices 3040 include alphanumeric keyboards and pointing devices (also called "cursor control devices"). The output devices 3045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 30, bus 3005 also couples electronic system 3000 to a network 3065 through a network adapter (not shown). In this manner, the computer can be a part of a network of computers (such as a local area network ("LAN"), a wide area network ("WAN"), or an Intranet, or a network of networks, such as the Internet. Any or all components of electronic system 3000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 9, 10, 14, 16, 22, 24) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for implementing a gateway datapath for a logical network, the gateway datapath comprising a plurality of pipeline stages corresponding to entities of the logical network, the method comprising:
   at a first daemon that executes in a user space of a computing device, receiving a packet from a network external to the logical network; and
   executing at least a subset of the plurality of pipeline stages at the first daemon to process the received packet,
   wherein executing a particular one of the pipeline stages comprises exporting the packet to a second daemon that also executes in the user space of the computing device via a user space network stack that is a separate process from the first daemon.

2. The method of claim 1, wherein executing the particular pipeline stage further comprises importing the packet from the second daemon after the second daemon processes the packet.

3. The method of claim 1, wherein an operating system of the computing device provides a network stack in a kernel space of the computing device that is not used for transporting packets between the first and second user space daemons.

4. The method of claim 1, wherein exporting the packet from the first user space daemon via the user space network stack comprises storing packet data to a ring buffer in the user space from which the user space network stack retrieves the packet data.

5. The method of claim 1, wherein the second daemon is an application layer load balancer.

6. The method of claim 1, wherein the second daemon is a control plane process.

7. The method of claim 6, wherein the control plane process is for operating a border gateway protocol (BGP) control plane, wherein the packet is a BGP packet comprising routing information.

8. The method of claim 1, wherein the first daemon executes the plurality of pipeline stages in a run-to-completion thread.

9. A non-transitory machine readable medium storing a first daemon that when executed in a user space of a computing device by at least one processing unit of the computing device implements a gateway datapath for a logical network, the first daemon comprising sets of instructions for:

receiving a packet from a network external to the logical network; and executing at least a subset of the plurality of pipeline stages at the first daemon to process the received packet, wherein the set of instructions for executing a particular pipeline stage comprises a set of instructions for exporting the packet to a second daemon that also executes in the user space of the computing device via a user space network stack that is a separate process from the first daemon.

10. The non-transitory machine readable medium of claim 9, wherein the set of instructions for executing the particular pipeline stage further comprises a set of instructions for importing the packet from the second daemon after the second daemon processes the packet.

11. The non-transitory machine readable medium of claim 9, wherein an operating system of the computing device provides a network stack in a kernel space of the computing device that is not used for transporting packets between the first and second user space daemons.

12. The non-transitory machine readable medium of claim 9, wherein the set of instructions for exporting the packet from the first user space daemon via the user space network stack comprises a set of instructions for storing packet data to a ring buffer in the user space from which the user space network stack retrieves the packet data.

13. The non-transitory machine readable medium of claim 9, wherein the second daemon is an application layer load balancer.

14. The non-transitory machine readable medium of claim 9, wherein the second daemon is a control plane process.

15. The non-transitory machine readable medium of claim 14, wherein the control plane process is for operating a border gateway protocol (BGP) control plane, wherein the packet is a BGP packet comprising routing information.

16. The non-transitory machine readable medium of claim 9, wherein the first daemon executes the plurality of pipeline stages in a run-to-completion thread.

17. The non-transitory machine readable medium of claim 12, wherein the set of instructions for executing the particular stage further comprises a set of instructions for retrieving packet data from the ring buffer after the second daemon processes the packet and stores the packet data in the ring buffer.

18. The method of claim 4, wherein executing the particular stage further comprises retrieving packet data from the ring buffer after the second daemon processes the packet and stores the packet data in the ring buffer.

\* \* \* \* \*